US012103609B2

(12) United States Patent
Sauvageau et al.

(10) Patent No.: US 12,103,609 B2
(45) Date of Patent: Oct. 1, 2024

(54) TRACK SYSTEM

(71) Applicant: SOUCY INTERNATIONAL INC., Drummondville (CA)

(72) Inventors: Yves Sauvageau, Drummondville (CA); Pierre-Yves Pepin, Drummondville (CA); Marc Nadeau, Drummondville (CA); Branislav Nanac, Drummondville (CA); Genevieve Therrien, Drummondville (CA); Andre Todd, Mont St-Hilaire (CA); Cedric Alliguie, St-Hyacinthe (CA); Jonathan Lapalme, Drummondville (CA); Nicolas Dubuc, Mercier (CA); Philippe Jaillet-Gosselin, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 652 days.

(21) Appl. No.: 17/272,815

(22) PCT Filed: Sep. 6, 2019

(86) PCT No.: PCT/IB2019/057553
§ 371 (c)(1),
(2) Date: Mar. 2, 2021

(87) PCT Pub. No.: WO2020/049533
PCT Pub. Date: Mar. 12, 2020

(65) Prior Publication Data
US 2021/0253185 A1    Aug. 19, 2021

Related U.S. Application Data

(60) Provisional application No. 62/728,161, filed on Sep. 7, 2018, provisional application No. 62/728,662, filed
(Continued)

(51) Int. Cl.
*B62D 55/065* (2006.01)
*B62D 11/20* (2006.01)
(Continued)

(52) U.S. Cl.
CPC ......... *B62D 55/065* (2013.01); *B62D 55/084* (2013.01); *B62D 55/10* (2013.01);
(Continued)

(58) Field of Classification Search
CPC .... B62D 55/065; B62D 66/084; B62D 55/10; B62D 55/104; B62D 55/14; B62D 55/15; B62D 55/116; B62D 11/20
(Continued)

(56) References Cited

U.S. PATENT DOCUMENTS

| 3,340,790 A | 9/1967 | Simjian |
| 3,430,790 A | 3/1969 | Beltrami |

(Continued)

FOREIGN PATENT DOCUMENTS

| CA | 1289854 C | 10/1991 |
| DE | 19620759 A1 | 12/1996 |

(Continued)

OTHER PUBLICATIONS

Supplementary European Search Report for EP 19857372 issued on Aug. 29, 2022; Szaip, Andras.
(Continued)

*Primary Examiner* — Anne Marie M Boehler
(74) *Attorney, Agent, or Firm* — BCF LLP

(57) ABSTRACT

A track system for use with a vehicle includes an attachment assembly connectable to the chassis of the vehicle having a first pivot extending vertically and defining a yaw pivot axis of the track system, and a second pivot extending laterally and defining a pitch pivot axis of the track system. A frame assembly is disposed laterally outwardly from the attach-
(Continued)

ment assembly and connected thereto. The frame assembly includes at least one wheel-bearing frame member. The track system further includes at least one actuator connected between the attachment assembly and the frame assembly for pivoting the frame assembly about the yaw pivot axis, a leading idler wheel assembly at least indirectly connected to the at least one wheel-bearing frame member, a trailing idler wheel assembly at least indirectly connected to the at least one wheel-bearing frame member, at least one support wheel assembly, and an endless track.

16 Claims, 32 Drawing Sheets

Related U.S. Application Data on Sep. 7, 2018, provisional application No. 62/728,669, filed on Sep. 7, 2018, provisional application No. 62/728,673, filed on Sep. 7, 2018, provisional application No. 62/728,690, filed on Sep. 7, 2018, provisional application No. 62/728,697, filed on Sep. 7, 2018.

(51) Int. Cl.
| | | |
|---|---|---|
| *B62D 55/084* | (2006.01) | |
| *B62D 55/10* | (2006.01) | |
| *B62D 55/14* | (2006.01) | |
| *B62D 55/15* | (2006.01) | |
| *B60C 23/00* | (2006.01) | |
| *B60C 23/10* | (2006.01) | |
| *B60C 23/16* | (2006.01) | |
| *B62D 11/00* | (2006.01) | |
| *B62D 55/12* | (2006.01) | |
| *B62D 55/24* | (2006.01) | |
| *B62D 55/30* | (2006.01) | |
| *G01L 5/1627* | (2020.01) | |
| *G01M 17/03* | (2006.01) | |

(52) U.S. Cl.
CPC ............ *B62D 55/14* (2013.01); *B60C 23/005* (2013.01); *B60C 23/10* (2013.01); *B60C 23/16* (2013.01); *B60C 2200/08* (2013.01); *B62D 11/003* (2013.01); *B62D 11/20* (2013.01); *B62D 55/12* (2013.01); *B62D 55/15* (2013.01); *B62D 55/24* (2013.01); *B62D 55/244* (2013.01); *B62D 55/305* (2013.01); *G01L 5/1627* (2020.01); *G01M 17/03* (2013.01)

(58) Field of Classification Search
USPC .................................................. 180/9.1, 9.46
See application file for complete search history.

(56) References Cited

U.S. PATENT DOCUMENTS

| | | | |
|---|---|---|---|
| 3,447,620 A | | 6/1969 | Schoonover |
| 3,900,077 A | * | 8/1975 | Gee .......................... B66C 5/10 |
| | | | 114/313 |
| 6,158,539 A | | 12/2000 | Isley |
| 6,315,374 B1 | | 11/2001 | Johansson |
| 6,564,889 B1 | | 5/2003 | Yamazaki et al. |
| 6,712,549 B2 | | 3/2004 | Roth |
| 6,962,222 B2 | | 11/2005 | Kirihata |
| 7,017,688 B2 | | 3/2006 | Bowers et al. |
| 7,690,738 B2 | | 4/2010 | Wilt |
| 8,540,040 B2 | | 9/2013 | Simula et al. |
| 8,640,797 B2 | | 2/2014 | Allaire |
| 8,985,250 B1 | | 3/2015 | Lussier et al. |
| 9,096,264 B2 | | 8/2015 | Connors et al. |
| 9,169,623 B2 | | 10/2015 | Rebinsky |
| 9,359,021 B2 | | 6/2016 | Janzen et al. |
| 9,415,818 B1 | | 8/2016 | Tiede et al. |
| 9,682,736 B1 | | 6/2017 | Prickel et al. |
| 9,688,322 B1 | | 6/2017 | Prickel et al. |
| 9,855,843 B2 | | 1/2018 | Vik et al. |
| 9,989,976 B2 | | 6/2018 | Garvin et al. |
| 11,427,272 B2 | * | 8/2022 | Li .......................... B62D 55/10 |
| 2013/0154345 A1 | | 6/2013 | Schulz |
| 2013/0181431 A1 | * | 7/2013 | McMahon ........... B62D 55/108 |
| | | | 280/28.5 |
| 2015/0197279 A1 | * | 7/2015 | Pare ....................... B62D 55/04 |
| | | | 280/93.512 |
| 2015/0367901 A1 | * | 12/2015 | Studer .................. B62D 55/116 |
| | | | 180/9.42 |
| 2016/0068205 A1 | | 3/2016 | Hellholm et al. |
| 2016/0159414 A1 | | 6/2016 | Hansen |
| 2017/0098987 A1 | | 4/2017 | Gieras |
| 2017/0261450 A1 | | 9/2017 | Baarman et al. |
| 2018/0190045 A1 | | 7/2018 | Richard et al. |
| 2019/0233033 A1 | | 8/2019 | Harnetiaux |
| 2020/0009931 A1 | * | 1/2020 | Zona ...................... B25J 9/0087 |

FOREIGN PATENT DOCUMENTS

| | | |
|---|---|---|
| DE | 102012109085 A1 | 3/2014 |
| DE | 102016008968 A1 | 1/2018 |
| EP | 2150458 B1 | 3/2012 |
| EP | 2727803 A2 | 5/2014 |
| EP | 3449716 A1 | 10/2020 |
| JP | 2000135993 A | 5/2000 |
| JP | 4680355 B2 | 5/2011 |
| WO | 2014121999 A1 | 8/2014 |
| WO | 2017049393 A1 | 3/2017 |
| WO | 2019046929 A1 | 3/2019 |
| WO | 2020049530 A2 | 3/2020 |
| WO | 2020049533 A2 | 3/2020 |

OTHER PUBLICATIONS

Supplementary European Search Report for EP 19858344.5 issued on Aug. 29, 2022; Szaip, Andras.
International Search Report from PCT/IB2019/057553 dated Apr. 29, 2020, Lee Young.
International Search Report from PCT/IB2019/057545 dated Apr. 28, 2020, Lee Young.
International Search Report from PCT/IB2019/057552 dated Apr. 28, 2020, Lee Young.
International Search Report from PCT/IB2019/057550 dated Apr. 28, 2020, Lee Young.
Supplementary European Search Report for EP 19853721 issued on Jul. 30, 2022; Szaip, Andras.
English translation of abstract for DE19620759 retrieved from Espacenet on Nov. 29, 2023.
English translation of abstract for JP2000135993 retrieved from Espacenet on Nov. 29, 2023.
English translation of abstract for JP4680355 retrieved from Espacenet on Nov. 29, 2023.
English translation of abstract for EP3449716 retrieved from Espacenet on Nov. 29, 2023.
English translation of abstract for DE102012109085 retrieved from Espacenet on Nov. 29, 2023.
English translation of abstract for DE102016008968 retrieved from Espacenet on Nov. 29, 2023.

* cited by examiner

TRACK SYSTEM

CROSS-REFERENCE TO RELATED APPLICATIONS

The present application claims priority to United States Provisional Patent Application Ser. No. 62/728,161, filed Sep. 7, 2018, entitled "Track System", U.S. Provisional Patent Application Ser. No. 62/728,669, filed Sep. 7, 2018, entitled "Track System", U.S. Provisional Patent Application Ser. No. 62/728,662, filed Sep. 7, 2018, entitled "Track System", U.S. Provisional Patent Application Ser. No. 62/728,673, filed Sep. 7, 2018, entitled "Track System", U.S. Provisional Patent Application Ser. No. 62/728,690, filed Sep. 7, 2018, entitled "Vehicle", and U.S. Provisional Patent Application Ser. No. 62/728,697, filed Sep. 7, 2018, entitled "Track System". Each one of these patent applications is incorporated by reference herein in its entirety.

TECHNICAL FIELD

The present technology relates to track systems for vehicles.

BACKGROUND

Certain vehicles, such as, for example, agricultural vehicles (e.g., harvesters, combines, tractors, etc.) and construction vehicles (e.g., bulldozers, front-end loaders, etc.), are used to perform work on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable agricultural vehicles to be used in wet field conditions as opposed to its wheeled counterpart.

The use of track systems in place of wheels and tires, however, does present some inconveniences. One of the drawbacks of conventional track systems is that, under certain conditions, the endless track can be in ground contact with an uneven load distribution across its ground contacting segment, i.e. the portion of the endless track contacting the ground. As such, since the load is not evenly distributed, areas of the ground contacting segment create high and low pressure spots on the ground surface. The high pressure spots cause undesirable soil compaction at different depth levels. In addition, the uneven distribution of the load can lead to premature wear of some components of the track system. One factor that leads to the uneven distribution of the load across the ground contacting segment of an endless track under certain conditions is that the structural components of the track system do not always allow the endless track to conform evenly to the ground surface like a tire filled with gas (air or nitrogen) does.

As such, there remains that there is a need for continued improvement in the design and configuration of track systems so that soil compaction issues and wear of some components of the track system be further reduced.

SUMMARY

It is therefore an object of the present technology to ameliorate the situation with respect to at least one of the inconveniences present in the prior art.

It is also an object of the present invention to provide an improved track system at least in some instances as compared with some of the prior art.

In accordance with one aspect of the present technology, there is provided a track system for use with a vehicle having a chassis, the track system including an attachment assembly connectable to the chassis of the vehicle. The attachment assembly includes a first pivot extending vertically and defining a yaw pivot axis of the track system, and a second pivot extending laterally and defining a pitch pivot axis of the track system. The track system further includes a frame assembly disposed laterally outwardly from the attachment assembly and connected to the attachment assembly, the frame assembly including at least one wheel-bearing frame member, at least one actuator connected between the attachment assembly and the frame assembly for pivoting the frame assembly about the yaw pivot axis, a leading idler wheel assembly at least indirectly connected to the at least one wheel-bearing frame member, a trailing idler wheel assembly at least indirectly connected to the at least one wheel-bearing frame member, at least one support wheel assembly at least indirectly connected to the at least one wheel-bearing frame member and disposed between the leading idler wheel assembly and the trailing idler wheel assembly, and an endless track extending around the leading idler wheel assembly, the trailing idler wheel assembly, and the at least one support wheel assembly.

In some embodiments, the attachment assembly further includes a third pivot extending longitudinally and defining a roll pivot axis of the track system, the frame assembly being further pivotable about the roll pivot axis upon operation of the at least one actuator.

In some embodiments, the attachment assembly includes a yoke, a pivot arm pivotally connected to the yoke by the third pivot and pivoting about the roll pivot axis, a plate connected to the pivot arm by the first pivot and pivoting about the yaw pivot axis, the second pivot projecting from the plate, and the plate being pivotable about the roll and yaw pivot axes relative to the yoke.

In some embodiments, the at least one actuator is a first, second and third actuators, the first actuator being operable for pivoting the frame assembly about the roll pivot axis, and the second and third actuators being operable for pivoting the frame assembly about the yaw pivot axis.

In some embodiments, the second actuator is a leading tracking actuator located forward of the second pivot, and the third actuator is a trailing tracking actuator located rearward of the second pivot.

In some embodiments, the attachment assembly includes an axle casing including the first pivot, the first pivot being defined by a cylindrical projection, and a base defining a cylindrical aperture dimensioned for receiving the cylindrical projection.

In some embodiments, the base has at least one tab, and the second pivot extends through the at least one tab of the base.

In some embodiments, the frame assembly is a multi-member frame assembly including a leading frame member pivotably connected to the attachment assembly via the second pivot for pivoting about the pitch pivot axis, a trailing frame member pivotably connected to the attachment assembly via the second pivot for pivoting about the pitch pivot axis, the trailing frame member pivoting independently from the leading frame member. The at least one wheel-bearing frame member is a leading wheel-bearing frame member and a trailing wheel-bearing frame member, the leading wheel-bearing frame member being at least indirectly pivotably connected to the leading frame member, the trailing wheel-bearing frame member being at least indirectly pivotably connected to the trailing frame member, and the track system further includes a leading damper interconnecting the axle casing and leading frame member, and a trailing damper interconnecting the axle casing and the trailing frame member.

In some embodiments, the endless track has an amount of ground contact area that increases as a load borne by the track system increases.

In some embodiments, a load supported by the trailing wheel-bearing frame member is greater than a load supported by the leading wheel-bearing frame member.

In some embodiments, the vehicle has a drive shaft extending laterally outwardly of the chassis, and the track system further has a sprocket wheel at least indirectly connected to the drive shaft for driving the endless track.

In some embodiments, the track system further includes at least one monitoring sensor for determining, at least indirectly, at least one of a state of the track system and a ground surface condition, and a track system controller communicating with the at least one monitoring sensor for receiving a first signal indicative of the at least one of the state of the track system and the ground surface condition, the track system controller being configured to connect to and to control the operation of the at least one actuator based on the at least one of the state of the track system and the ground surface condition.

In some embodiments, the at least one monitoring sensor includes at least one of a load sensor, temperature sensor, accelerometer, strain gauge, fluid property sensor, inclinometer, actuator assembly position sensor, geographical location sensor, hygrometer, penetrometer, sonar device, ultrasonic device, microwave-based device, radar device, and lidar device.

In some embodiments, the track system controller controls the operation of the at least one actuator in response to a second signal received from a manual override, a master control unit mounted to the vehicle, a remote processing unit, or a remote master control unit.

In some embodiments, the track system controller controls the operation of the at least one actuator in accordance with a predetermined objective.

In some embodiments, the predetermined objective is distributing a load supported by the track system across a surface of a ground engaging segment of the endless track for at least one of reducing soil compaction and improving traction of the endless track.

In some embodiments, the track system further includes at least one idler actuator for adjusting the pivotal positioning of at least one of the leading and trailing idler wheel assemblies relative to the frame assembly including raising the at least one of the leading and trailing idler wheel assemblies to reduce an amount of endless track in flat ground contact and lowering the at least one of the leading and trailing idler wheel assemblies to increase the amount of endless track in flat ground contact, and the track system controller is further configured to connect to and to control the operation of the at least one idler actuator based on the at least one of the state of the track system and the ground surface condition.

There is also provided a vehicle including first and second track systems as described above, and the track system controller of the first track system is at least indirectly connected to the track system controller of the second track system, and the track system controller of the first track system controls the operation of the at least one actuator of the first track system based on at least one of the state of the second track system and the ground surface condition determined by the at least one monitoring sensor of the second track system.

In accordance with another aspect of the present technology, there is provided a track system for use with a vehicle having a chassis, the track system including an attachment assembly connectable to the chassis of the vehicle, the attachment assembly including a pivot extending vertically and defining a yaw pivot axis of the track system, a frame assembly disposed laterally outwardly from the attachment assembly and connected to the attachment assembly, the frame assembly including at least one wheel-bearing frame member, at least one selectively extendible and retractable tie-rod assembly connected between the attachment assembly and the frame assembly for pivoting the frame assembly about the yaw pivot axis, a leading idler wheel assembly at least indirectly connected to the at least one wheel-bearing frame member, a trailing idler wheel assembly at least indirectly connected to the at least one wheel-bearing frame member, at least one support wheel assembly at least indirectly connected to the at least one wheel-bearing frame member and disposed between the leading idler wheel assembly and the trailing idler wheel assembly, and an endless track extending around the leading idler wheel assembly, the trailing idler wheel assembly, and the at least one support wheel assembly.

In some embodiments, the attachment assembly includes an axle casing including the pivot, the pivot being defined by a cylindrical projection, and a base defining a cylindrical aperture dimensioned for receiving the cylindrical projection.

Should there be any difference in the definitions of term in this application and the definition of these terms in any document included herein by reference, the terms as defined in the present application take precedence.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, and the accompanying drawings.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

With reference to FIGS. 1 to 6, a first embodiment of the present technology, track system 40, is illustrated. It is to be expressly understood that the track system 40 is merely an embodiment of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to track system 40 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the track system 40 may provide in certain aspects a simple embodiment of the present technology, and that where such is the case it has been presented in this manner as an aid to understanding. As persons skilled in the art would understand, various embodiments of the present technology may be of a greater complexity than what is described herein.

Figure 2:
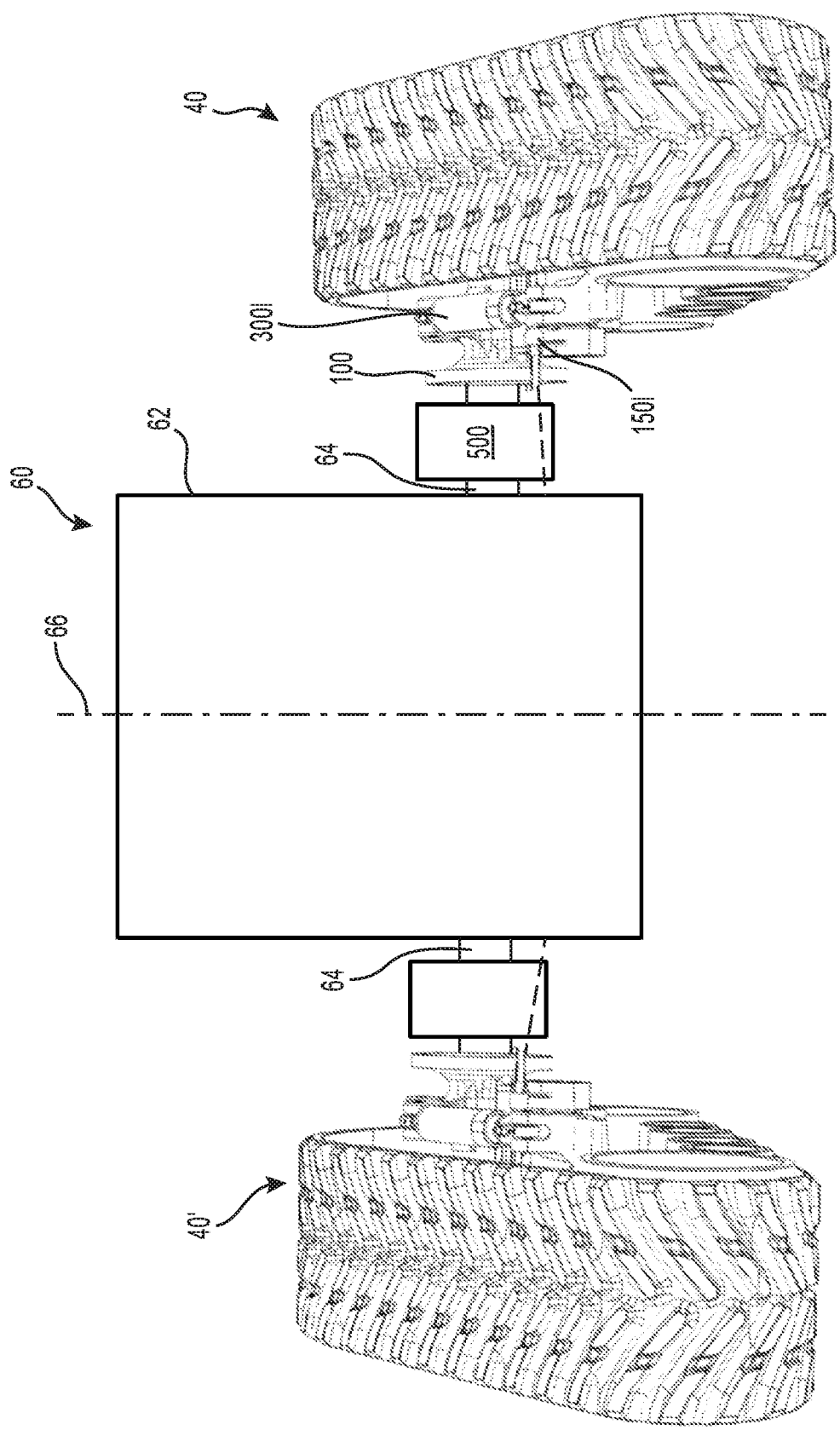
FIG. 2 is a front elevation view of a vehicle having the track system of FIG. 1 operatively connected to the left side thereof, and another track system being a mirror image of the track system of FIG. 1 operatively connected to the right side thereof.

Referring to FIG. 2, the track system 40 is for use with a vehicle 60 having a chassis 62 and a drive shaft 64 extending laterally outwardly from the chassis 62 for driving the track system 40 (the vehicle 60, the chassis 62 and the drive shaft 64 are schematically shown in FIG. 2). The chassis 62 supports the components of the vehicle 60, such as the cabin, the engine, the gearbox and other drivetrain components (not shown). In this embodiment, the drive shaft 64 is the drivetrain component that transmits the driving force from the engine and gearbox of the vehicle 60 to the track system 40, i.e. the drive shaft 64 is the output shaft of the gearbox.

In the context of the following description, "outwardly" or "outward" means away from a longitudinal center plane 66 of the chassis 62 of the vehicle 60, and "inwardly" or "inward" means toward the longitudinal center plane 66. In addition, in the context of the following description, "longitudinally" means in a direction parallel to the longitudinal center plane 66 of the chassis 62 of the vehicle 60 in a plane parallel to flat level ground, "laterally" means in a direction perpendicular to the longitudinal center plane 66 in a plane parallel to flat level ground, and "generally vertically" means in a direction contained in the longitudinal center plane 66 along a height direction of the track system 40 generally perpendicular to flat level ground. Note that in the Figures, a "+" symbol is used to indicate an axis of rotation. In the context of the present technology, the term "axis" may be used to indicate an axis of rotation, or the term may refer to a "pivot joint" that includes all the necessary structure (bearing structures, pins, axles and other components) to permit a structure to pivot about such axis, as the case may be. Moreover, the direction of forward travel of the track system 40 is indicated by an arrow 80 in the accompanying Figures. In the present description, the "leading" components are identified with a "l" added to their reference numeral (i.e. components towards the front of the vehicle 60 defined consistently with the vehicle's forward direction of travel 80), and the "trailing" components are identified with a "t" added to their reference numeral (i.e. components towards the rear of the vehicle 60 defined consistently with the vehicle's forward direction of travel 80). In the following description and accompanying FIGS. 1 to 6, the track system 40 is configured to be attached to a left side of the chassis 62 of the vehicle 60. A track system 40' (FIG. 2), being another embodiment of the present technology and configured to be connected to a right side of the chassis 62 of the vehicle 60, is a mirror image of the track system 40 with the necessary adaptations, and the components of the track system 40' are identified with a "'" added to their reference numeral. That embodiment will not be further described herein.

General Description of the Track System in Accordance with First and Second Embodiments of the Present Technology Referring to FIGS. 1 to 15, the track systems 40, 2040 will be generally described. The track systems 40, 2040, although being two different embodiments of the present technology, have many similar features and will thus be described collectively. As such, the description made in reference to the track system 40 or the track system 2040 is interchangeable, unless mentioned otherwise.

Figure 8:
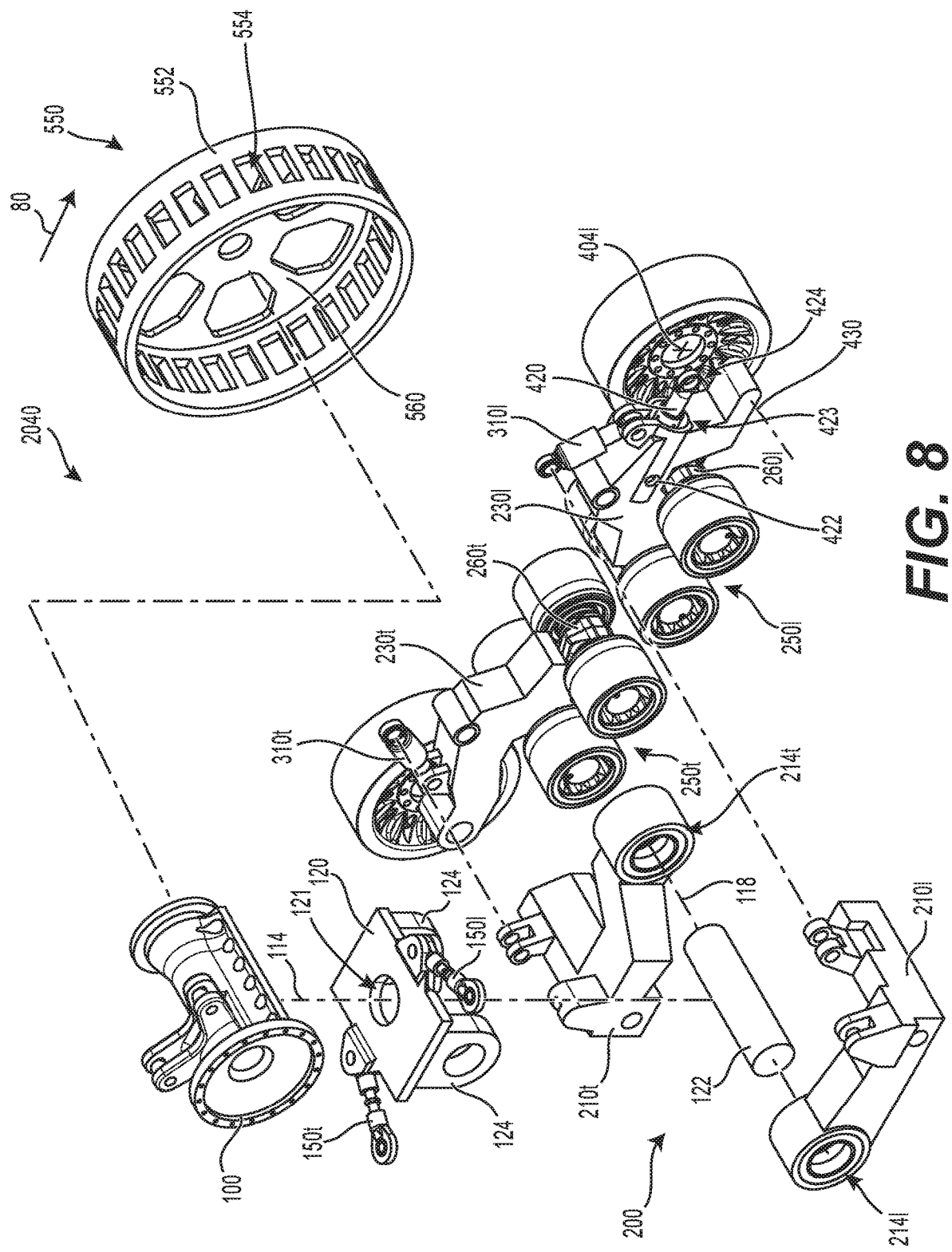
FIG. 8 is a partially exploded, perspective view taken from a top, front, right side of the track system of FIG. 7.
Figure 9:
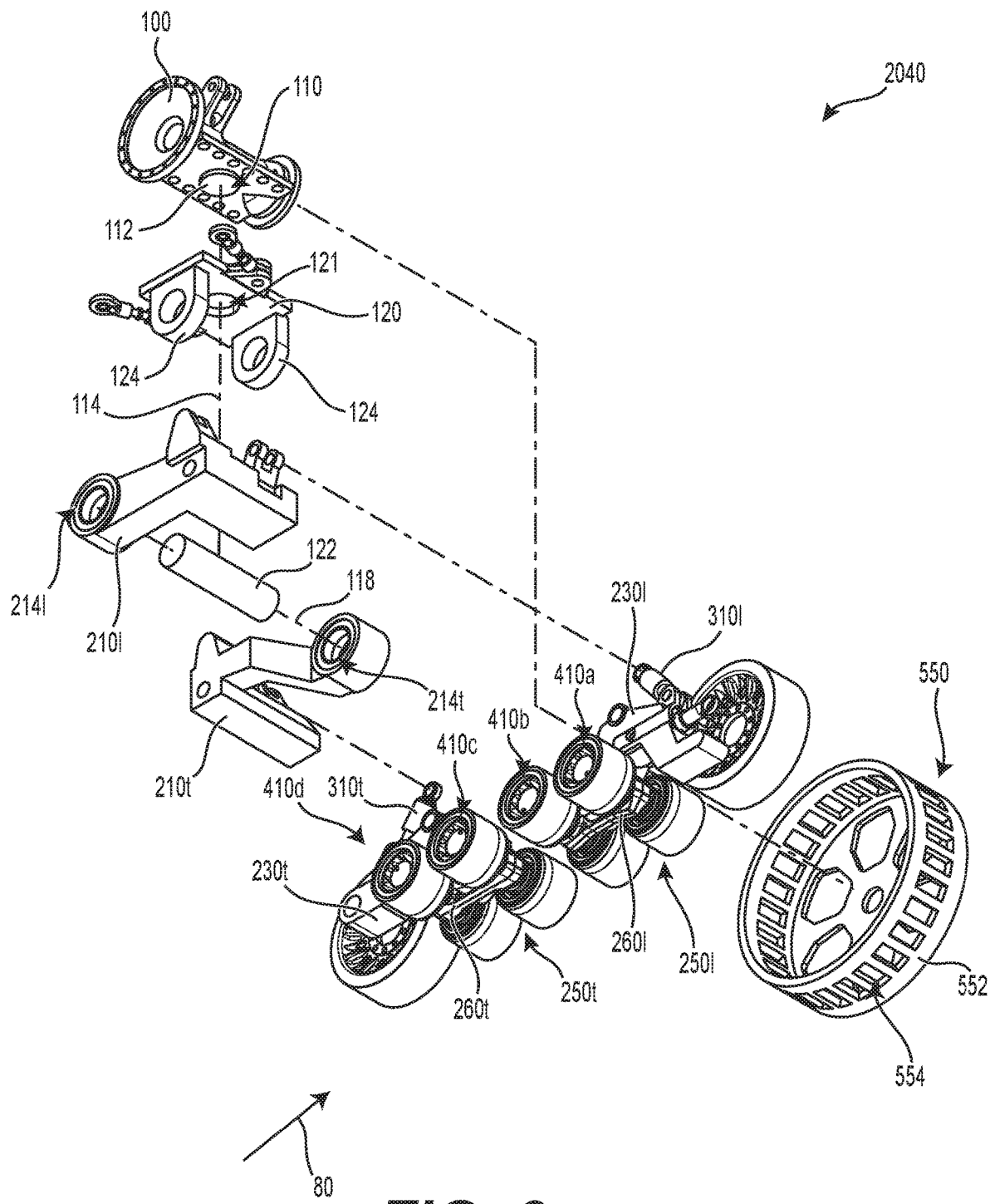
FIG. 9 is a partially exploded, perspective view taken from a bottom, front, right side of the track system of FIG. 7.

Referring to FIGS. 8 and 9, the track systems 40, 2040 include an axle casing 100 operatively connectable to the drive shaft 64 of the vehicle 60. The axle casing 100 includes a pivot 110 defined by a cylindrical projection 112, which projects generally vertically from a bottom face of the axle casing 100 (best seen in FIG. 9). The projection 112 defines a yaw pivot axis 114 of the track systems 40, 2040. A base 120 is pivotably connected to the axle casing 100 about the yaw pivot axis 114. The base 120 has a cylindrical aperture 121 dimensioned for receiving the cylindrical projection 112. The base 120 is located below the axle casing 100. A pivot 122 extends in tabs 124 of the base 120. The pivot 122 extends laterally. The pivot 122 defines a pitch pivot axis 118 of the track systems 40, 2040.

Referring back to FIGS. 1 to 15, the track systems 40, 2040 further include a frame assembly 200 located below the axle casing 100. A portion of the frame assembly 200 extends between the tabs 124 of the base 120 (as best seen in FIGS. 8 and 9), and is pivotably connected to the base 120 via the pivot 122. The frame assembly 200 is a multi-member frame assembly, and includes a leading frame member 210*l* pivotably connected to the base 120 via the pivot 122 for pivoting about the pitch pivot axis 118, and a trailing frame member 210*t* also pivotably connected to the base 120 via the pivot 122 for pivoting about the pitch pivot axis 118 independently from the leading frame member 210*l*. In other embodiments, the frame assembly 200 could be formed of a single frame member connected to the base 120 via the pivot 122 and pivoting about the pitch pivot axis 118.

The multi-member frame assembly 200 also includes a leading wheel-bearing frame member 230*l* pivotably connected to the leading frame member 210*l*, and a trailing wheel-bearing frame member 230*t* pivotably connected to the trailing frame member 210*t*. In other embodiments, the track systems 40, 2040 could have only one wheel-bearing frame member, which could be the same component as the frame assembly 200. Tandem assemblies 250*l*, 250*t* are pivotably connected to the leading and trailing wheel-bearing frame members 230*l*, 230*t* about axes 2521, 252*t* (FIG. 6) via longitudinally extending bogie members 2601, 260*t* (FIGS. 8 and 9). The track systems 40, 2040 further include a leading damper 300*l* (in this embodiment a shock absorber, but could be a coil spring, an air spring, an hydro-pneumatic spring or the like) interconnecting the axle casing 100 and the leading frame member 210*l*, and a trailing damper 300*r* interconnecting the axle casing 100 and the trailing frame member 210*r*. As such, the pivotal motion of the leading frame member 210*l* relative to the axle casing 100 is dampened by the leading damper 300*l*, and the pivotal motion of the trailing frame member 210*t* relative to the axle casing 100 is dampened by the trailing damper 300*t*. The leading and trailing dampers 300*l*, 300*t* are operatively connected to the axle casing 100 and their corresponding frame member 210*l*, 210*t* using spherical bushings. As each frame member 210*l*, 210*t* has a dedicated damper (i.e. dampers 300*l*, 300*t*), the absorption of energy caused by the track systems 40, 2040 travelling on uneven ground surface is improved compared to conventional track systems, and thus shocks and vibrations transferred from the ground to the vehicle 60 are attenuated in some conditions. As a result, wear of components is reduced and the comfort that a user of the vehicle 60 experiences is improved compared to conventional track systems.

When the track systems 40, 2040 support the weight of the vehicle 60, the dampers 300*l*, 300*t* are deformed (i.e. compressed). Under certain conditions, vibrations that are caused by the ground surface on which the track systems 40, 2040 travel, and that are transferred to the leading and trailing frame members 210*l*, 210*t* are dampened by the dampers 300*l*, 300*t*. In some embodiments, the dampers 300*l*, 300*t* have variable damping characteristics as described in commonly owned International Patent Application No. PCT/CA2016/050418, filed Apr. 11, 2016, entitled "Progressive Damping System for a Track System" and published as WO 2016/161527. The content of this application is incorporated herein by reference in its entirety.

A leading idler wheel assembly 400*l* is rotatably connected to the leading wheel-bearing frame member 230*l*, and a trailing idler wheel assembly 400*t* is rotatably connected to the trailing wheel-bearing frame member 230*t*. A plurality of support wheel assemblies 410*a*, 410*b*, 410*c*, 410*d* are disposed intermediate the leading idler wheel assembly 400*l* and the trailing idler wheel assembly 400*t*. The support wheel assemblies 410*a*, 410*b* are rotatably connected to the bogie member 260*l*, and the support wheel assemblies 410*c*, 410*d* are rotatably connected to the bogie member 260*t*. In other embodiments, the track systems 40, 2040 have only one of the leading and trailing idler wheel assemblies 400*l*, 400*t*. In yet other embodiments, the amount of support wheel assemblies could be less or more than four, as shown in the present embodiments.

Referring to FIG. 2, the track systems 40, 2040 further include a gearbox 500 (schematically shown in FIG. 2) operatively connected to the drive shaft 64 of the vehicle 60. The gearbox 500 is operatively connected to the axle casing 100. The track systems 40, 2040 further include a sprocket wheel 550 operatively connected to the axle casing 100. As such, the driving force is transferred from the drive shaft 64 to the sprocket wheel 550 via the gearbox 500 and the axle casing 100. In other embodiments, the gearbox 500 could be omitted and the drive shaft 64 could be directly operatively connected to the sprocket wheel 550 and extending in the axle casing 100.

The track systems 40, 2040 further include an endless track 600 extending around the sprocket wheel 550, the leading idler wheel assembly 400*l*, the trailing idler wheel assembly 400*t*, and the plurality of support wheel assemblies 410*a*, 410*b*, 410*c*, 410*d*. The endless track 600 is drivable by the sprocket wheel 550.

Endless Track

Figure 1:
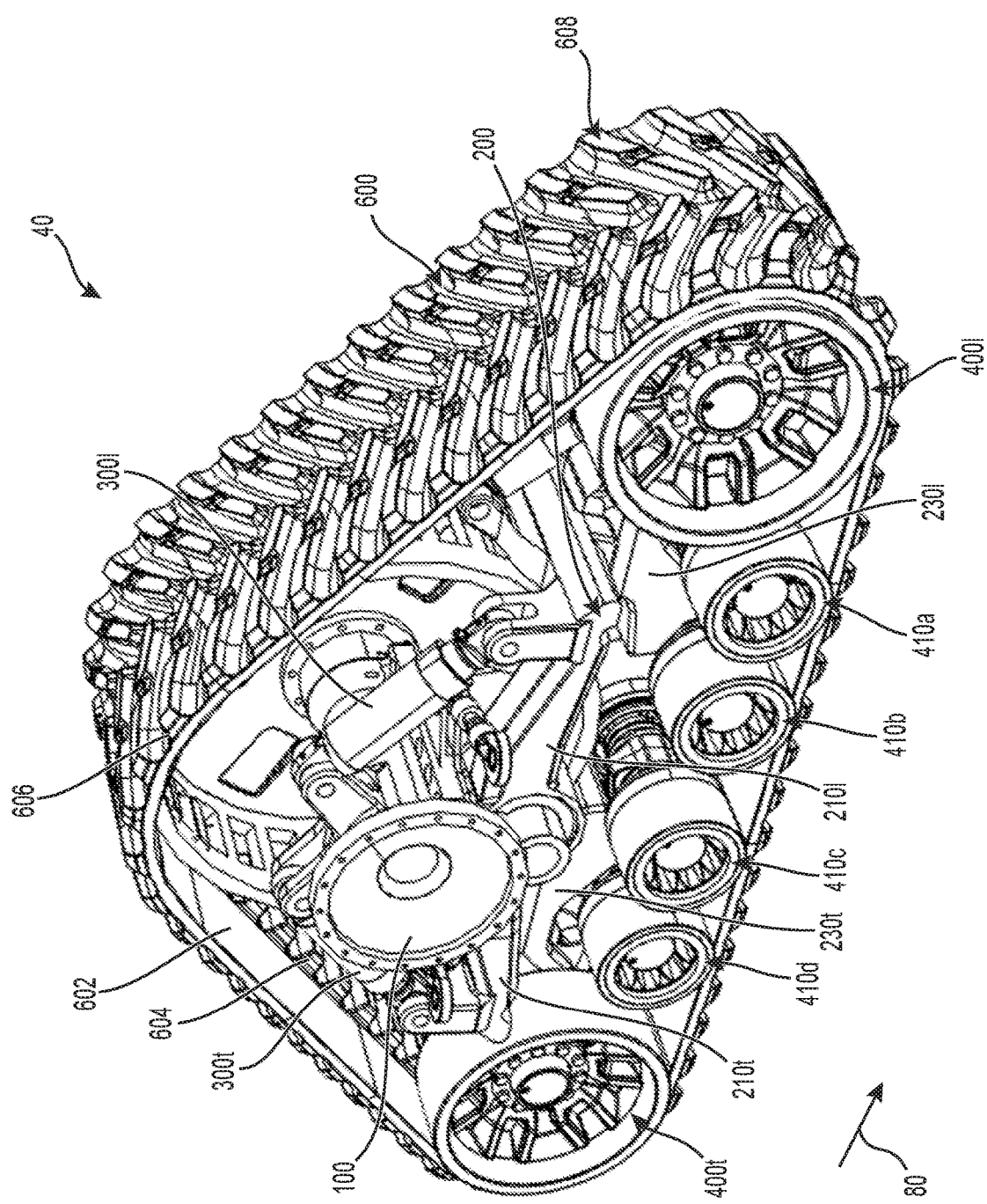
FIG. 1 is a perspective view taken from a top, front, right side of a track system being a first embodiment of the present technology, the track system being configured to be operatively connected on a left side of a vehicle.

Referring to FIG. 1, the endless track 600 is an endless polymeric track. The endless track 600 has an inner surface 602 engaging the leading idler wheel assembly 400*l*, the trailing idler wheel assembly 400*t*, and the plurality of support wheel assemblies 410*a*, 410*b*, 410*c*, 410*d*. Lugs 604 (FIG. 1) are disposed on a central portion of the inner surface 602 and are engageable by the sprocket wheel 550. As such, the track systems 40, 2040 are "positive drive" track systems. Friction drive track systems are also contemplated as being an alternative to the present embodiments. Moreover, hybrid drive track systems (i.e. the sprocket wheel 550 drives the endless track 600 via friction and driving engagement of lugs 604) are also contemplated. The idler and support wheel assemblies 400*l*, 400*t*, 410*a*, 410*b*, 410*c*, 410*d* have laterally spaced-apart wheels engaging the inner surface 602 of the endless track 600 on either side of the lugs 604. The endless track 600 also has an outer surface 606 with a tread 608 (FIGS. 1 to 3) selected for ground engagement. The tread 608 varies in different embodiments according to the type of vehicle on which the track systems 40, 2040 are to be used with and/or the type of ground surface on which the vehicle is destined to travel. It is contemplated that within the scope of the present technology, the endless track 600 may be constructed of a wide variety of materials and structures including metallic components known in track systems.

Figure 3:
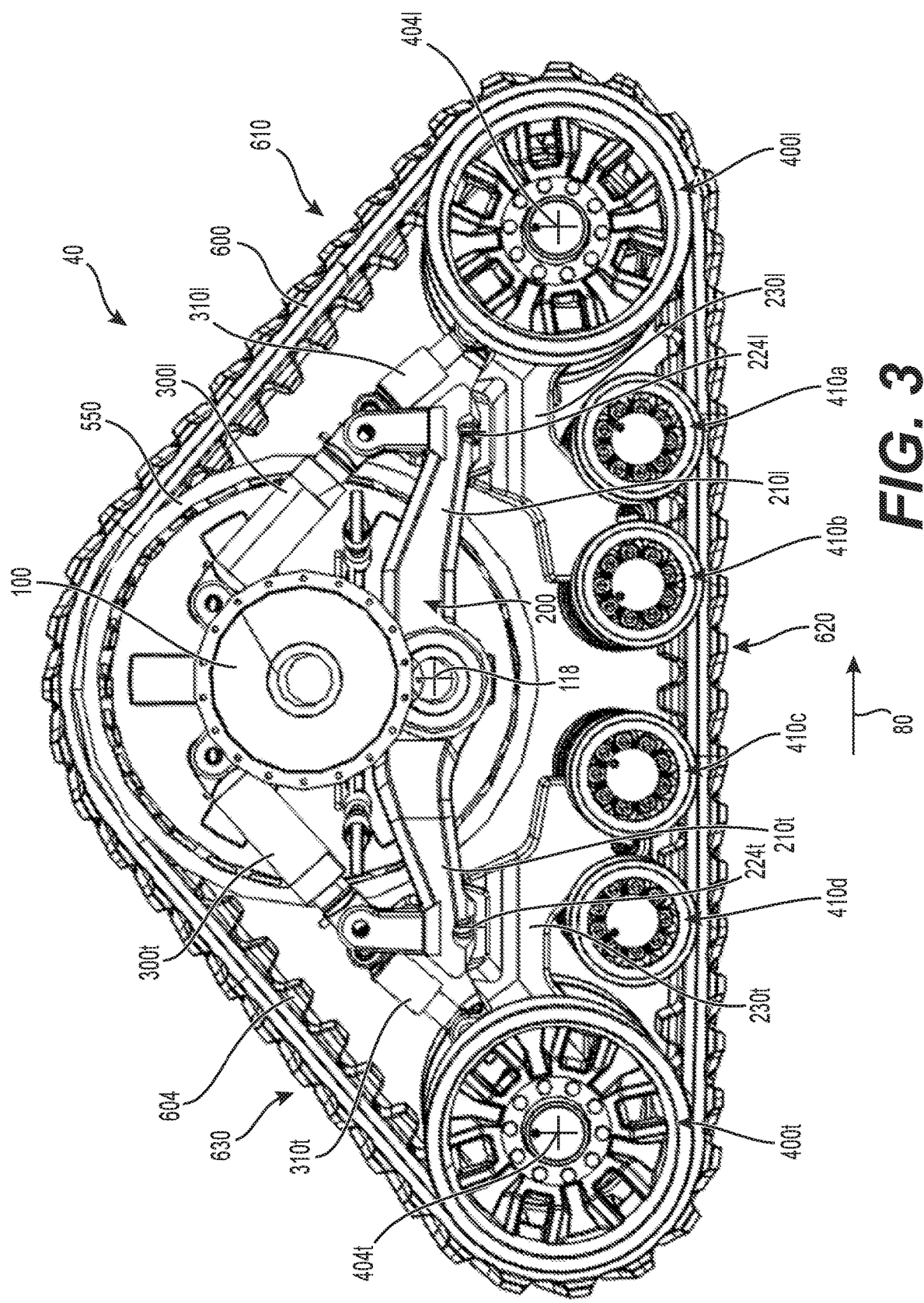
FIG. 3 is a right side elevation view of the track system of FIG. 1.
Figure 4:
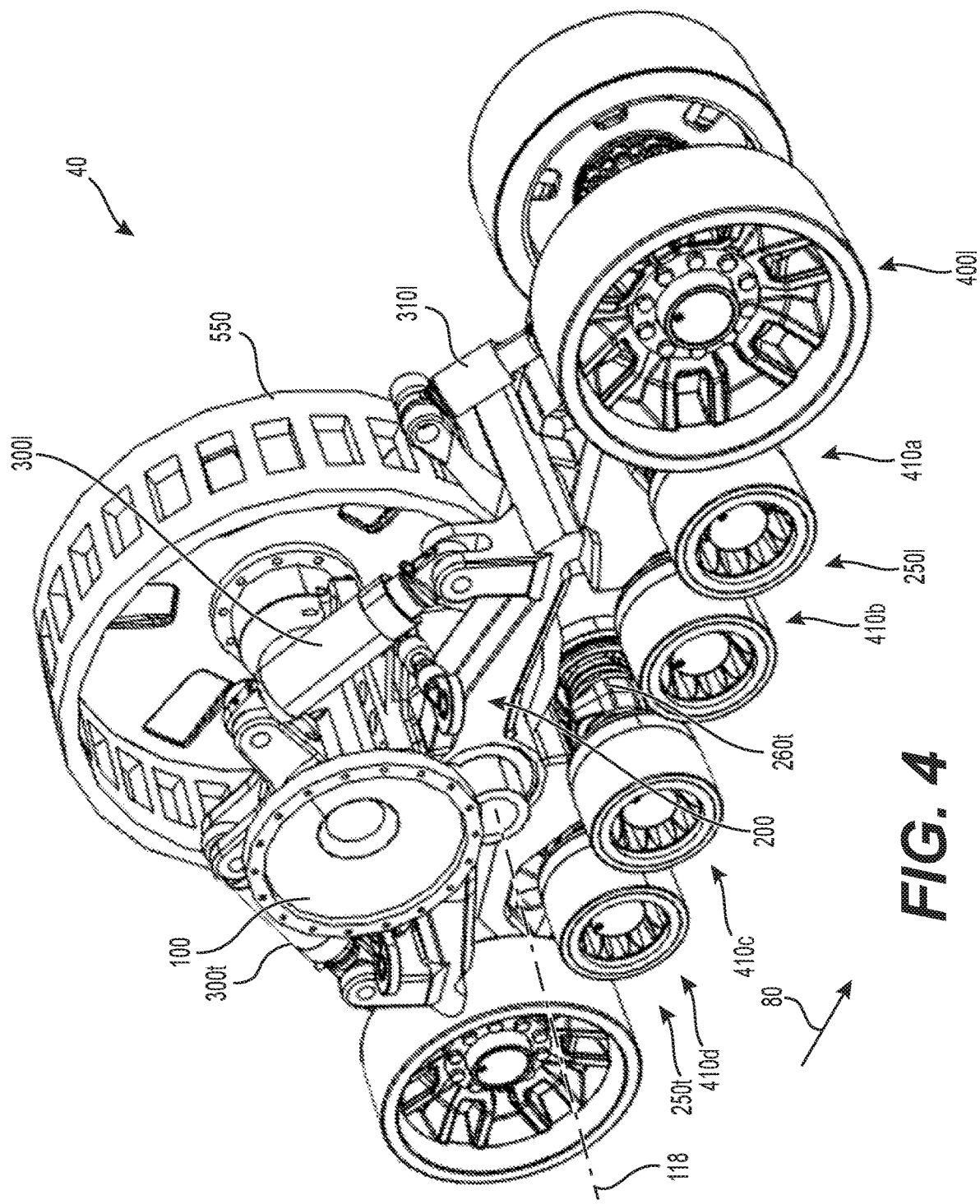
FIG. 4 is a perspective view taken from a top, front, right side of the track system of FIG. 1, with the endless track removed.
Figure 5:
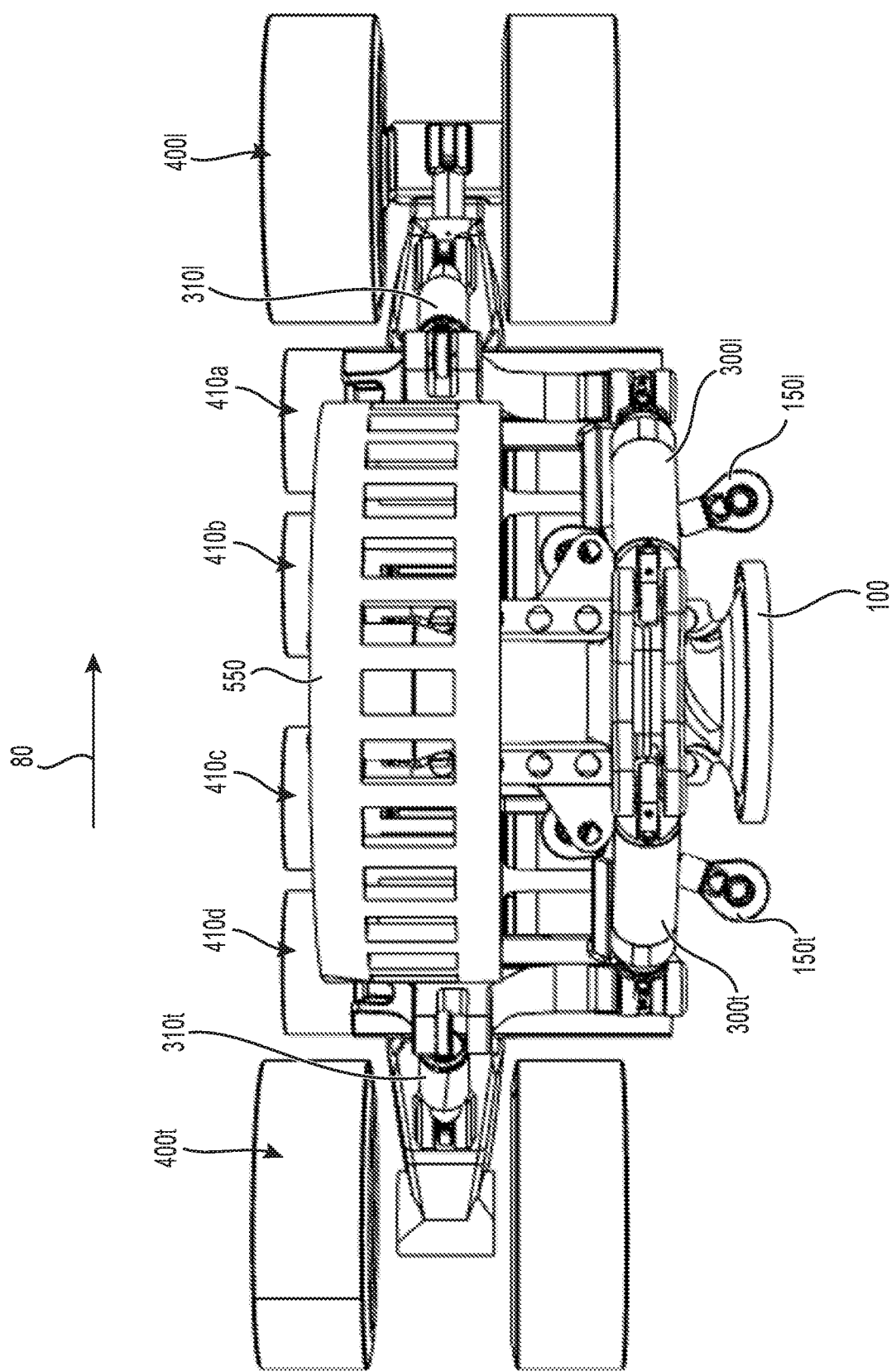
FIG. 5 is a top plan view of the track system of FIG. 4.

Referring to FIG. 3, the endless track 600 has a leading segment 610, a ground engaging segment 620 and a trailing segment 630. The generally triangular shape of the track systems 40, 2040 causes the endless track 600 to have the segments 610, 620, 630, but as other configurations of the track systems 40, 2040 are contemplated, the endless track 600 could have more or less segments in other embodiments. Referring to FIGS. 12 to 15 and as will be described below, the pivotal positioning of the leading idler wheel assembly 400*l* relative to the leading frame member 210*l* and the pivotal positioning of the trailing idler wheel assembly 400*t* relative to the trailing frame member 210*t* varies by raising or lowering the leading wheel-bearing frame member 230*l* and the trailing wheel-bearing frame member 230 respectively. When the leading wheel-bearing frame member 230*l* is raised (FIG. 13), the ground engaging segment 620 includes a leading ground-engaging segment 622*l* that extends above ground when the endless track 600 is disposed on flat level ground. It is contemplated that, in certain situations such as when the track systems 40, 2040 travels on soft ground, the ground-engaging segment 622*l* could engage the ground surface. The leading ground-engaging segment 622 extends below the leading idler wheel assembly 400*l*. When the trailing wheel-bearing frame member 230*t* is raised (FIG. 14), the ground engaging segment 620 further includes a trailing ground engaging segment 622*t* that extends above ground when the endless track 600 is disposed on flat level ground. It is also contemplated that, in certain situations such as when the track systems 40, 2040 travel on soft ground, the ground-engaging segment 622*t* could engage the ground surface. The trailing ground engaging segment 622*t* extends below the trailing idler wheel assembly 400*t*. Referring to FIG. 15, when the leading wheel-bearing frame member 230*l* and the trailing wheel-bearing frame member 230*t* are raised, the endless track 600 has the leading ground-engaging segment 622*l* and the trailing ground engaging segment 622*t* extending above ground. In this configuration, the ground engaging segment 620 (i.e. the portion of the endless track 600 that engages the ground surface when the endless track 600 is disposed on flat level ground) is shorter compared to the ground engaging segment 620 of the configurations shown in FIGS. 12 to 14.

As will be described in more details below, the yaw and pitch pivot axes 114, 118 permit degrees of freedom of the track systems 40, 2040 relative to the chassis 62 of the vehicle 60 that can assist the endless track 600 to better conform to the ground surface on which it travels and assist in preserving integrity of the soil as the track systems 40, 2040 travel thereon.

Referring to FIGS. 8 to 11, a leading tie rod assembly 150*l* is pivotably connected to the base 120 and to the chassis 62 of the vehicle 60 (the connection to the chassis 62 of the vehicle 60 is schematically shown in FIG. 2 by a dashed line). A trailing tie rod assembly 150*t* is pivotably connected to the base 120 and to the chassis 62 of the vehicle 60 (the connection to the chassis 62 of the vehicle 60 is schematically shown in FIG. 2 by a dashed line). Similar to the dampers 300*l*, 300*t*, the tie rod assemblies 150*l*, 150*t* include spherical bushing at each end thereof. The leading and trailing tie rod assemblies 150*l*, 150*t* are thus longitudinally offset of the yaw pivot axis 114 (shown as a dashed line in FIGS. 8 and 9).

Figure 10:
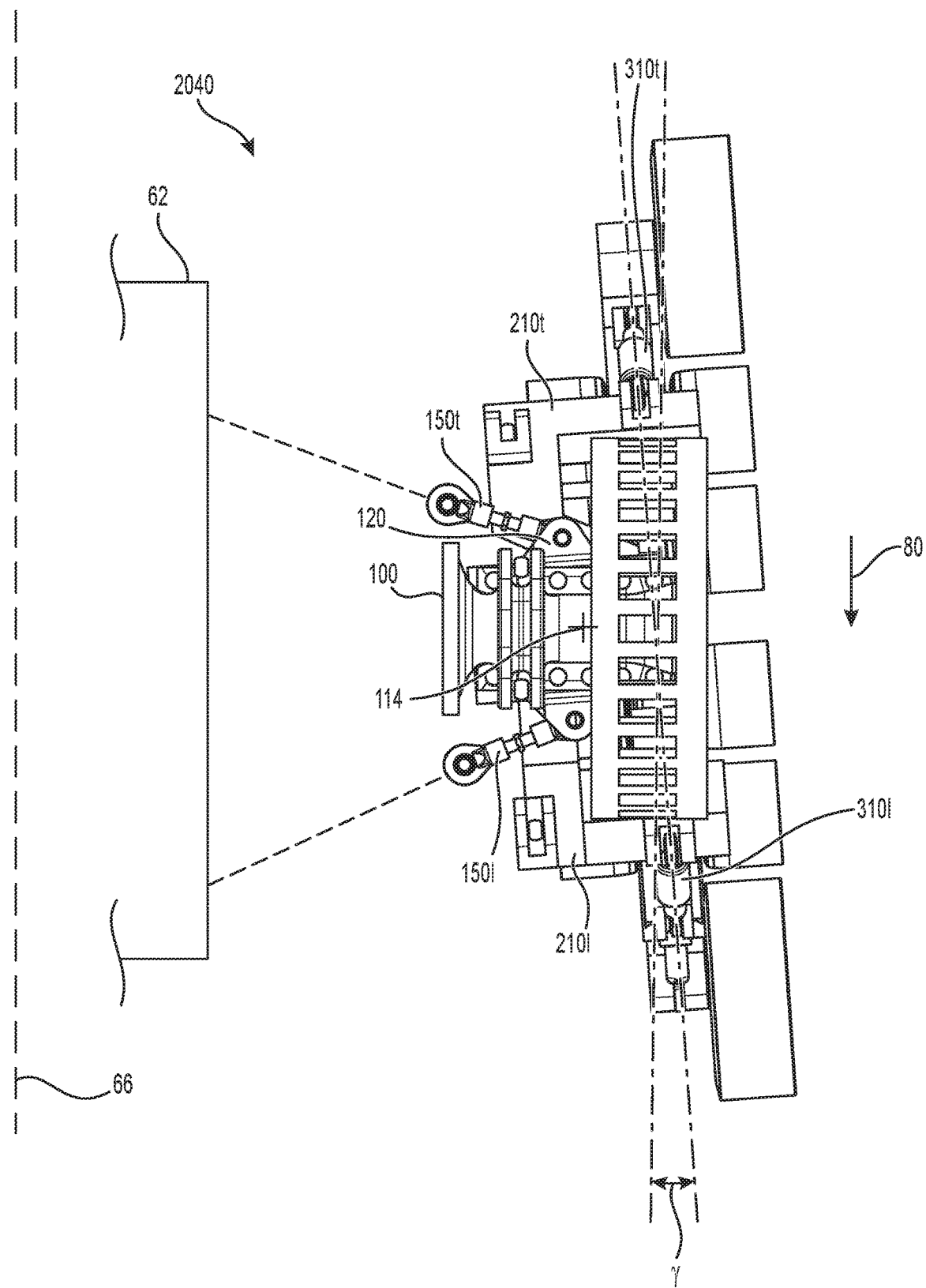
FIG. 10 is a top plan view of the track system of FIG. 7, with the frame assembly and wheel assemblies pivoted at a toe-out angle.
Figure 11:
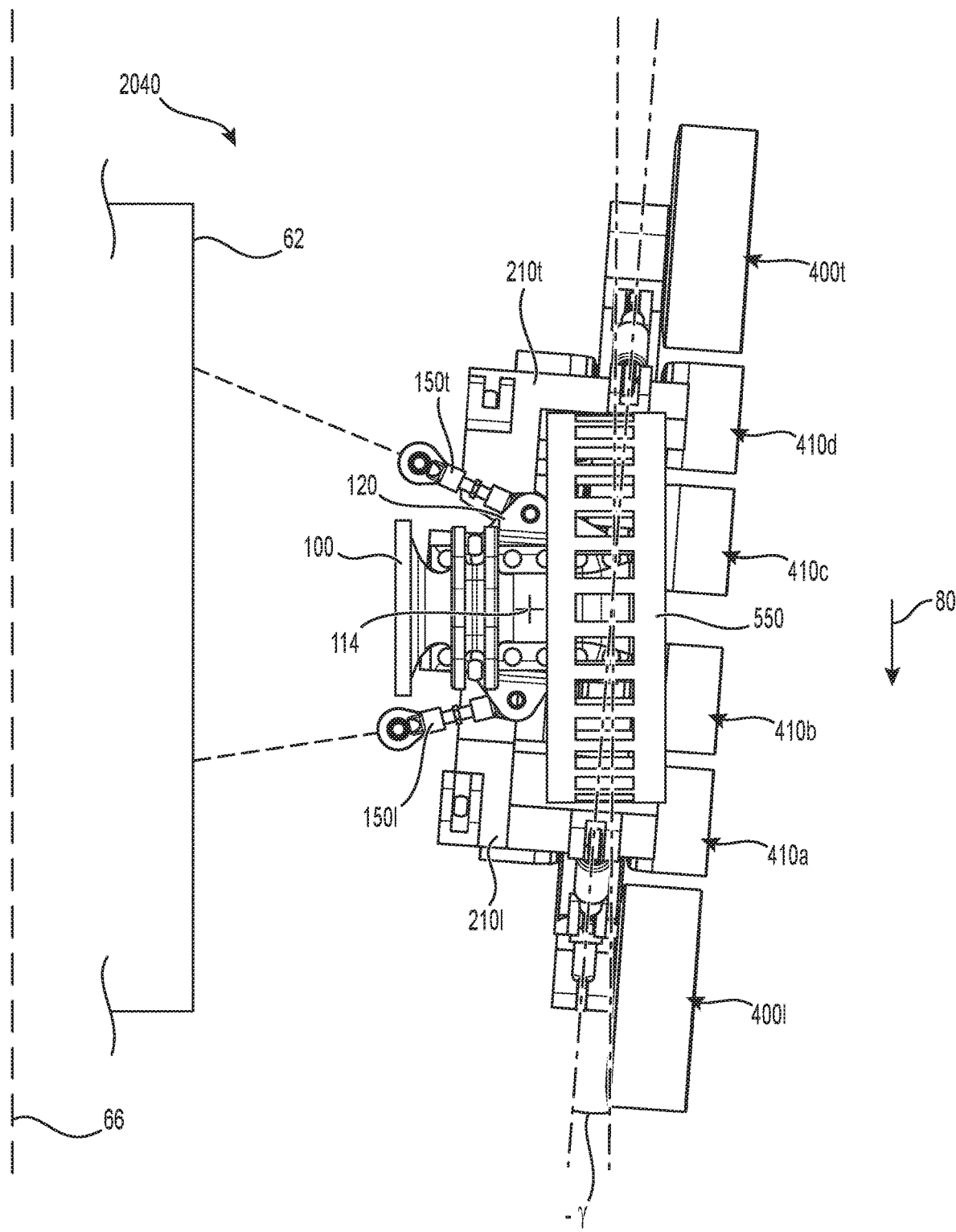
FIG. 11 is a top plan view of the track system of FIG. 7, with the frame assembly and wheel assemblies pivoted at a toe-in angle.
Figure 12:
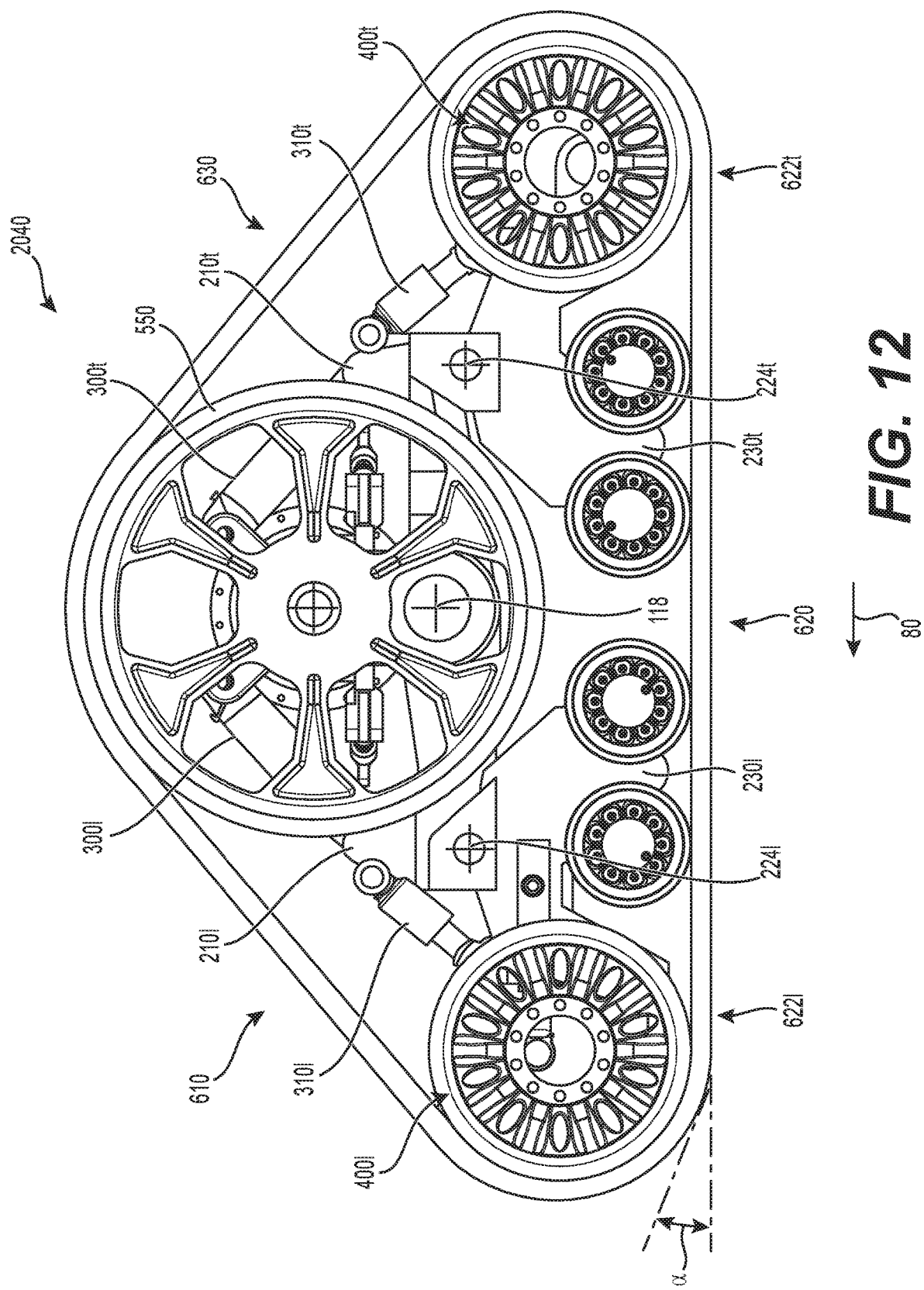
FIG. 12 is a left side elevation view of the track system of FIG. 7.

By selectively extending and retracting the tie rod assemblies, 150*l*, 150*t*, the tracking angle γ of the track systems 40, 2040 can be adjusted. Referring to FIG. 11, retracting the leading tie rod assembly 150*l* and extending the trailing tie rod assembly 150*t* pivots the base 120 relative to the chassis 62 (schematically shown in FIG. 11) and the axle casing 100 about the yaw pivot axis 114, and thus pivoting the leading idler wheel assembly 400*l* towards the center plane 66 of the chassis 62 and the trailing idler wheel assembly 400*t* away from the center plane 66 of the chassis 62. This configuration corresponds to a toe-in angle of −γ. Conversely and as seen in FIG. 10, extending the leading tie rod assembly 150*l* and retracting the trailing tie rod assembly 150*t* pivots the base 120 relative to the chassis 62 (schematically shown in FIG.

10) and the axle casing 100 about the yaw pivot axis 114, and thus pivoting the leading idler wheel assembly 400*l* away from the center plane 66 of the chassis 62 and the trailing idler wheel assembly 400*t* towards the center plane 66 of the chassis 62. This configuration corresponds to a toe-out angle of γ.

In some embodiments, the tie rod assemblies 150*l*, 150*t* can provide for tracking angle adjustment of up to about 10 degrees, that is angle γ equals to about 10 degrees, but larger or smaller angles γ are contemplated in different embodiments. The degree of freedom in yaw motion about the pivot axis 114 permits the track systems 40, 40' (or 2040 and its mirror image connected on the right side of the vehicle 60) to adjust the tracking angle γ depending on, for example, misalignment of the track systems 40, 40' relative to the chassis 62 of the vehicle 60.

In other embodiments, the tie rod assemblies 150*l*, 150*t* are replaced by actuators, which can include electric, hydraulic or pneumatic linear actuators which can be actively controlled for dynamically adjusting the tracking angle γ. In other embodiments, the actuator is a stepper motor operatively connected between the axle casing 100 and the base 120 which provides rotational motion therebetween about the yaw pivot axis 114. In such embodiments, the adjustment of the tracking angle γ can depend on, for example, temperature of certain portions of the endless track 600, ground surface conditions and the load of the vehicle 60. As such, premature wear of the endless track 600 and of other components of the track system 40 could be reduced compared to conventional track systems. Moreover, adjustment of the tracking angle γ can also assist in preserving the integrity of the soil on which the track systems 40, 2040 travel, under certain conditions.

In embodiments where tie rod assemblies 150*l*, 150*t* are replaced by actuators and the track system 40 is steerable, for example when operatively connected to a steerable component of the chassis 62, the actuators could be operatively connected to the steering system of the vehicle 60 so as to provide better steering control under some circumstances.

Leading and Trailing Frame Members

Referring back to FIGS. 8 and 9, the leading and trailing frame members 210*l*, 210*t* will be described. The leading and trailing frame members 210*l*, 210*t* are pivotably connected to and supported by the pivot 122. In order to facilitate the pivoting of the leading and trailing frame members 210*l*, 210*t* on the pivot 122, bearings (not shown) are disposed between the pivot 122 and each frame member 210*l*, 210*t*. In some embodiments, bushings or tapper rollers could be used in place of bearings. In the present embodiments, the leading and trailing frame members 210*l*, 210*t* have apertures defined by loops 2141, 214*t*. The pivot 122 extends through the apertures of the loops 2141, 214 similar to a pin in a hinge assembly, and provides for a pivoting of the leading and trailing frame members 210*l*, 210*t* about the pitch pivot axis 118.

Referring to FIGS. 3, 8 and 9, the leading and trailing frame members 210*l*, 210*t* of the track systems 40, 2040 define a somewhat scissor-like structure, with each frame member 210*l*, 210*t* pivoting about the pivot 122, and the dampers 300*l*, 300*r* interconnected therebetween and the axle casing 100. Each one of the leading and trailing wheel-bearing members 230*l*, 230*t* is in turn pivotably connected to the leading and trailing frame member 210*l*, 210*t*, respectively. The pivoting of each of these structures may assist in reducing the vertical displacements and vibrations transferred from the track systems 40, 2040 to the chassis 62 of the vehicle 60 under certain conditions. In some embodiments, the track systems 40, 2040 further include bushing assemblies operatively connected between the axle assemblies rotatably connecting the wheel assemblies 400*l*, 400*t*, 410*a*, 410*b*, 410*c*, 410*d* to their corresponding component of the frame assembly 200. The bushing assemblies further assist in reducing the vibrations transferred from the track systems 40, 2040 to the chassis 62 of the vehicle 60 under certain conditions.

In addition, having the track systems 40, 2040 with such a scissor-like structure has other advantages in certain situations. For example, as the weight of the vehicle 60 increases, for example during harvesting or loading operations, the scissor-like structure can open and a ground-contacting portion of the endless track 600 occurs over an increased surface area (i.e. the ground engaging segment 620 increases in size as the load borne by the track systems 40, 2040 increases—at least for some increases in load—depending on the design of a specific track system). As a result, in some circumstances, the pressure applied to the ground by the endless track 600 (owing to the weight and load of the vehicle 60) increases at a lower rate than the weight of the vehicle 60. In certain embodiments, this will allow the track systems 40, 2040 to bear additional loads as compared with conventional track systems.

Leading and Trailing Wheel-Bearing Frame Members and Idler Wheels

Figure 13:
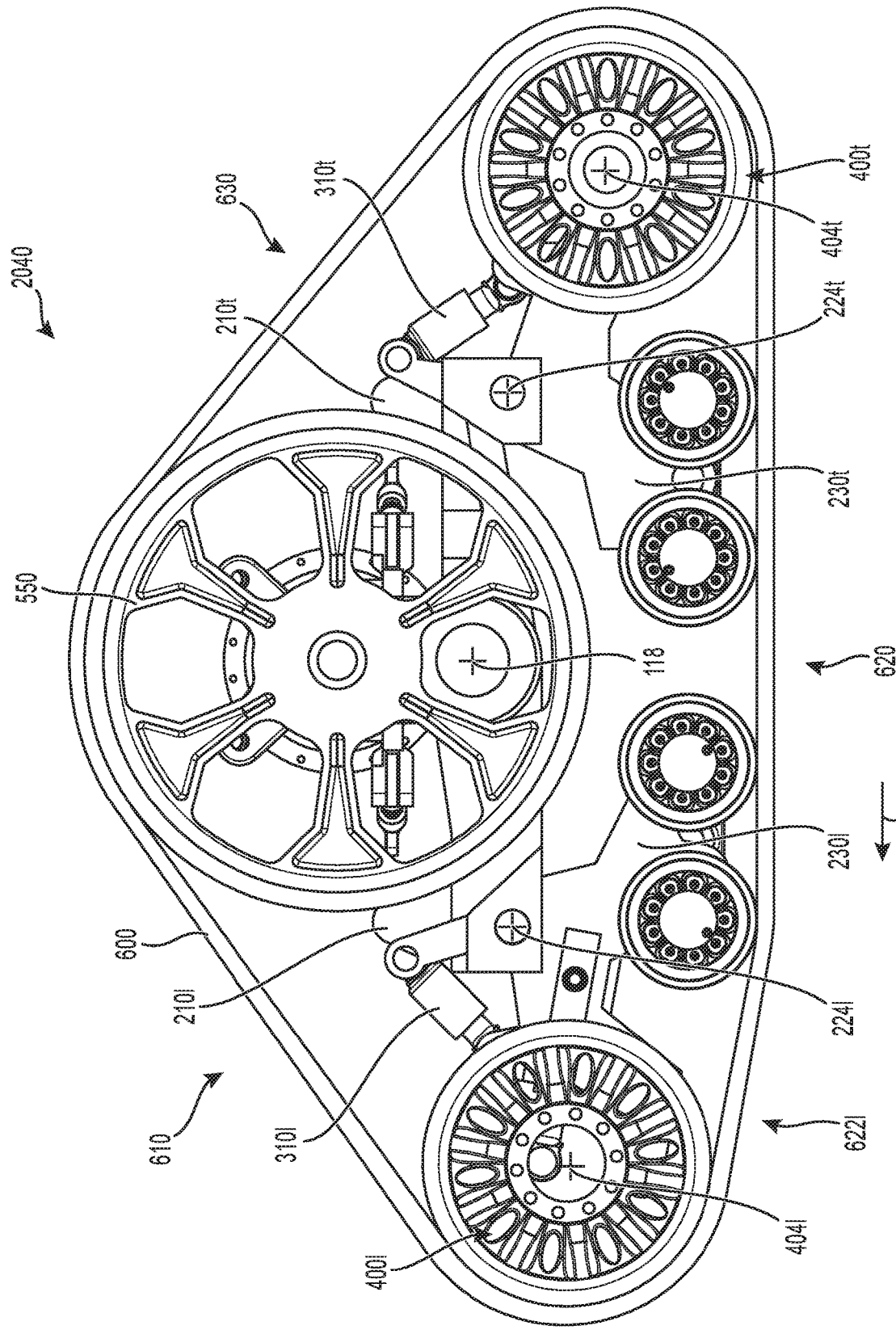
FIG. 13 is a left side elevation view of the track system of FIG. 7, with the leading idler wheel assembly raised.

Referring to FIGS. 8, 9, and 12 to 15, the leading wheel-bearing frame member 230*l* is directly pivotably connected to the leading frame member 210*l* about an axis 224*l*. The leading idler wheel assembly 400*l* is rotatably connected to the leading wheel-bearing frame member 230*l*. The leading idler wheel assembly 400*l* rotates about an axis 4047. A leading idler actuator assembly 310*l* is connected between the leading wheel-bearing frame member 230*l* and the leading frame member 210*l* for adjusting the pivotal positioning of the leading idler wheel assembly 400*l* relative to the leading frame member 210*l*. When the leading idler actuator assembly 310*l* is retracted, as shown in FIG. 13, the leading idler wheel assembly 400*l* pivots about the axis 224*l* (in the clockwise direction in FIG. 13) and is pulled toward the leading frame member 210*l*. When the leading idler actuator assembly 310*l* is retracted, the leading ground engaging segment 622*l* extends above ground (when the track system 2040 is disposed on flat level ground) as shown in FIG. 13. In some circumstances, such as when the track system 2040 has to travel over a bump or has to get out of a pothole or a ditch, raising the leading idler wheel assembly 400*l* may assists in overcoming the bump or getting the track system 2040 out of the pothole or the ditch. In addition, raising the leading idler wheel assembly 400*l* using the actuator 310*l* may prevent undesirable soil compaction as the track system 2040 gets out of a pothole or a ditch compared to conventional track systems where the leading idler wheel assembly 400*l* would remain lowered. In the present embodiment, the leading idler actuator assembly 310*l* also limits the pivotal motion and provides for a dampened pivotal motion of the leading wheel-bearing frame member 230*l* and the leading frame member 210*l* relative to each other about the axis 224*l*. The leading idler actuator assembly 310*l* can also be configured to provide an unbiased pivotal motion of the leading wheel-bearing frame member 230*l* relative to the leading frame member 210*l*.

Figure 14:
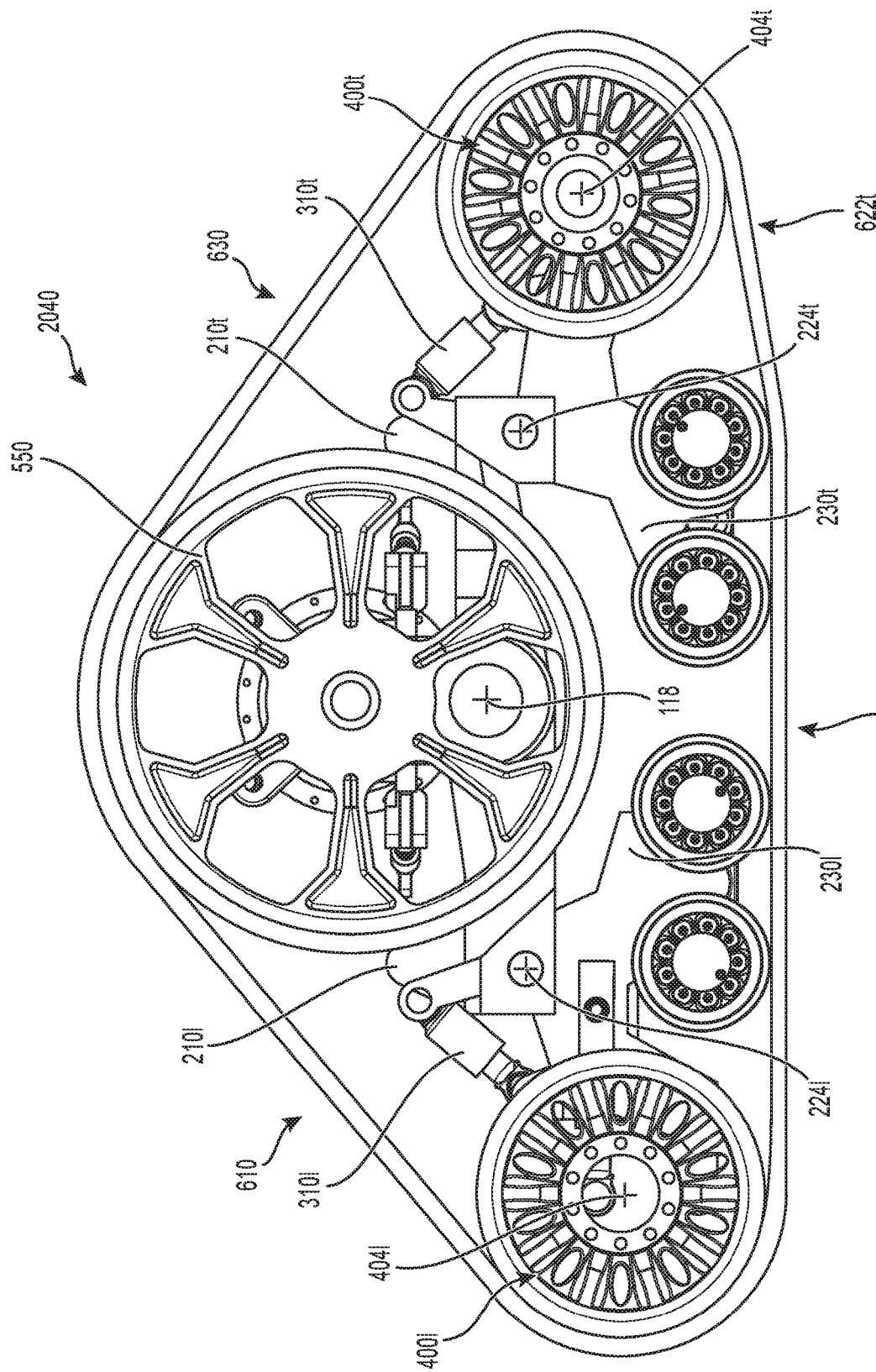
FIG. 14 is a left side elevation view of the track system of FIG. 7, with the trailing idler wheel assembly raised.
Figure 15:
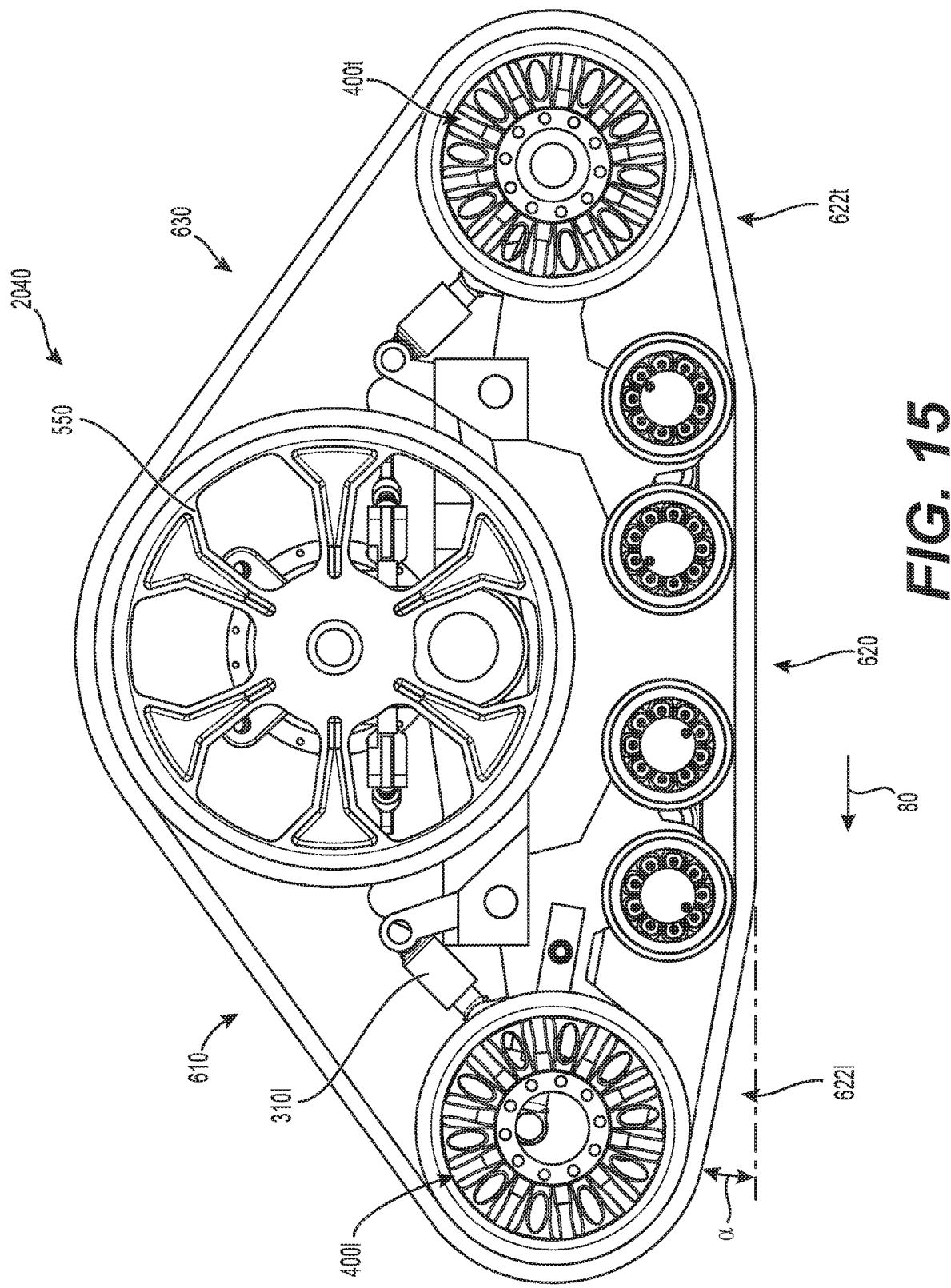
FIG. 15 is a left side elevation view of the track system of FIG. 7, with the leading and trailing idler wheel assemblies raised.

Referring to FIG. 14, the trailing wheel-bearing frame member 230*t* is directly pivotably connected to the trailing frame member 210*l* about an axis 224*t*. The trailing idler wheel assembly 400 is rotatably connected to the trailing wheel-bearing frame member 230t and rotates about an axis 404t. A trailing idler actuator assembly 310t is connected between the trailing wheel-bearing frame member 230t and the trailing frame member 210t for adjusting the pivotal positioning of the trailing idler wheel assembly 400t relative to the trailing frame member 210t. When the trailing idler actuator assembly 310t is retracted, as shown in FIG. 14, the trailing idler wheel assembly 400t pivots about the axis 224t (in the counter-clockwise direction in FIG. 14) and is pulled toward the trailing frame member 210t. When the trailing idler actuator assembly 310t is retracted, the trailing ground engaging segment 622 extends above ground (when the track system 2040 is disposed on flat level ground) as shown in FIG. 14. In some circumstances, such as when the track system 2040 is travelling over a bump or is getting out of a pothole or a ditch, raising the trailing idler wheel assembly 400t may assists in overcoming the bump or getting the track system 40 out of the pothole or the ditch. In the present embodiment, the trailing idler actuator assembly 310t also limits the pivotal motion and provides for a dampened pivotal motion of the trailing wheel-bearing frame member 230t and the trailing frame member 210t relative to each other. The trailing idler actuator assembly 310t can also be configured to provide an unbiased pivotal motion of the trailing wheel-bearing frame member 230t relative to the trailing frame member 210t.

In other embodiments, the actuator assemblies 310l, 310t could be replaced by electric motors, such as stepper motors, or any other suitable device operatively connected between the leading frame member 210l and the leading wheel-bearing frame member 230l, and the trailing frame member 210t and the trailing wheel-bearing frame member 230t for adjusting the pivotal positioning therebetween.

Referring to FIGS. 12 to 15, upon extension or retraction of the actuator assemblies 310l, 310l, the endless track 600 can selectively have the leading ground-engaging segment 622l and/or the trailing ground engaging segment 622t extending on or above the ground surface. Referring to FIG. 15, both the leading and trailing actuator assemblies 310l, 310t are retracted and, as mentioned above, the ground engaging segment 620 is shorter than in the configurations shown in FIGS. 12 to 14. The configuration of FIG. 15 can assist in reducing wear of the endless track 600 when travelling over hard ground surfaces, such as a paved road. As the amount of endless track 600 in ground contact is reduced compared to the configurations shown in FIGS. 12 to 14, rolling resistance of the track system 40 and/or wear of the endless track 600 are reduced under some conditions. In addition, when the leading ground engaging segment 622l extends above ground, an angle of attack a of the endless track 600 when engaging the ground surface is reduced compared to the same angle of attack a in the configuration shown in FIG. 12 where the endless track 600 wraps around the leading idler wheel assembly 400l and contacts the ground. The angle of attack a of the endless track 600 shown in FIG. 15 may reduce wear of the tread 608 under some conditions.

Moreover, steering of the track system 2040 is facilitated when both the leading and trailing actuator assemblies 310l, 310t are retracted, and the track system 2040 has a behavior that is more akin to a wheel and tire assembly. Thus, under certain conditions such as when the track system 2040 travels over hard ground surfaces, configuring the track system 2040 as shown in FIG. 15 may prove to be advantageous over the configuration shown in FIG. 12.

Tensioner

Referring to FIG. 8, the leading wheel-bearing frame member 230l includes a tensioner 420 having first and second ends 422, 424. The first end 422 extends inside a recess 423 of the leading wheel-bearing frame member 230l and is rotatably connected to the leading wheel-bearing frame member 230l. A wheel linkage (not shown) is rotatably connected to the leading wheel-bearing frame member 230l at an axis 430 (shown as a dashed line in FIG. 8) that is offset from the axis 404l. The second end 424 of the tensioner 420 is rotatably connected to the wheel linkage at a distal tensioning pivot which is offset from the axis 404l. A leading axle assembly (not shown) is operatively connected to the wheel linkage and defines the axis 404l. The distal tensioning pivot and the axis 430 are angularly displaced around the axis 404l such that the wheel linkage forms a lever with the axis 430 being the fulcrum thereof.

The action of the tensioner 420 and the wheel linkage bias the leading axle assembly and the leading idler wheel assembly 400l toward the forward end of the track system 2040. In some embodiments, the tensioner 420 is used to reduce the variations in the perimeter of the endless track 600 due to the pivoting of the leading and trailing frame members 210l, 210t and wheel-bearing frame members 230l, 230t. In some embodiments, the tensioner 420 is also operatively connected to the leading idler actuator assembly 310l and/or the trailing idler actuator assembly 310t. When operatively interconnected, the actuator assemblies 310l, 310t and the tensioner 420 are operated in collaborative, synergistic fashion so as to reduce the variations in the perimeter of the endless track 600 and to prevent damage to the endless track 600 and/or any one of the actuator assemblies 310l, 310t and the tensioner 420. In addition, the tensioner 420 can be operated so as to increase tension in the endless track 600 in some circumstances, such as during a hard braking event. An increased tension in the endless track 600 may reduce the risks of lugs 604 of the endless track 600 skipping on the sprocket wheel 550.

In addition, under certain conditions, if debris becomes stuck between one of the wheel assemblies and the endless track 600, the tensioner 420 is configured to apply less biasing force and/or retract so as to reduce variation in the perimeter of the endless track 600. When debris are ejected from the track system 40, the tensioner 420 is configured to apply more biasing force and/or extend to provide for adequate tension forces in the endless track 600.

In some embodiments, the tensioner 420 is a dynamic tensioning device as described in commonly owned International Patent Application No. PCT/CA2016/050419, filed Apr. 11, 2016, entitled "Dynamic Tensioner Locking Device for a Track System and Method Thereof", and published as WO 2016/161528. The content of this application is incorporated herein by reference in its entirety.

Support Wheel Assemblies

Figure 6:
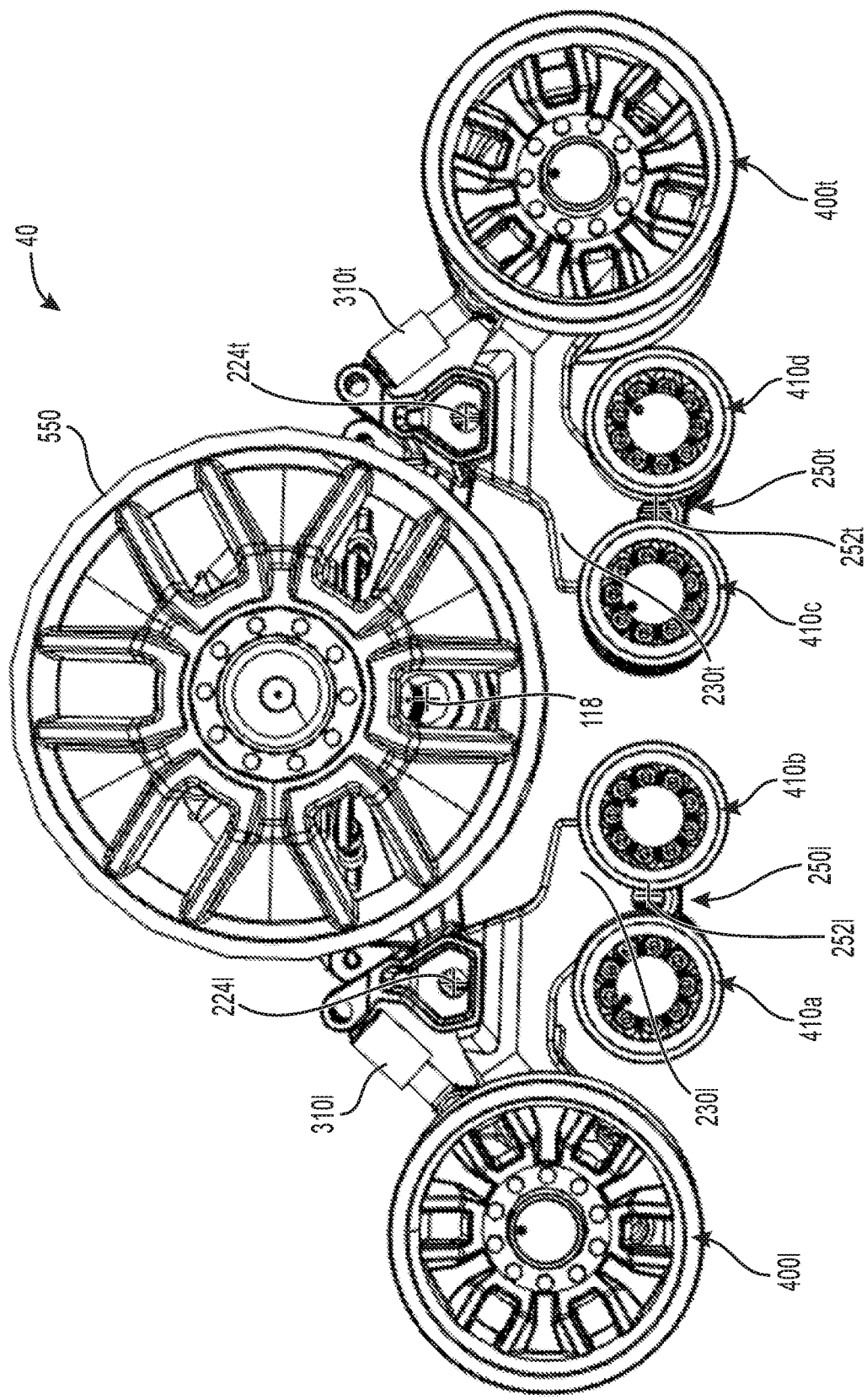
FIG. 6 is a left side elevation view of the track system of FIG. 4.
Figure 7:
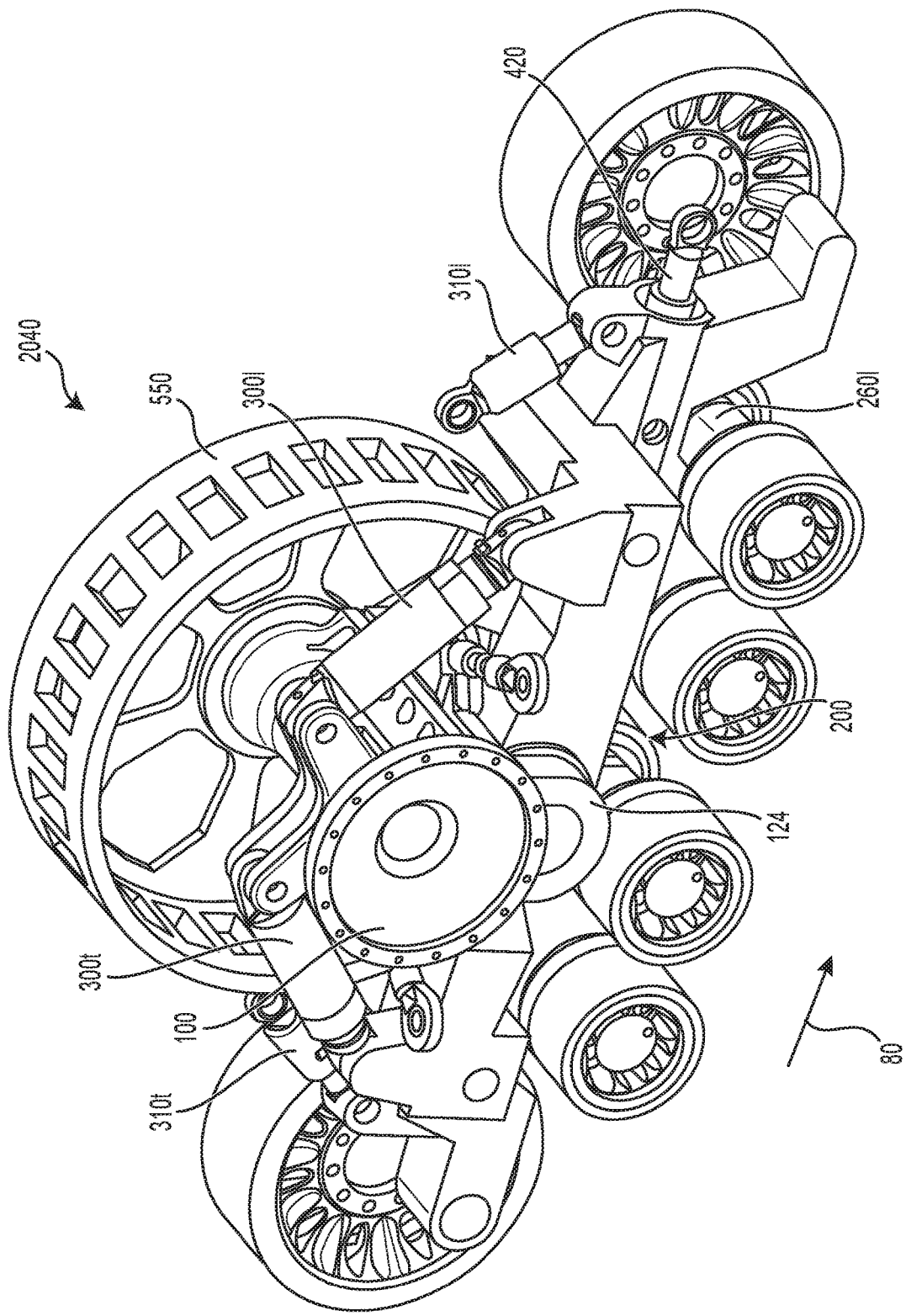
FIG. 7 is a perspective view taken from a top, front, right side of a track system being a second embodiment of the present technology, the track system being configured to be operatively connected on a left side of a vehicle, with the leading and trailing idler wheels and the endless track being omitted.

Referring to FIGS. 6 and 9, the support wheel assemblies 410a, 410b are rotatably connected to the bogie member 260l, which is pivotably connected to the leading wheel-bearing frame member 230l about the axis 252l and thus forming the leading tandem assembly 250l. As such, the support wheel assemblies 410a, 410b are indirectly pivotably connected to the leading wheel-bearing frame member 230l. Similarly, the support wheel assemblies 410c, 410d are rotatably connected to the bogie member 260t, which is pivotably connected to the trailing wheel-bearing frame member 230t about the axis 252t and thus forming the trailing tandem assembly 250t. As such, the support wheel assemblies 410c, 410d are indirectly pivotably connected to the trailing wheel-bearing frame member 230t.

Material and Manufacturing

The various components of the track systems 40, 2040 are made of conventional materials (e.g. metals and metal alloys in most cases, such as steel) via conventional manufacturing processes (e.g. casting, molding, etc.). The present technology merely requires that each component be suitable for the purpose for which it is intended and the use to which it is to be put. Any material(s) or method(s) of manufacture which produce such components may be used in the present technology.

Sprocket Wheel

Referring to FIGS. 8 and 9, the sprocket wheel 550 of the track systems 40, 2040 has the feature of having a rim 552 defining apertures 554 dimensioned for engagement of the lugs 604 therein located inward of the spokes 560. This feature may assist in allowing embodiments of track systems 40, 2040 to be efficiently mechanically packaged, in embodiments where such is judged to be important. Furthermore, this feature may also reduce mud ingress and build-up in some areas of the track systems 40, 2040 in some circumstances. This is in turn may lead to reduced maintenance and a reduced risk of premature wear of different components of the track systems 40, 2040 compared to conventional track systems.

General Description of the Track System in Accordance with a Third Embodiment of the Present Technology With reference to FIGS. 16 to 22, a third embodiment of the present technology, track system 3040, is illustrated. It is to be expressly understood that the track system 3040 is also merely an embodiment of the present technology. The track system 3040 includes some elements that are the same as or similar to those described with reference to the track systems 40, 2040. Therefore, for simplicity, elements of the track system 3040 that are the same as or similar to those of the track systems 40, 2040 have been labeled with the same reference numerals, and will not be described again in detail, unless mentioned otherwise. Adaptations are of course understood to be possible for the components to fit their purpose in each of the embodiments of the track system 40, 2040, 3040.

Figure 16:
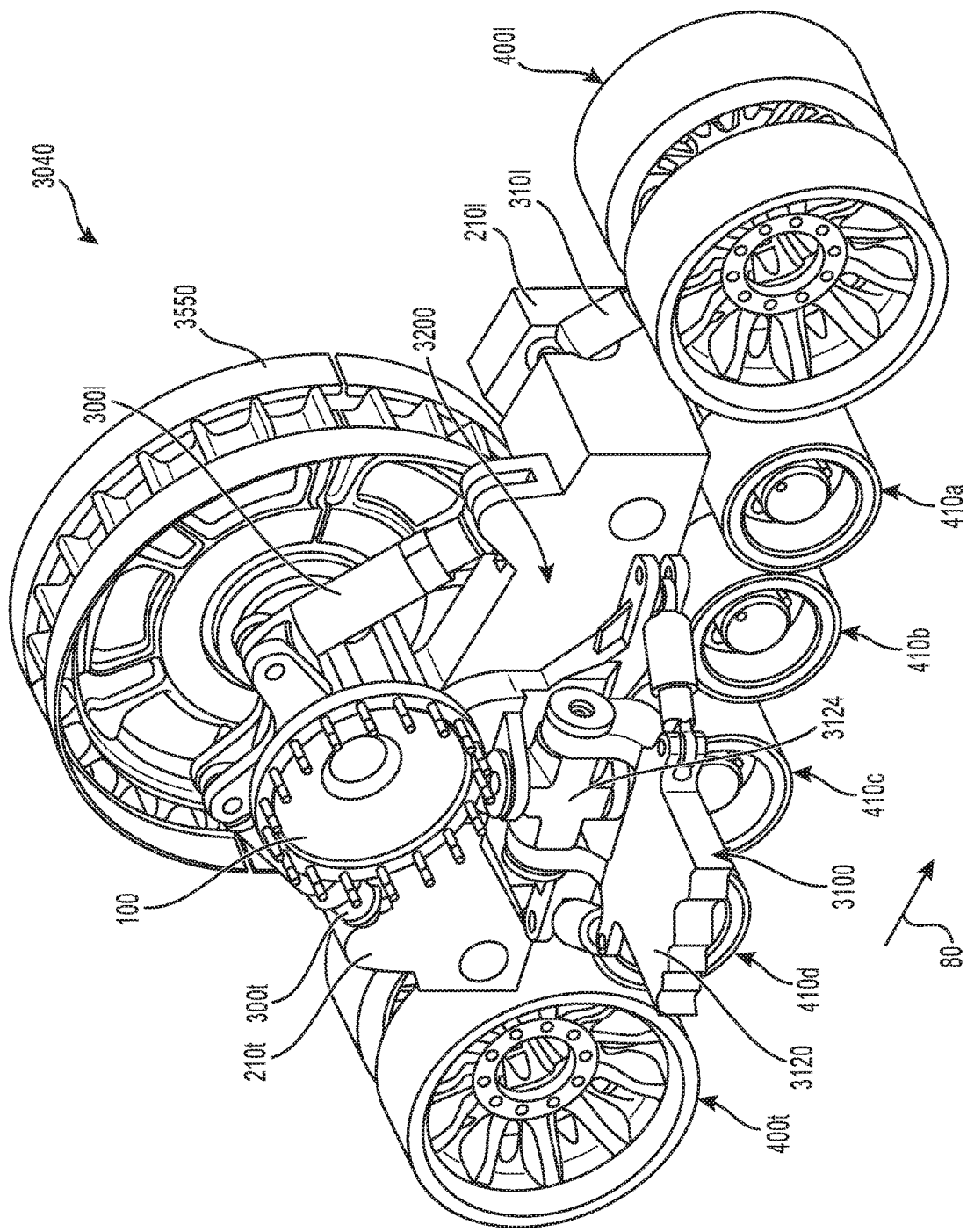
FIG. 16 is a perspective view taken from a top, front, right side of a track system being a third embodiment of the present technology, the track system being configured to be operatively connected on a left side of a vehicle, the endless track being omitted.
Figure 17:
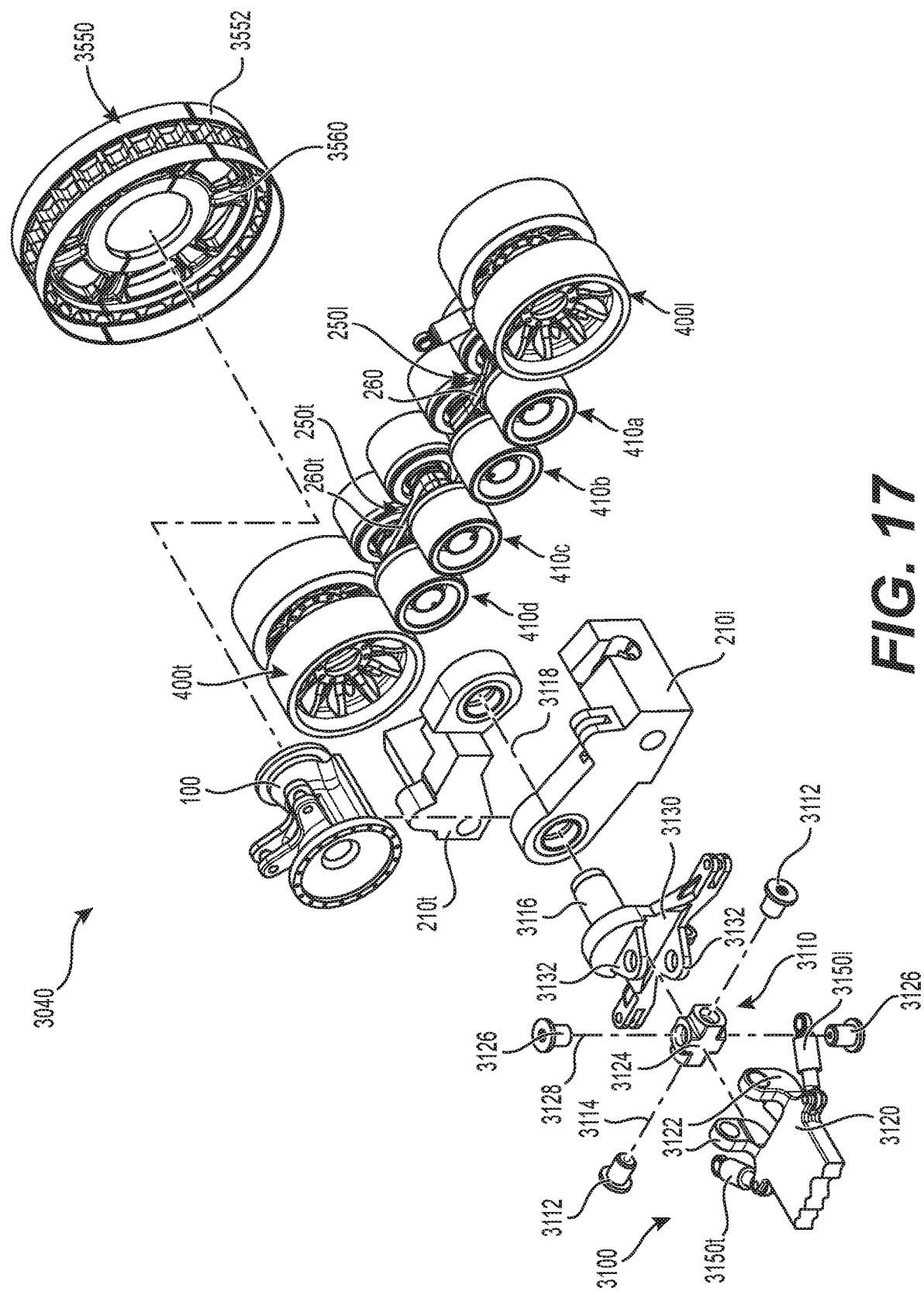
FIG. 17 is a partially exploded, perspective view taken from a top, front, right side of the track system of FIG. 16.
Figure 18:
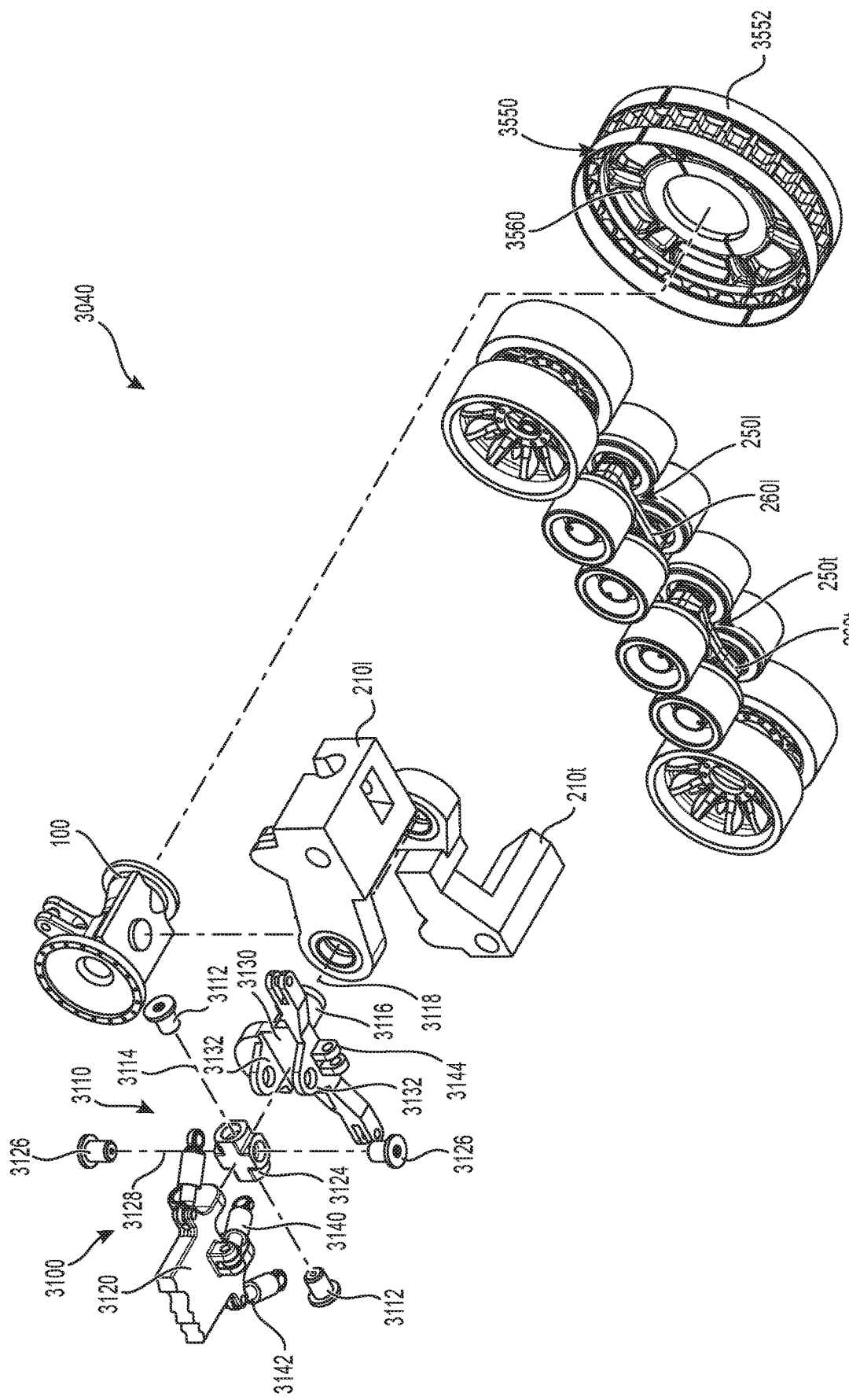
FIG. 18 is a partially exploded, perspective view taken from a bottom, front, right side of the track system of FIG. 16.

Referring to FIGS. 16 to 18, the track system 3040 includes an attachment assembly 3100 connectable to the chassis 62 of the vehicle 60. The attachment assembly 3100 includes a multi-pivot assembly 3110 having longitudinally extending pivots 3112. The pivots 3112 define a roll pivot axis 3114 of the track system 3040 (shown as a dashed line in FIGS. 17 and 18). The multi-pivot assembly 3110 further has a pivot 3116 extending laterally outwardly. The pivot 3116 defines a pitch pivot axis 3118 of the track system 3040.

The track system 3040 further includes a frame assembly 3200 disposed laterally outwardly from the attachment assembly 3100 (FIG. 16) and connected thereto. The frame assembly 3200 is a multi-member frame assembly and includes leading and trailing frame members 210*l*, 210*t* of similar configuration and structure as the ones described with regard to the track system 40, 2040. The leading frame member 210*l* is pivotably connected to the attachment assembly 3100 via the pivot 3116 for pivoting about the pitch pivot axis 3118 (FIG. 17), and the trailing frame member 210*r* is pivotably connected to the attachment assembly 3100 via the pivot 3116 for pivoting about the pitch pivot axis 3118 (FIG. 17) independently from the leading frame member 210*l*. In other embodiments, the frame assembly 3200 could be formed of a single frame member connected to the attachment assembly 3100 and pivoting about the pitch pivot axis 3118. The multi-member frame assembly 3200 also includes leading and trailing wheel-bearing frame members (not shown) pivotably connected to the leading and trailing frame members 210*l*, 210*l* respectively. The track system 3040 further has idler and support wheel assemblies 400*l*, 400*t*, 410*a*, 410*b*, 410*c*, 410*d*, tandem assemblies 250*l*, 250*l* and idler actuator assemblies (only the leading idler actuator assembly 310*l* is shown) similarly arranged to that of the track systems 40, 2040. Thus, the track system 3040 has the ability to raise and lower the leading and trailing idler wheel assemblies 400*l*, 400*t* as described above in reference to the track systems 40, 2040. The track system 3040 can thus have a variable length of the ground engaging segment 620 (not shown in FIGS. 16 to 22) of the endless track 600 in contact with the ground surface.

An axle casing 100 is located above the frame assembly 3200 and permits the operative connection of the drive shaft 64 of the vehicle 60 to a sprocket wheel 3550. It is noted that in the present embodiment, the drive shaft 64 of the vehicle 60 does not bear a material portion of the weight of the vehicle 60 but only transmits rotational forces to the sprocket wheel 3550 which does not bear a material portion of the weight of the vehicle 60 either. It is also noted that the sprocket wheel 3550 is differently constructed and differently structured compared to the sprocket wheel 550 of the track systems 40, 2040. The sprocket wheel 3550 has spokes 3560 located along a center plane of the rim 3552. Leading and trailing dampers 300*l*, 300*t* are operatively connected between the axle casing 100 and the leading and trailing frame members 210*l*, 210*t* respectively.

Still referring to FIGS. 16 to 18, the attachment assembly 3100 will be described. The multi-pivot assembly 3110 has a yoke 3120. The yoke 3120 is connectable to the chassis 62 of the vehicle 60. In the present embodiment, the yoke 3120 is connectable to an underside of the chassis 62, but could be configured and structured to be connected to the chassis 62 otherwise. The yoke 3120 has longitudinally spaced apart tabs 3122 (FIG. 17). A pivot arm 3124 is pivotably connected to the tabs 3122 of the yoke 3120 by the longitudinally extending pivots 3112. The pivot arm 3124 is a cruciform member connected simultaneously to the pivots 3112 and to generally vertically extending pivots 3126. The pivots 3126 define a yaw pivot axis 3128 of the track system 3040 (shown as a dashed line in FIGS. 17 and 18).

The pivot arm 3124 is further pivotably connected to a plate 3130 having vertically spaced apart tabs 3132. Through the pivots 3126, the plate 3130 is pivotable about the yaw pivot axis 3128 relative to the pivot arm 3124, and so the plate 3130 is thus pivotable relative to the yoke 3120 about the roll and yaw pivot axes 3114, 3128. It is to be noted that in the present embodiment, the yaw pivot axis 3128 extends in a direction parallel to the longitudinal center plane 66 and along a height direction of the track system 3040 that is perpendicular to flat level ground. In another embodiment, the yaw pivot axis 3128 could extend not perpendicularly to flat level ground and could be skewed forward or rearward so as to define a positive or negative caster angle of the track system 3040. In another embodiment, the pivot arm 3124 is structured such that the roll pivot axis 3114 is skewed with respect to the longitudinal center plane 66 and not extending parallel thereto.

As best seen in FIGS. 17 and 18, the plate 3130 has the pivot 3116 projecting therefrom and extending laterally outwardly from the attachment assembly 3100. The pivot 3116 is connected to the outward face of the plate 3130. The pivot 3116 can be connected to the plate 3130 using fasteners and/or any bonding techniques such as welding. In some embodiments, the pivot 3116 is integrally formed with the plate 3130. Loads on the chassis 62 of the vehicle 60 (including the vehicle's weight) are transferred to the plate 3130 via the yoke 3102 when connected to the chassis 62. Loads are then transferred to the pivot 3116 and then to the leading and trailing frame members 210l, 210t, and so on.

As will be described in more details below, the roll, pitch and yaw pivot axes 3114, 3118, 3128 permit degrees of freedom of the track system 3040 relative to the chassis 62 of the vehicle 60 that can assist the endless track 600 (not shown in FIGS. 16 to 22) to better conform to the ground surface on which it travels and in turn distribute more evenly the load on the entire surface of the ground engaging segment 620 of the endless track 600.

Figure 21:
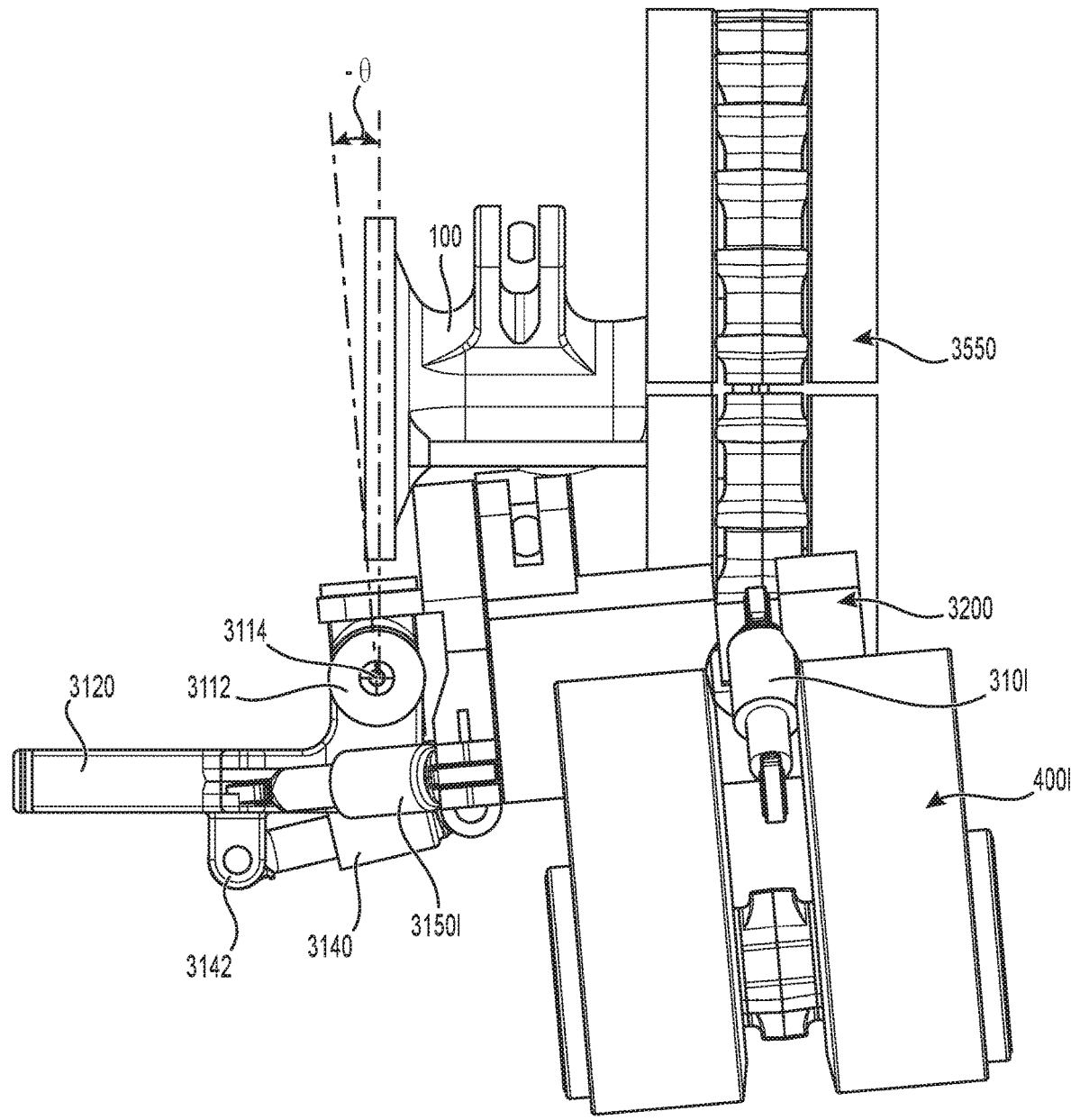
FIG. 21 is a front elevation view of the track system of FIG. 16, with the frame assembly and wheel assemblies pivoted at a negative camber angle.
Figure 22:
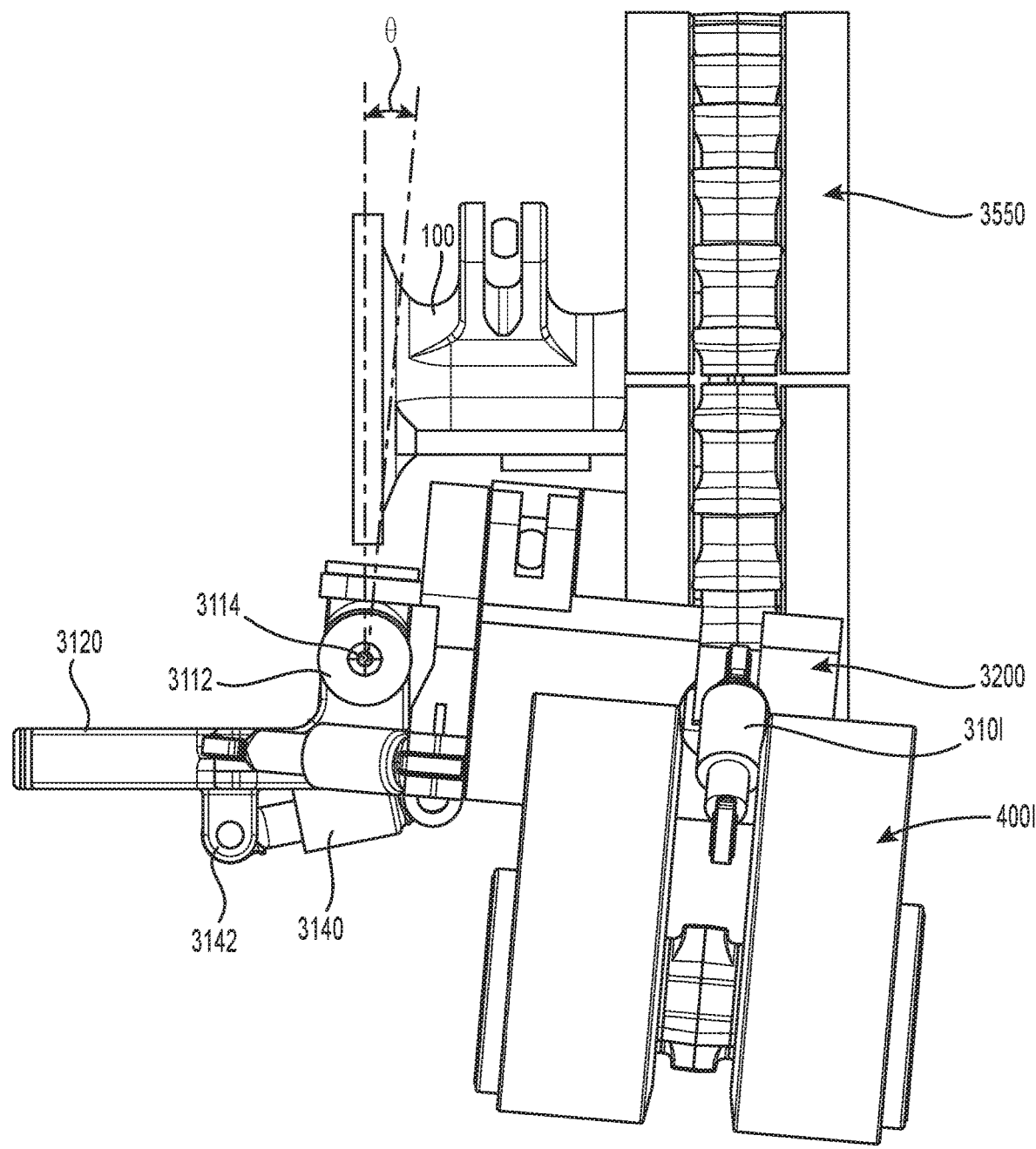
FIG. 22 is a front elevation view of the track system of FIG. 16, with the frame assembly and wheel assemblies pivoted at a positive camber angle.

The attachment assembly 3100 further has a camber angle adjusting actuator 3140 operatively connected between downwardly projecting tabs 3142 (FIG. 18) of the yoke 3120 and downwardly projecting tabs 3144 of the plate 3130. The camber angle adjusting actuator 3140 is thus downwardly offset of the pivot axes 3114, 3118. The actuator 3140 is a telescopic linear actuator. Referring to FIGS. 21 and 22, retraction and extension of the actuator 3140 causes pivoting of the frame assembly 3200 and wheel assemblies 400l, 400t, 410a, 410b, 410c, 410d about the roll pivot axis 3114 so as to adopt a negative camber angle −θ (FIG. 21) or a positive camber angle θ (FIG. 22). In some embodiments, the camber angle adjusting actuator 3140 can provide for camber angle adjustment of up to about 10 degrees, that is angle θ equals to about 10 degrees, but larger or smaller angles θ are contemplated in different embodiments.

As best seen in FIG. 21, extension of the actuator 3140 causes the track system 3040 to adopt a negative camber angle −θ. Conversely and as seen in FIG. 22, retraction of the actuator 3140 causes the track system 3040 to adopt a positive camber angle θ. As such, the track system 3040 has a range of roll motion about the pivot axis 3114 from about −10 degrees to 10 degrees for adjusting the camber angle of the track system 3040. The degree of freedom in roll motion about the pivot axis 3114 permits the track system 3040 to better conform to a ground surface which is inclined laterally and that defines, for example, a crowned road or a shallow ditch.

As such, the load supported by the frame assembly 3200 is more evenly distributed between the inward and outward wheels of the idler and support wheel assemblies 400l, 400t, 410a, 410b, 410c, 410d. This more even distribution of the load can reduce wear of the endless track 600 as a majority of the area of the ground engaging segment 620 is in ground contact instead of just an area below the inward or outward wheels. Wear of the bearings and axle assemblies of each one of the idler and support wheel assemblies 400l, 400t, 410a, 410b, 410c, 410d is also reduced compared to track systems that do not have a degree of freedom in roll motion.

In other embodiments, the actuator 3140 is replaced by a stepper motor or by any other devices capable of adjusting the positional relationship about the roll pivot axis 3114 between the attachment assembly 3100 and the frame assembly 3200. Thus, the actuator 3140 could be replaced by a stepper motor which could adjust the positional relationship by rotating the frame assembly 3200 relative to the attachment assembly 3100 about the roll pivot axis 3114.

Figure 19:
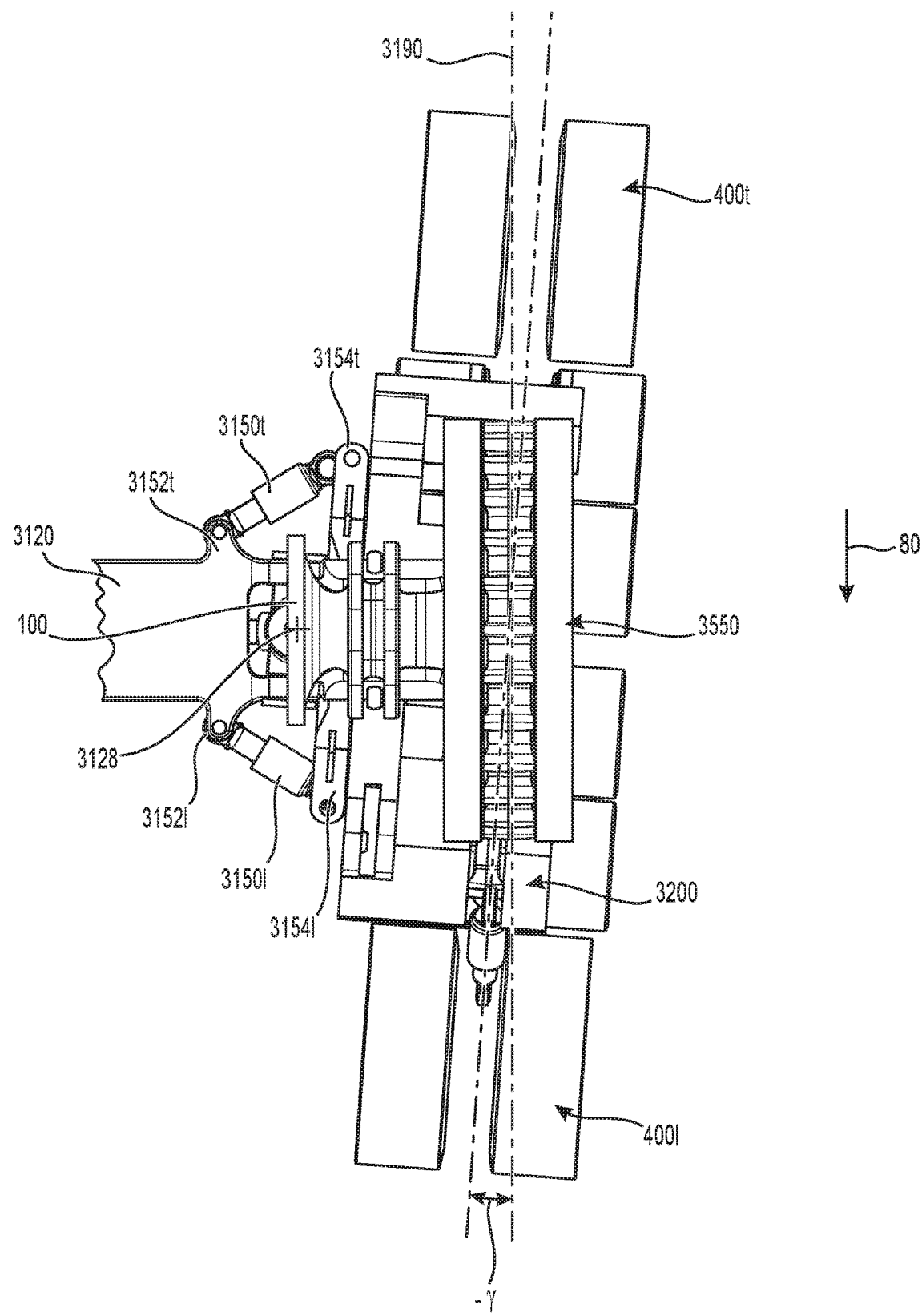
FIG. 19 is a top plan view of the track system of FIG. 16, with the frame assembly and wheel assemblies pivoted at a toe-in angle.
Figure 20:
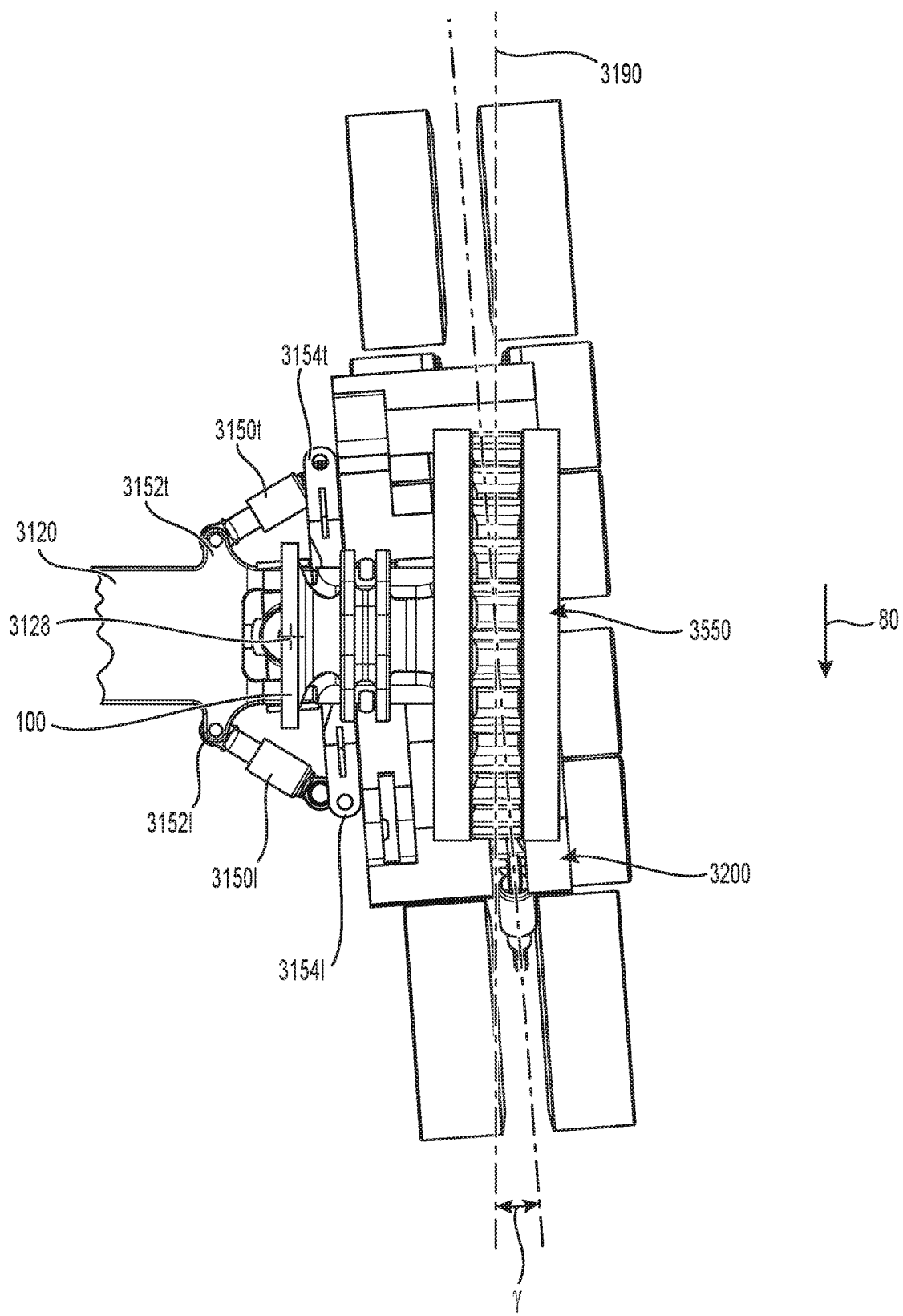
FIG. 20 is a top plan view of the track system of FIG. 16, with the frame assembly and wheel assemblies pivoted at a toe-out angle.

Referring to FIGS. 19 and 20, the attachment assembly 3100 further has a leading tracking adjusting actuator 3150l operatively connected between forwardly projecting tabs 3152l of the yoke 3120 and forwardly projecting tabs 3154l of the plate 3130, and a trailing tracking adjusting actuator 3150t operatively connected between rearwardly projecting tabs 3152t of the yoke 3120 and rearwardly projecting tabs 3154t of the plate 3130. The leading and trailing tracking adjusting actuators 3150l, 3150t are thus longitudinally offset of the pivot axis 3118.

Referring to FIG. 19, retraction of the actuator 3150l and extension of the actuator 3150t cause pivoting of the track system 3040 about the pivot axis 3128 so as to adopt a toe-in angle −γ (i.e. the leading idler wheel assembly 400l is pivoted inwards and towards the chassis 62 of the vehicle 60) relative to a plane 3190, which extends parallel to a longitudinal direction of the track system 3040, parallel to the center plane 66 of the vehicle 60 and parallel to a height direction of the track system 3040. Referring to FIG. 20, extension of the actuator 3150 and retraction of the actuator 3150t cause pivoting of the track system 3040 about the pivot axis 3128 so as to adopt a toe-out angle γ (i.e. the leading idler wheel assembly 400l is pivoted outwards and away from the chassis 62 of the vehicle 60) relative to the plane 3190. In some embodiments, the actuators 3150l, 3150t can provide for tracking angle adjustment of up to about 10 degrees, that is angle γ equals to about 10 degrees, but larger or smaller angles γ are contemplated in different embodiments. The degree of freedom in yaw motion about the pivot axis 3128 permits the track system 3040 to adjust the tracking angle and reduce wear of the endless track 600 due to a misalignment of the track system 3040. Like the camber angle θ, the toe-in/toe-out angle γ can be dynamically changed using the actuators 3150l, 3150t depending on, for example, temperature of certain portions of the endless track 600, ground surface conditions and the load of the vehicle 60. As such, premature wear of the endless track 600 and other components of the track system 3040 could be reduced compared to conventional track systems. Furthermore, as mentioned above, the selection of the toe-in/toe-out angle γ may also assist in preserving the integrity of the soil.

In addition, in another embodiment, the actuator 3140 is omitted and the camber angle θ is adjustable by simultaneously retracting or extending the actuators 3150l, 3150t. For example, in such an embodiment, simultaneously extending the actuators 3150l, 3150t causes the track system 3040 to adopt a negative camber angle −θ. Conversely, retracting the actuators 3150l, 3150t causes the track system 3040 to adopt a positive camber angle θ. Thus, in this embodiment, the actuators 3150l, 3150t are operable for selectively adjusting both the camber angle θ and the toe-in/toe-out angle γ of the track system 3040.

Moreover, when the track system 3040 is steerable, for example when operatively connected to a steerable component of the chassis 62, the actuators 3150l, 3150/could be operatively connected to the steering system of the vehicle 60 so as to provide better steering control under some circumstances.

Figure 23:
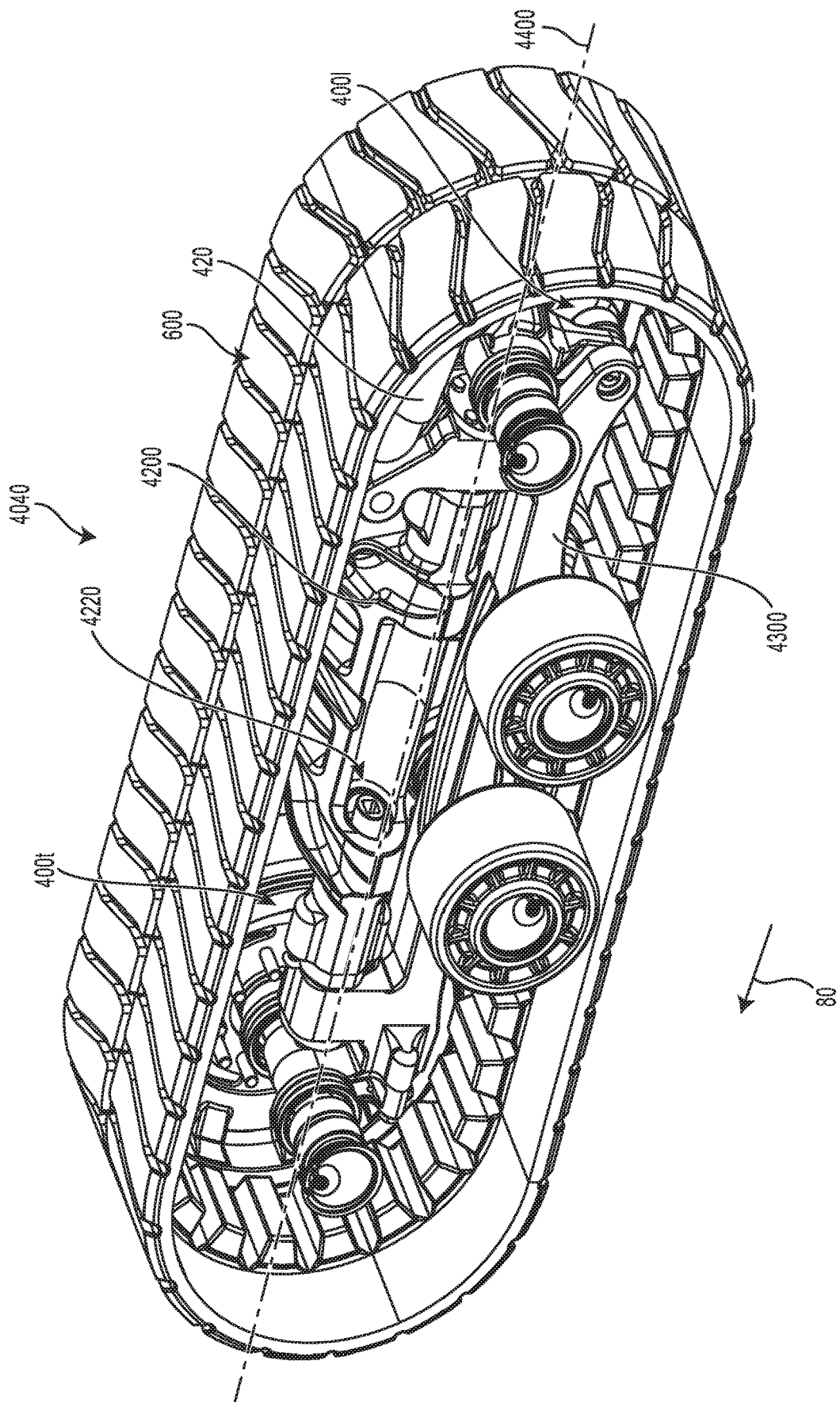
FIG. 23 is a perspective view taken from a top, rear, left side of a track system being a fourth embodiment of the present technology, the track system being configured to be operatively connected on a left side of a vehicle.
Figure 24:
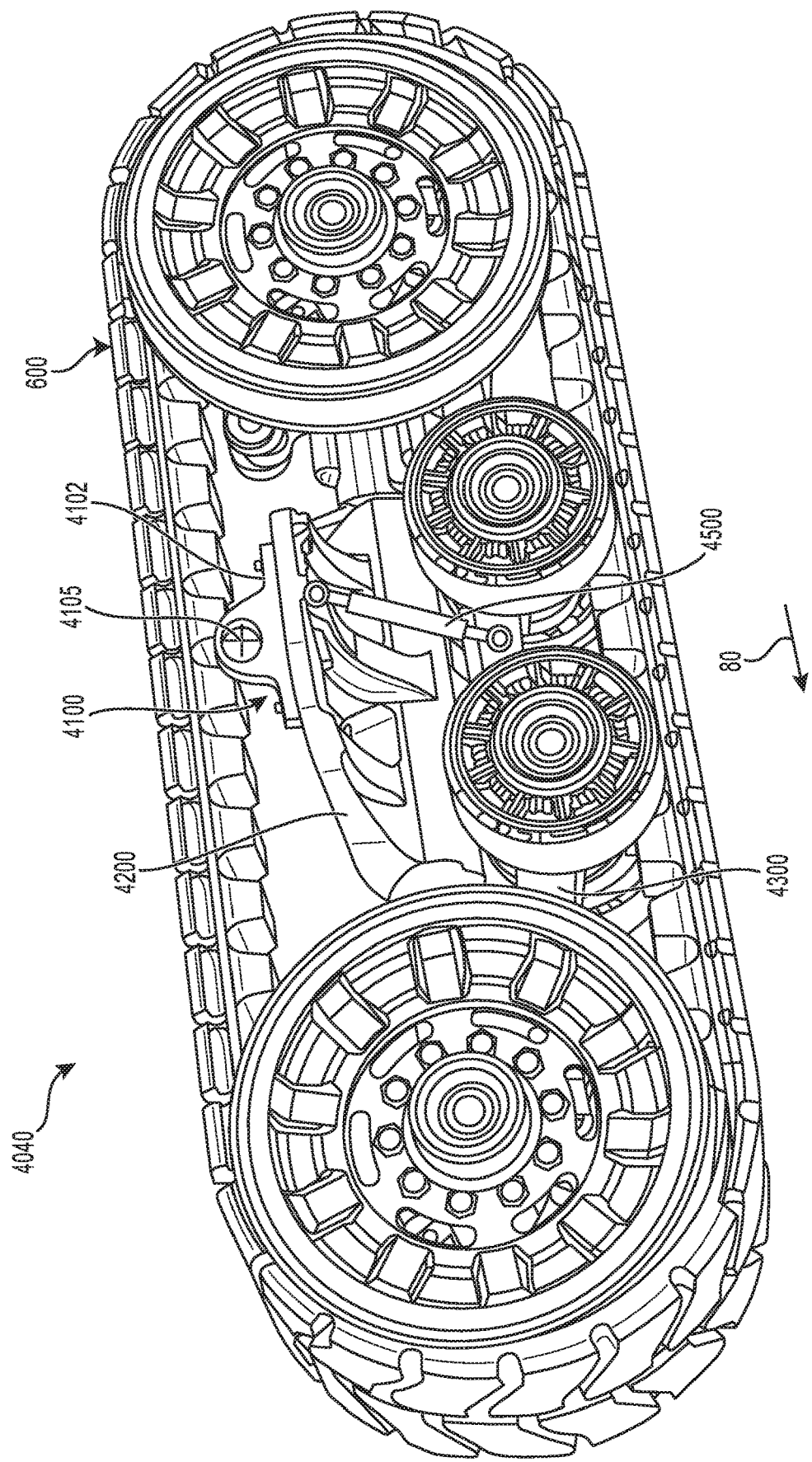
FIG. 24 is a perspective view taken from a rear, right side of the track system of FIG. 23.
Figure 25:
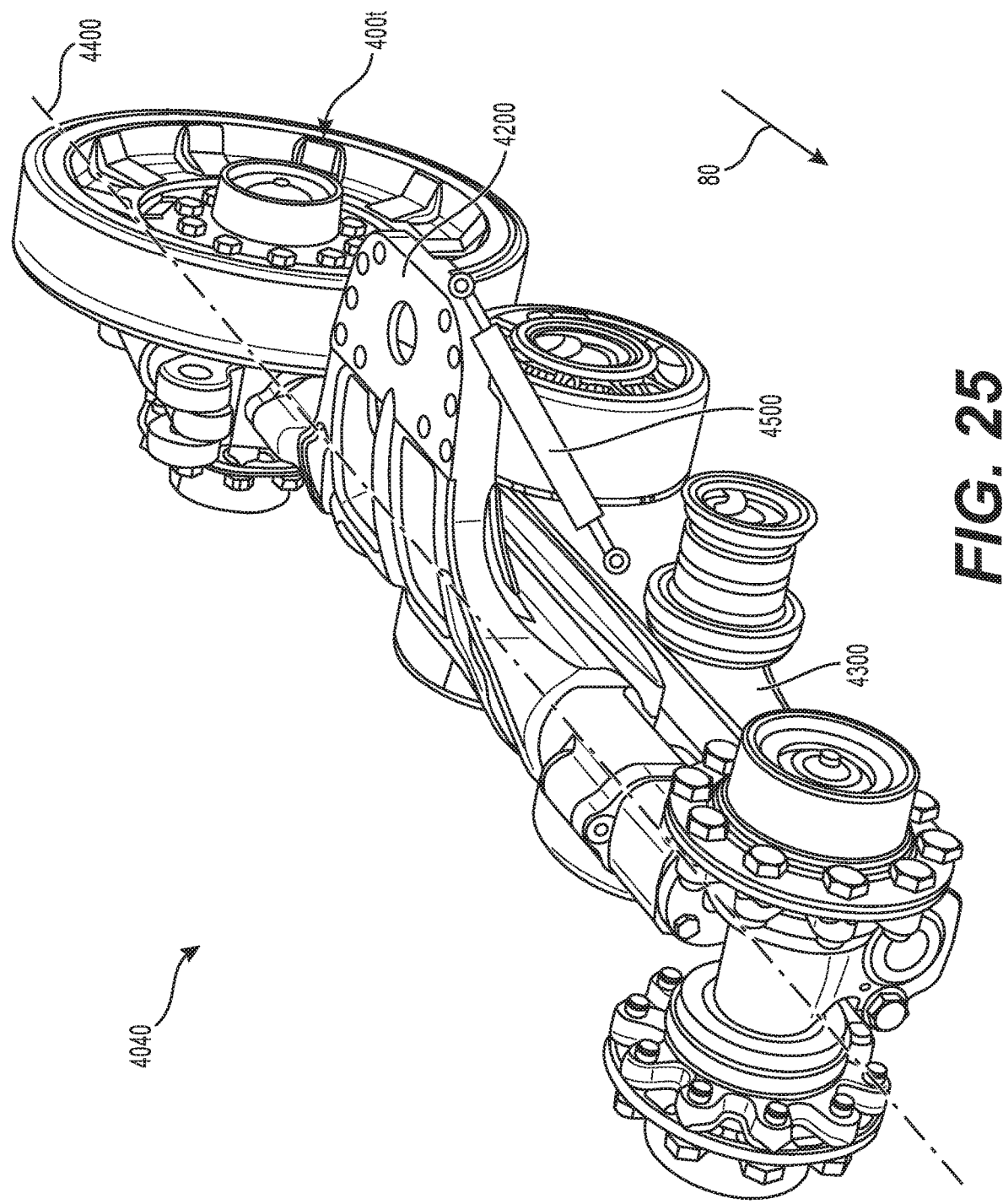
FIG. 25 is a perspective view taken from a top, front, right side of the track system of FIG. 23, with some of the wheel assemblies and the endless track removed.

General Description of the Track System in Accordance with a Fourth Embodiment of the Present Technology With reference to FIGS. 23 to 25, a fourth embodiment of the present technology, track system 4040, is illustrated. It is to be expressly understood that the track system 4040 is also merely an embodiment of the present technology. The track system 4040 includes some elements that are the same as or similar to those described with reference to the track systems 40, 2040, 3040. Therefore, for simplicity, elements of the track system 4040 that are the same as or similar to those of the track systems 40, 2040, 3040 have been labeled with the same reference numerals, and will not be described again in detail, unless mentioned otherwise. Adaptations are of course understood to be possible for the components to fit their purpose in each of the embodiments of the track system 40, 2040, 3040, 4040.

The track system 4040 is for use with a towed vehicle 60 having a chassis 62 and an axle extending laterally outwardly from the chassis 62 for connection to the track system 4040. The chassis 62 supports the various components of the towed vehicle 60. In some embodiments, the towed vehicle 60 is an agricultural vehicle and supports agricultural implements such as planters, sprayers or similar devices. However, the track system 4040 could be used on many different types of towed vehicles that serve many different functions. The track system 4040 does not have a sprocket wheel and has a pill shape when viewed from the side.

Referring to FIGS. 23 to 25, the track system 4040 includes an attachment assembly 4100 (shown in FIG. 24) connectable to the chassis 62 of the vehicle 60. The attachment assembly 4100 includes a pillow block bearing assembly 4102. The pillow block bearing assembly 4102 has an axis 4105. When the track system 4040 is connected to the vehicle 60, the axle extending laterally outwardly from the chassis 62 is coaxial with the axis 4105, and is operatively connected to the pillow block bearing assembly 4102. The track system 4040 is rotatable about the axis 4105 with respect to the chassis 62 of the vehicle 60 since the axle is received inside the pillow block bearing assembly 4102. As such, when the vehicle 60 is towed on a slopped terrain, the track system 4040 can pitch positively or negatively about the axis 4105 to conform to the contour of the terrain.

The attachment assembly 4100 is connected to an outwardly extending bracket 4200. Cylindrical bushing assemblies (not shown) are provided in longitudinally extending recesses 4220 of the bracket 4200. Pins are connected to the bushing assemblies so as to prevent their rotation with respect to the bushing assemblies. A wheel-bearing frame member 4300 is fixedly connected to the pins. When the endless track 600 travels on a transversally inclined ground surface, such as a crowned road, the wheel bearing frame member 4300 causes twisting in a circumferential direction in the cylindrical bushing assemblies, allowing the wheel-bearing frame member 4300, the wheel assemblies and the endless track 600 to pivot about a roll axis 4400 with respect to the attachment assembly 4100 and the bracket 4200. In some embodiments, the cylindrical bushing assemblies further assist in reducing the vibrations transferred from the track system 4040 to the chassis 62 of the vehicle 60 under certain conditions.

An actuator 4500 is operatively connected between an inward portion of the bracket 4200 and the wheel-bearing frame member 4300. Retraction of the actuator 4500 causes the wheel-bearing frame member 4300 to adopt a positive camber angle θ, by pivoting about the axis 4400. Conversely, extending the actuator 4500 causes the wheel-bearing frame member 4300 to adopt a negative camber angle −θ, by pivoting about the axis 4400. Thus, in this embodiment, the actuator 4500 is operable for selectively adjusting the camber angle θ of the track system 4040.

Figure 26:
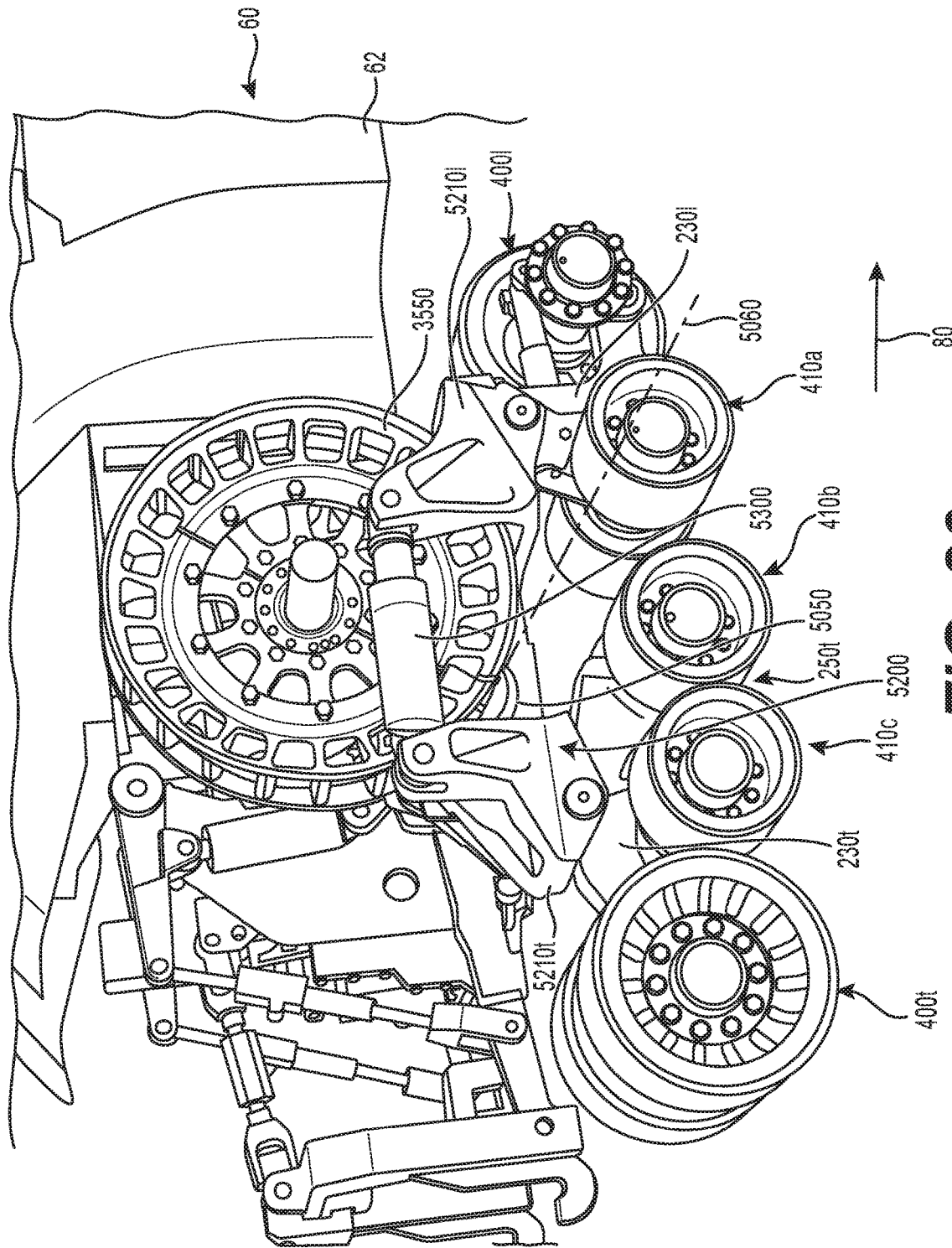
FIG. 26 is a perspective view taken from a top, rear, right side of a track system being a fifth embodiment of the present technology, the track system being operatively connected on a right side of a vehicle, with one of the leading idler wheels and the endless track being removed.

General Description of the Track System in Accordance with a Fifth Embodiment of the Present Technology With reference to FIG. 26, a fifth embodiment of the present technology, track system 5040, is illustrated. It is to be expressly understood that the track system 5040 is also merely an embodiment of the present technology. The track system 5040 includes some elements that are the same as or similar to those described with reference to the track systems 40, 2040, 3040, 4040. Therefore, for simplicity, elements of the track system 5040 that are the same as or similar to those of the track systems 40, 2040, 3040, 4040 have been labeled with the same reference numerals, and will not be described again in detail, unless mentioned otherwise. Adaptations are of course understood to be possible for the components to fit their purpose in each of the embodiments of the track systems 40, 2040, 3040, 4040, 5040.

The track system 5040 has a frame assembly 5200 including leading and trailing frame members 5210*l*, 5210 pivoting about a pivot 5050 which projects laterally outwardly relative to the chassis 62 of the vehicle 60. The pivot 5050 defines a pitch pivot axis 5060. The leading frame member 5210*l* is pivotably connected to the pivot 5050 about the pitch pivot axis 5060. The trailing frame member 5210*t* is pivotably connected to the pivot 5050 about the pitch pivot axis 5060 independently from the leading frame member 5210*l*. A damper 5300 interconnects the leading and trailing frame members 5210*l*, 5210*t*. The damper 5300 is located laterally outwardly of the sprocket wheel 3550. In other embodiments, the damper 5300 is located laterally inwardly of the sprocket wheel 3550. In some embodiments, the damper 5300 is replaced by a coil spring, an air spring, a hydro-pneumatic spring or the like. Having the leading and trailing frame members 5210*l*, 5210/interconnected by the damper 300 limits the pivotal motion one relative to another with respect to the pitch pivot axis 5060.

The positioning of the damper 300 between upper portions of the leading and trailing frame members 5210*l*, 5210*t* allows for a relatively long stroke of the damper 300. As a result, the damping action of the damper 300 is generally more refined than in conventional track systems where the stroke of a damping cylinder is shorter. Such configuration provides for a smoother damping action of the damper 300 and may reduce the risks of fully compressing the damper 300. Under certain conditions, vibrations that are due to the ground surface on which the track system 5040 travels and transferred to the leading and trailing frame members 5210*l*, 5210*t* are dampened by the damper 300.

In some embodiments, the damper 300 has variable damping characteristics as described in commonly owned International Patent Application No. PCT/CA2016/050418, filed Apr. 11, 2016, entitled "Progressive Damping System for a Track System" and published as WO 2016/161527. The content of this application is incorporated herein by reference in its entirety.

It is also to be noted that the track system 5040 has a support wheel assembly 410*a* directly rotatably connected to the leading wheel-bearing frame member 230*l*. As such, there is no leading tandem assembly 250*l* in this embodiment, but there is a trailing tandem assembly 250*t* indirectly connecting the support wheel assemblies 410*b*, 410*c* to the trailing wheel-bearing frame member 230*t*. In some embodiments, the track system 5040 further includes bushing assemblies operatively connected between the axle assemblies rotatably connecting the wheel assemblies 400*l*, 400*t*, 410*a*, 410*b*, 410*c* to their corresponding component of the frame assembly 200. The bushing assemblies further assist in reducing the vibrations transferred from the track system 5040 to the chassis 62 of the vehicle 60 under certain conditions.

Figure 27:
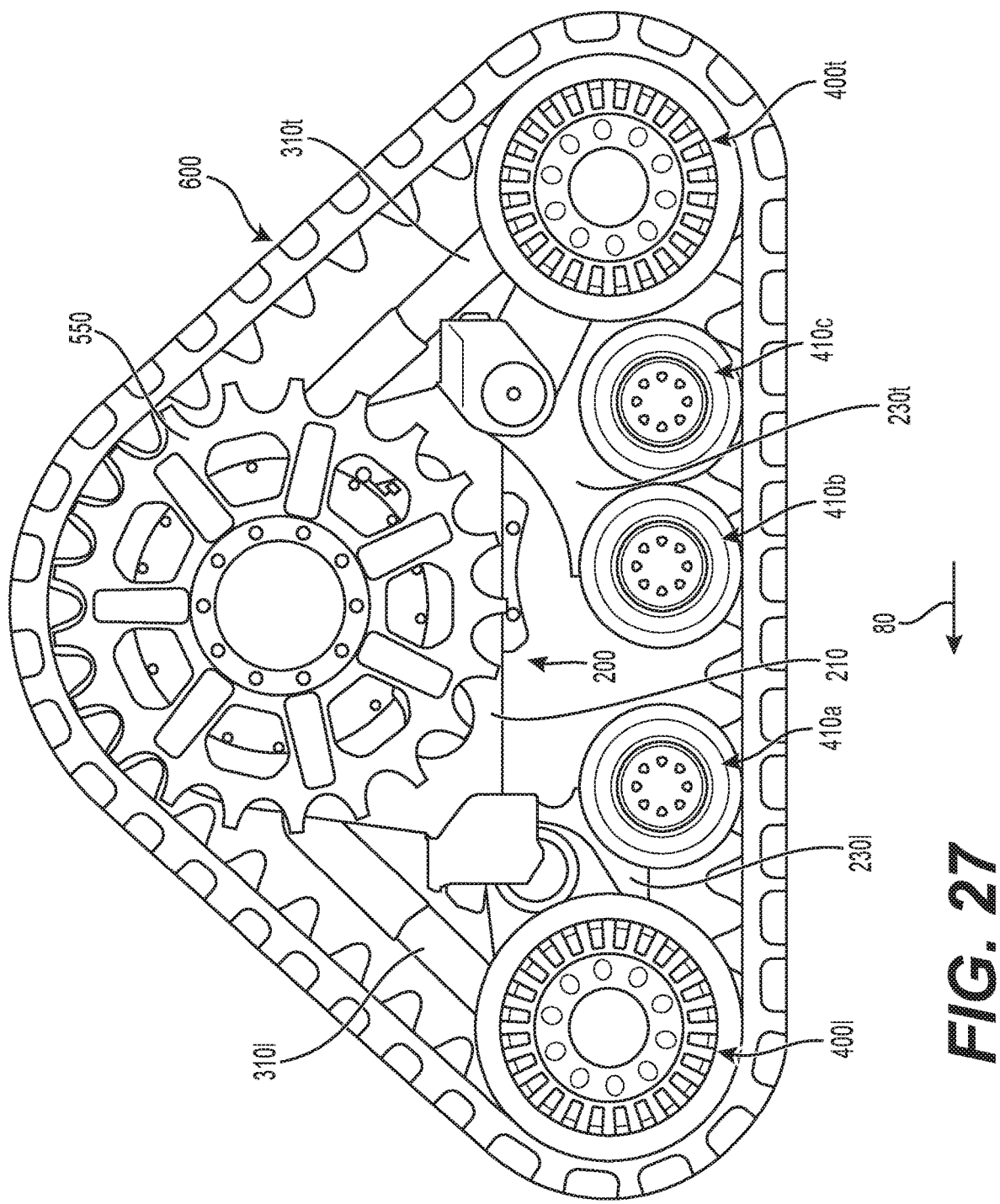
FIG. 27 is a left side elevation view of a track system being a sixth embodiment of the present technology, the track system being configured to be operatively connected on a left side of a vehicle.
Figure 28:
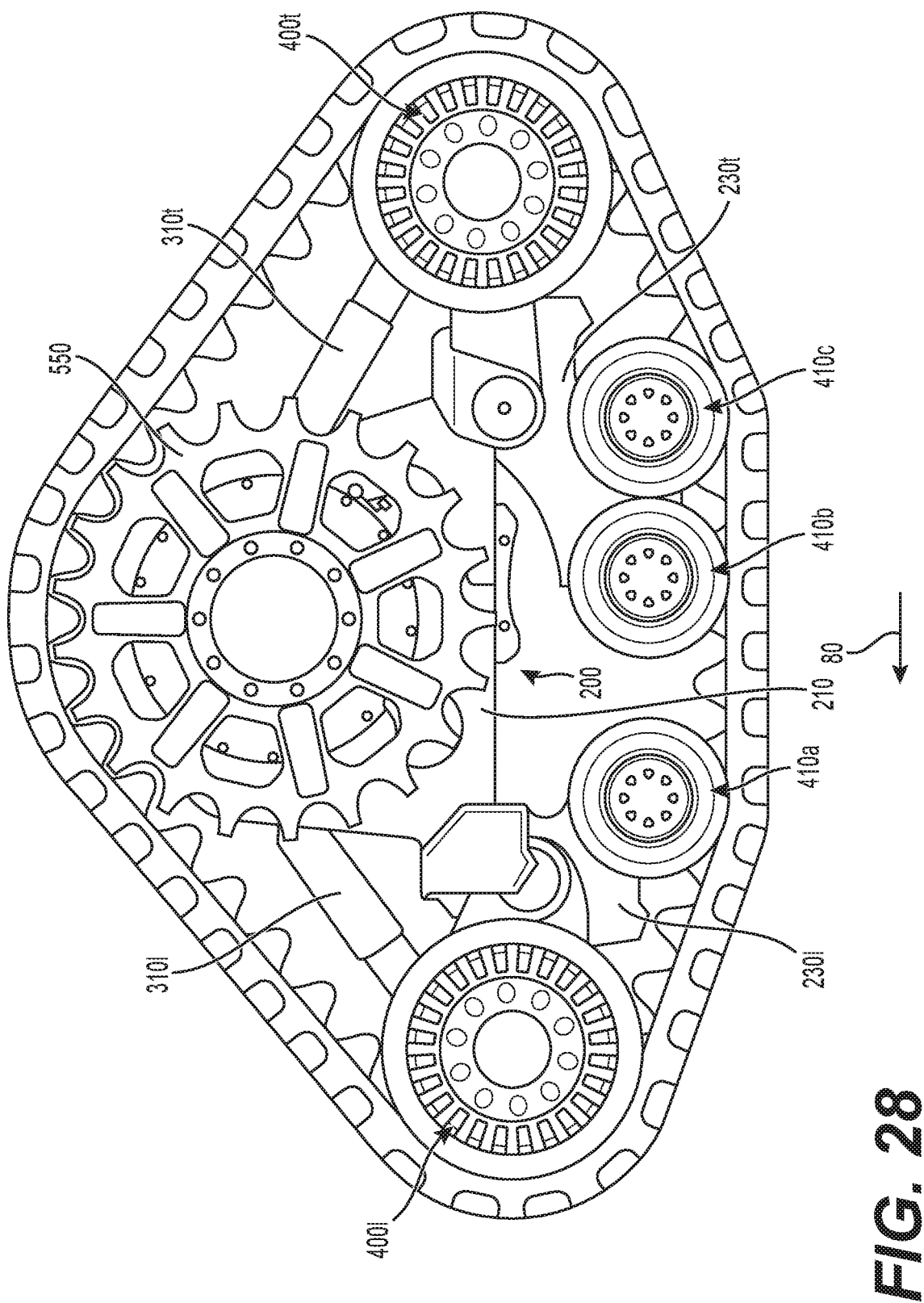
FIG. 28 is a left side elevation view of the track system of FIG. 27, with the leading and trailing idler wheel assemblies raised.

General Description of the Track System in Accordance with a Sixth Embodiment of the Present Technology With reference to FIGS. 27 and 28, a sixth embodiment of the present technology, track system 6040, is illustrated. It is to be expressly understood that the track system 6040 is also merely an embodiment of the present technology. The track system 6040 includes some elements that are the same as or similar to those described with reference to the track systems 40, 2040, 3040, 4040, 5040. Therefore, for simplicity, elements of the track system 6040 that are the same as or similar to those of the track systems 40, 2040, 3040, 4040, 5040 have been labeled with the same reference numerals, and will not be described again in detail, unless mentioned otherwise. Adaptations are of course understood to be possible for the components to fit their purpose in each of the embodiments of the track systems 40, 2040, 3040, 4040, 5040, 6040.

The track system 6040 has a frame assembly 200 which includes a frame member 210. The frame member 210 is connected to the chassis 62 of the vehicle 60 such that the frame member 210 does not pivot about a pitch pivot axis relative to the chassis 62. Leading and trailing wheel-bearing frame members 230*l*, 230*t* are pivotably connected to the frame member 210. A leading idler actuator assembly 310*l* is operatively connected between the frame member 210 and the leading wheel-bearing frame member 230*l*, and a trailing idler actuator assembly 310*t* is operatively connected between the frame member 210 and the trailing wheel-bearing frame member 230*t*. Retraction of the idler actuator assemblies 310*l*, 310*t* raises the leading and trailing idler wheel assemblies 400*l*, 400*t* above ground (when the track system 6040 is on a level ground surface), as described above with reference to the track system 2040 and FIGS. 12 to 15. As described above, the leading and trailing idler actuator assemblies 310*l*, 310*t* can also be configured to provide an unbiased pivotal motion of their corresponding wheel-bearing frame member 230*l*, 230*t* relative to the frame members 210*l*, 210*t*.

When the vehicle 60 travels on a slopped terrain, the track system 6040 cannot pitch positively or negatively to conform to the contour of the terrain. However, by selectively retracting and extending the idler actuator assemblies 310*l*, 310*t*, the track system 6040 is capable of positioning the idler wheel assemblies 400*l*, 400*t* such that the endless track 600 engages the terrain and allow the track system 6040 to travel on the slopped terrain. This feature may assist in allowing embodiments of the track system 6040 to be efficiently mechanically packaged, in embodiments where such is judged to be important.

In some embodiments, the track system 6040 has structures and actuators such as the ones described above with reference to the track systems 40, 2040, 3040, 4040, 5040 permitting a motion of the frame member 210 relative to the chassis 62 of the vehicle 60 about roll and/or yaw pivot axes.

Track System Controller and Monitoring Sensors

Figure 29:
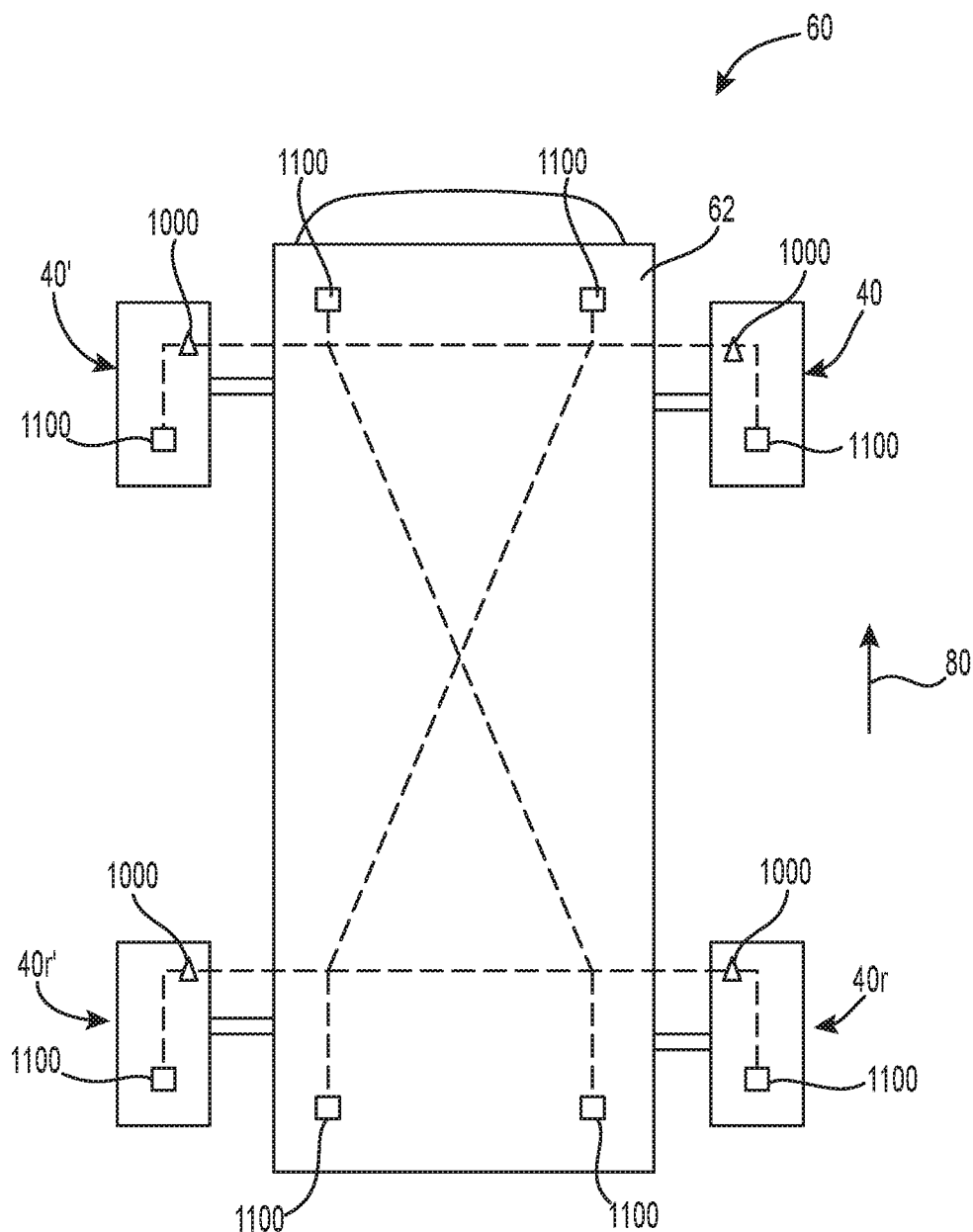
FIG. 29 is a top plan, schematic view of the vehicle of FIG. 2 with track systems operatively connected thereto at each of the four corners.
Figure 30:
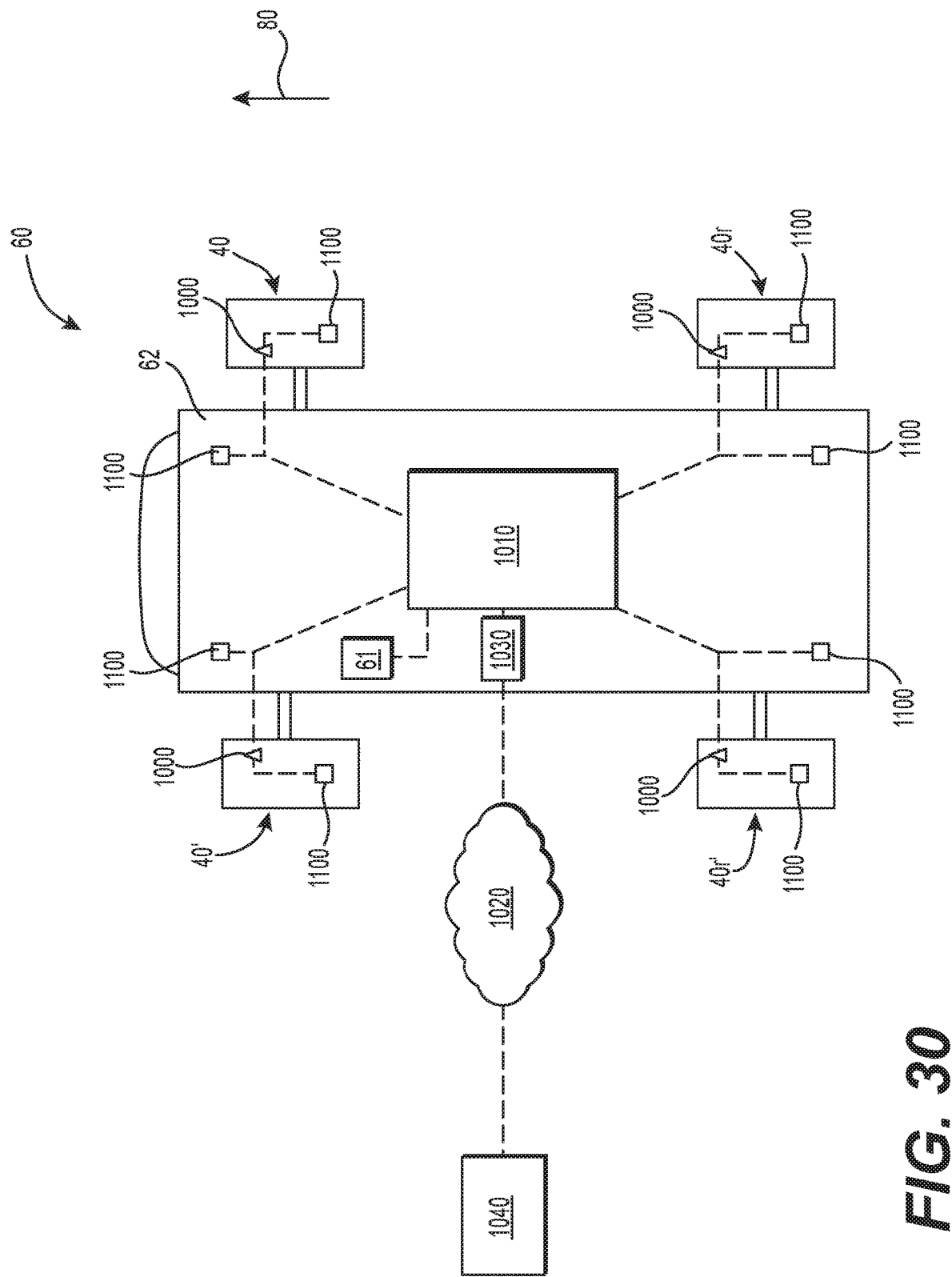
FIG. 30 is a top plan, schematic view of the vehicle of FIG. 29 further including a master control unit and a communication device.
Figure 31:
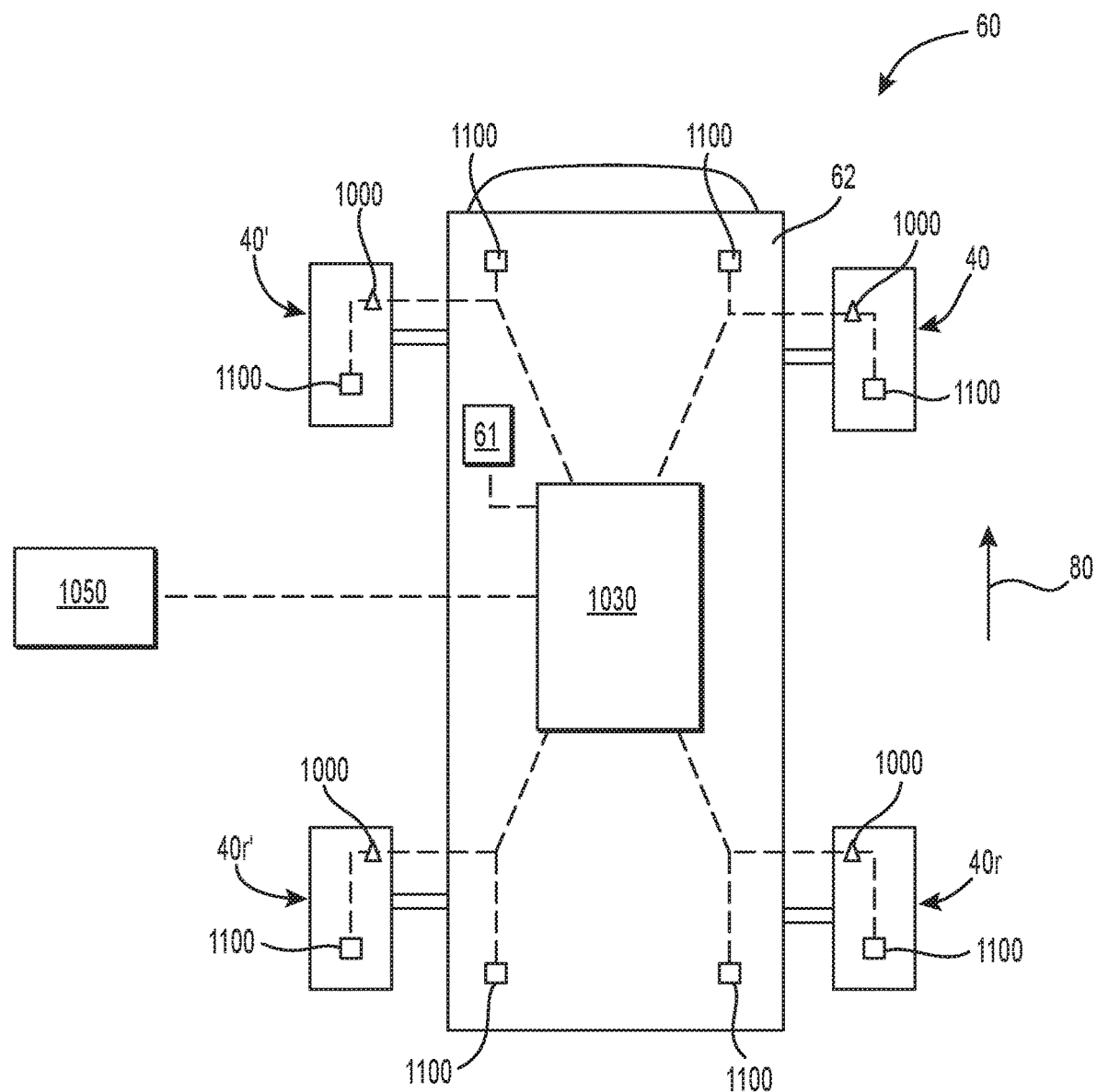
FIG. 31 is a top plan, schematic view of the vehicle of FIG. 29, further including a communication device and a remote master control unit.

Referring to FIGS. 29 to 31, the vehicle 60 is schematically represented with a track system 40, according to one embodiment of the present technology, operatively connected at each corner of the vehicle 60. It is contemplated that any one of the embodiments of the track systems 40, 2040, 3040, 4040, 5040, 6040 could be operatively connected to the vehicle 60. For simplicity, the track system 40 is schematically represented, but it is to be understood that the following description is directed to any one of the embodiments of the track systems 40, 2040, 3040, 4040, 5040, 6040 and to their respective components and features. The forward travel direction 80 of the vehicle 60 is also indicated.

The track system 40 is operatively connected to the vehicle 60 at the front right corner, the track system 40' is operatively connected to the vehicle 60 at the front left corner, a track system 40*r* is operatively connected to the vehicle 60 at the rear right corner, and a track system 40*r*' is operatively connected to the vehicle 60 at the rear left corner. A track system controller 1000, schematically represented by a triangle in FIGS. 29 to 31, is operatively connected to each track system 40, 40', 40*r*, 40*r*' and controls the operation of the actuator assemblies 310*l*, 310*l*, 420, 3140, 3150*l*, 3150*t*, 4500 and dampers 300, 300*l*, 300*t* described above. Each track system controller 1000 is powered by the electrical system of the vehicle 60, and each of the actuator assemblies 310*l*, 310*l*, 420, 3140, 3150*l*, 3150*t*, 4500 is operatively connected to a power source. Each track system controller 1000 includes a memory and a processing unit capable of receiving and sending signals. The dashed lines in FIG. 29 indicate that the track system controllers 1000 are operatively interconnected to one another.

As will be described below, each track system controller 1000 controls the operation of the actuator assemblies 310*l*, 310*t*, 420, 3140, 3150*l*, 3150*t*, 4500 of its corresponding track system 40, 40', 40*r*, 40*r*' depending on various input signals received from the operator of the vehicle 60 and/or from a plurality of monitoring sensors 1100, schematically represented in FIGS. 29 to 31 as squares. As such, each track system controller 1000 is programmable and capable of running predetermined sequences and actions so as to control the operation of the actuator assemblies 310*l*, 310*l*, 420, 3140, 3150*l*, 3150*t*, 4500 its corresponding track system 40, 40', 40*r*, 40*r*' automatically or using manual override in accordance with a predetermined objective.

In the present embodiment, the monitoring sensors 1100 are mounted at various locations on the vehicle 60 and on each one of the track systems 40, 40', 40*r*, 40*r*'. As will be described below, the monitoring sensors 1100 are used for determining at least indirectly a state of each one of the track systems 40, 40', 40*r*, 40*r*' and/or a condition of the ground surface on which the vehicle 60 travels. It is to be understood that the monitoring sensors 1100 can be embedded within, affixed, mounted or connected to any of the suitable components of the vehicle 60 and track systems 40, 40', 40*r*, 40*r*'. The monitoring sensors 1100 may be operatively connected to the track system controllers 1000 via wire or via a wireless connection. The operative connection between the monitoring sensors 1100 and the track system controllers 1000 is shown by the dashed lines in FIGS. 29 to 31.

In some embodiments, the monitoring sensors 1100 include temperature sensors capable of determining the temperature of different components of the track systems 40, 40', 40*r*, 40*r*'. For example, temperature sensors can be embedded within or disposed proximate the endless tracks 600, the idler and support wheel assemblies 400*l*, 400*t*, 410*a*, 410*b*, 410*c*, 410*d* and/or the actuator assemblies 310*l*, 310*t*, 420, 3140, 3150*l*, 3150*t*, 4500 for accurate temperature measurement of certain portions of each component. The temperature sensors could be thermal radiation thermometers, thermocouples, thermistors, or any other suitable type of sensing device capable of sensing temperature. In an embodiment where the temperature sensors are embedded in the endless tracks 600, they are disposed to determine the temperature at various locations on the endless track 600, for example on the inward and/or outward portions of the endless track 600, near or on the inner surface 602, near or on the drive lugs 604 and/or near or on the outer surface 606 of the endless track 600. The collected temperature data is sent as signals to the corresponding track system controller 1000. After processing the temperature data, the track system controller 1000 determines a corresponding output signal related to the actuation of any one of the actuator assemblies 310*l*, 310*t*, 420, 3140, 3150*l*, 3150*t*, 4500 based on the signals received from the temperature sensors. In addition, the track system controller 1000 is operable to identify which temperature sensor sends a given signal based on a unique identifier associated with each temperature sensor.

For example, in order to reduce risks of damaging the endless tracks 600 due to excessive heat generation as the endless tracks 600 are driven, the track system controller 1000 of the track system 40 operates each one of the actuator assemblies 310*l*, 310*t*, 420, 3140, 3150*l*, 3150*t*, 4500, alone or in combination, to correct the positioning of the frame assembly 3200 and the idler and support wheel assemblies 400*l*, 400*r*, 410*a*, 410*b*, 410*c*, 410*d* relative to the chassis 62 and/or the ground surface. In an illustrative scenario, the temperature sensors determine that the inward portions of the endless track 600 have temperature readings that are higher than the temperature readings of the outward portions of the endless track 600, and that the difference in temperature readings is above a predetermined threshold. Based on the signals received from the temperature sensors, the system controller 1000 sends a signal to extend or retract the actuator 3140 (or actuators 3150*l*, 3150*t*) so as to adjust the camber angle θ of the track system 40 in order to more evenly distribute the load across the ground engaging segment 620 of the endless track 600. A more even load distribution across the ground engaging segment 620 may not only assist in reducing undesirable heat generation in certain portions of the endless tracks 600, but may also reduce soil compaction when driving on soft ground surface. As such, the track system 40 is capable of dynamically adjusting the camber angle θ based on data collected by the monitoring sensors 1100 and processed by the track system controller 1000.

In another illustrative scenario, the inward portions of the endless track 600 of the track system 40 have temperature readings that are higher than the temperature readings of the outward portions of the endless track 600, and that the difference in temperature readings is above a predetermined threshold. Based on the signals received from the temperature sensors, the system controller 1000 of the track system 40 sends a signal to extend or retract the actuators 3150*l*, 3150*t* so as to adjust the toe-in/toe-out angle γ of the track system 40. Proper alignment of the endless track 600 relative to the chassis 62 of the vehicle 60 may also assist in reducing undesirable heat generation and premature wear in certain portions of the endless track 600. As such, the track system 40 is also capable of dynamically adjusting the toe-in/toe-out angle γ based on data collected by the monitoring sensors 1100 and processed by the track system controller 1000.

In other embodiments, the monitoring sensors 1100 also include, in addition or in replacement of the temperature sensors, load cells (e.g. load transducers). The load cells can be piezoelectric load cells, hydraulic load cells, pneumatic load cells, or any other suitable type of cells capable of sensing a load applied thereto. In some embodiments, the load cells are provided at various locations on the vehicle 60 (as represented in FIGS. 29 to 31), such as under the tank, container or cargo area, in order to monitor a payload of the vehicle 60 and to determine the location of the centre of gravity of the vehicle 60. In one scenario where the vehicle 60 travels on a laterally inclined ground surface, the track system controllers 1000 collectively determine the location of the centre of gravity of the vehicle 60 using data received from the load cells located on the vehicle 60. The track system controllers 1000 are then capable of sending signals to one another to extend or retract their corresponding actuator 3140 (or actuators 3150*l*, 3150*l*) so as to adjust the camber angle θ of their corresponding track systems 40, 40', 40*r*, 40*r'* in order to more evenly distribute the load across the ground engaging segment 620 of each of the endless tracks 600. This is another example of the track system 40 being capable of dynamically adjusting the camber angle θ based on data collected by the monitoring sensors 1100 and processed by one or more of the track system controllers 1000.

In some embodiments, additional load cells are disposed in various components of each track system 40, 40', 40*r*, 40*r'*. For example, in embodiments where load cells are embedded within the endless track 600 in the inward and outward portions thereof, the load data of each load cell is sent as signals to the corresponding track system controller 1000. In situations where the inward portion of the endless track 600 have load readings that are higher than the load readings of the outward portions of the endless track 600, and that the difference in load readings is above a predetermined threshold, the system controller 1000 sends a signal to extend or retract the actuator 3140 (or actuators 3150*l*, 3150*t*) so as to adjust the camber angle θ of the corresponding track system 40, 40', 40*r*, 40*r'* in order to more evenly distribute the load across the ground engaging segment 620. This way, soil compaction issues could be reduced compared to conventional track systems as the track system controllers 1000 dynamically adjust the position of the track systems 40, 40', 40*r*, 40*r'* relative to the chassis 62 of the vehicle 60 (i.e. adjusting the camber angle θ and/or the toe-in/toe-out angle γ) so as to more evenly distribute the load born by each track system across the ground engaging segment 620 of its respective endless track 600.

In other embodiments where each damper 300, 300, 300*r* is also operatively connected to its corresponding track system controller 1000, the load readings sent as signals by the load sensors located on the vehicle 60 to the track system controller 1000 also enable to dynamically adjust certain properties of the dampers 300, 300*l*, 300*t*, such as the damping ratio, as a function of the load of the vehicle 60. As such, certain properties of the damper 300 of each track system 40, 40', 40*r*, 40*r'* are dynamically modified depending on the load readings.

In yet other embodiments, the monitoring sensors 1100 also include strain gauges. The strain gauges could be located, for example, at the pivot joints connecting the actuator assemblies 310*l*, 310*t*, 420, 3140, 3150*l*, 3150*t*, 4500 to the frame assembly 200, 3200 or at the pivot joints of the frame assembly 200, 3200. In some embodiments, the strain gauges are connected to the frame members 210*l*, 210*t*, the wheel-bearing frame members 230*l*, 230*t* and/or to the bogie members 260*l*, 260*t*. In an illustrative scenario, a strain gauge is located at the pivot axis 224*l* of the track system 40, the track system 40 is initially in the configuration shown in FIG. 3, travels in the forward travel direction 80 and starts sinking down in a recess composed of soft soil. When a driving torque is applied to the sprocket wheel 550, the strain gauge has a reading that is above a certain threshold and sends a signal to the track system controller 1000. The track system controller 1000 also receives a signal from the vehicle 60 that a driving torque is applied to the drive shaft 64 for turning the sprocket wheel 550 and that the speed of the vehicle 60 does not increase. The track system controller 1000 sends a signal to retract the actuator assemblies 310*l*, 310*t* so as to change the configuration of the track system 40 from the one shown in FIG. 3 to the one shown for example in FIGS. 13 to 15.

Figure 32:
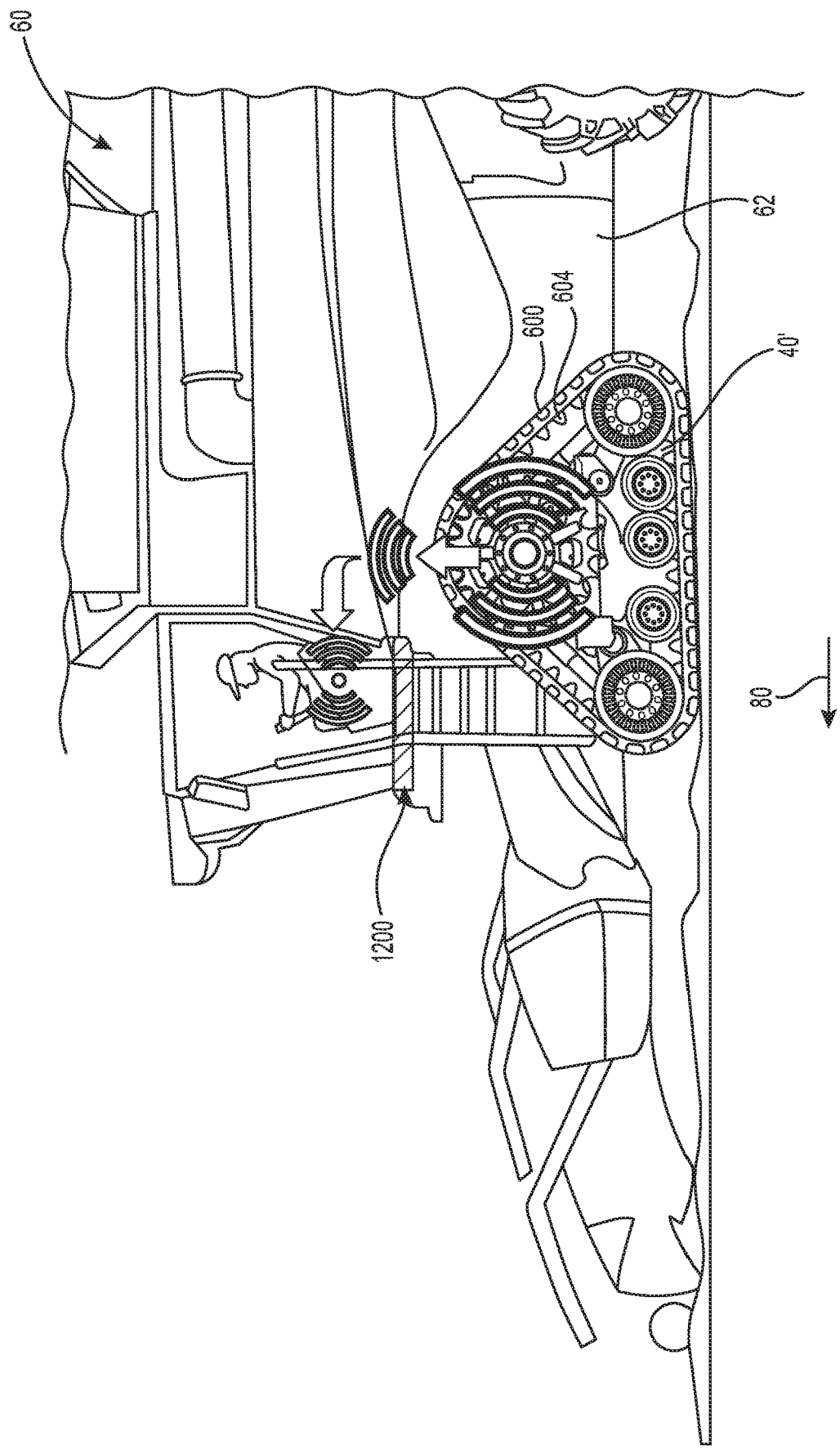
FIG. 32 is a left side elevation view of the vehicle of FIG. 2 with the track system of FIG. 27 operatively connected to the left side thereof.

In some embodiments, the monitoring sensors 1100 include accelerometers. The accelerometers could be located, for example, on the axle casing 100 of each track system 40, 40', 40*r*, 40*r'*. In such an embodiment, the accelerometers detect the vibrations that have not been dampened or not dampened to a sufficient amount by the track systems 40, 40', 40*r*, 40*r'*. The accelerometers measure the vertical acceleration to which the axle casing 100 is subjected and send this data as signals to the corresponding track system controller 1000. Upon reception of the vertical acceleration signals, the track system controller 1000 processes this data and sends a signal to a cabin-mounted suspension assembly 1200 schematically represented in FIG. 32. The cabin-mounted suspension assembly 1200 is capable of moving the seat and/or the entire cabin that the operator occupies to subject it to vertical accelerations that have frequencies and amplitudes adapted to cancel out or reduce the vertical accelerations that the track systems 40, 40', 40*r*, 40*r'* experience and that are conducted to the cabin. As a result of the cooperation between the track systems 40, 40', 40*r*, 40*r'* and the cabin-mounted suspension assembly 1200, an operator located in the cabin receives less vibrations from the track systems 40, 40', 40*r*, 40*r'* and would therefore feel more comfortable than if the vehicle 60 was equipped with conventional track systems.

In yet other embodiments, the accelerometers are capable of detecting vibrations in the proximity of various components of the track systems 40, 40', 40*r*, 40*r'*. Signals generated by the accelerometers are sent to the track system controller 1000 which determines over time the usage and wear of the components of the track systems 40, 40', 40*r*, 40*r'*. This may be useful to obtain general information related to the condition of various components of the track systems 40, 40', 40*r*, 40*r'*, perform an analysis of the frequencies of the acceleration data and/or perform at the right time predictive maintenance operations to reduce risks of component failures. For example, the acceleration and vibration data related to bearings, pivot pins, seals and the gearbox 500 could be analyzed in real time and/or populate a database that could be analyzed to determine early signs of excessive wear or failure of components of the track systems 40, 40', 40*r*, 40*r'*.

In some embodiments, the monitoring sensors 1100 include inclinometers. The inclinometers could be located, for example, on the components of the frame assembly 3200 and could be configured to send signals to the track system controller 1000 indicative of the camber angle θ of the axle assemblies connecting the idler and support wheel assemblies 400*l*, 400*t*, 410*a*, 410*b*, 410*c*, 410*d* (FIGS. 21 and 22). Similar to what has been described above, the signals generated by the inclinometers are provided to the track system controller 1000 which operates the actuator assembly 3140 to adjust the positioning of the frame assembly 3200 and the idler and support wheel assemblies 400*l*, 400*t*, 410*a*, 410*b*, 410*c*, 410*d* relative to the chassis 62 and/or the ground surface in accordance with a predetermined objective. In some embodiments, the signals provided by the inclinometers could be used by the track system controller 1000 to assess and calibrate the operation of the actuator assembly 3140 and/or to assess the wear of the tread 606 of the endless track 600.

In some embodiments, the monitoring sensors 1100 include fluid property sensors. The fluid property sensors could be located, for example, within the axle assemblies connecting the idler and support wheel assemblies 400*l*, 400*t*, 410*a*, 410*b*, 410*c*, 410*d* to the frame assembly 200. The fluid property sensors assess various properties and characteristics of the fluid contained within axle assemblies, such as viscosity, density, dielectric constant, temperature, presence of water, presence of suspended contaminants and wear debris. The data collected from the fluid property sensors could assist the track system controller 1000 to determine the condition and wear of some of the components of the track systems 40, 40', 40*r*, 40*r'*.

In some embodiments, the monitoring sensors 1100 could include actuator assembly position sensors. The actuator assembly position sensors could include linear displacement transducers connected to one or more of the actuator assemblies 310*l*, 310*t*, 420, 3140, 3150*l*, 3150*t*, 4500 that could send signals to the track system controller 1000 indicative of the position and/or length of the corresponding actuator assembly 310*l*, 310*t*, 420, 3140, 3150*l*, 3150*t*, 4500. Using the signals provided by the linear displacement transducers, the track system controller 1000 could assess the status of extension/retraction of the actuator assemblies 310*l*, 310*t*, 420, 3140, 3150*l*, 3150*t*, 4500 and assist in determining how to operate them. The actuator assembly position sensors could also include inclinometers connected to, for example, the leading and trailing idler actuator assemblies 310*l*, 310*r*. Using references and baselines, the inclinometers could send signals to the track system controller 1000 indicative of the position and/or length of the corresponding actuator assembly 310*l*, 310*t*. These signals could also assist the track system controller 1000 to assess the status of extension/retraction of the actuator assemblies 310*l*, 310*t* and assist in determining how to operate them.

In some embodiments, the monitoring sensors 1100 include position sensors capable of assessing a geographical location of each one of the track systems 40, 40', 40*r*, 40*r'*. The assessment of the geographical location may be useful for the track system controllers 1000 which could record data related to, for example, strain at pivot joints and vertical acceleration to which the track systems 40, 40', 40*r*, 40*r'* are subjected in conjunction with the geographical location. External sources of information could also be stored in the memory of the track system controllers 1000, such as detailed road plans, topography data and agricultural field terrain data. As such, in some embodiments, the track system controller 1000 learns optimal configurations of each of the track systems 40, 40', 40*r*, 40*r'* for each particular geographic location of the vehicle 60. In some embodiments, the track system controller 1000 is configured to prime and/or configure in real-time the actuator assemblies 310*l*, 310*t*, 420, 3140, 3150*l*, 3150*t*, 4500 so that each of the track systems 40, 40', 40*r*, 40*r'* has the more appropriate configuration for the ground surface on which it travels. In some embodiments, the track system controller 1000 is configured to prime the track systems 40, 40', 40*r*, 40*r'* for each given geographical location by adjusting one or more of the actuator assemblies 310*l*, 310*t*, 420, 3140, 3150*l*, 3150*t*, 4500 thereof just before the track systems 40, 40', 40*r*, 40*r'* reach each given geographical location. In some cases, and for some types of terrain, this allows the track system controller 1000 to distribute the vehicle's weight relatively more evenly across the track systems 40, 40', 40*r*, 40*r'* and/or more evenly into the terrain across each ground engaging segment 620 of each of the endless tracks 600 of each of the track systems 40, 40', 40*r*, 40*r'*. In some cases, and for some types of terrain, this allows reducing soil compaction. In other words, in embodiments where the monitoring sensors 1100 include position sensors, the track systems 40, 40', 40r, 40r' become location-aware devices and they are capable of adapting their configuration accordingly. In some embodiments, the monitoring sensors 1100 do not include position sensors and the tack system controller 1000 receives the geographical location of the vehicle 60 that is provided by a position sensor (such as a GPS device) of the vehicle 60.

For example, in a situation where the track system controller 1000 determines that the geographical location of the track system 40 corresponds to a paved road, the track system controller 1000 sends a signal to retract the actuator assemblies 310l, 310t so that the track system 40 be configured as illustrated in FIGS. 15 and 28, for example. In another situation where the track system controller 1000 determines that the geographical location of the track system 40 corresponds to an agricultural field having soil sensitive to ground compaction, the track system controller 1000 sends a signal to extend the actuator assemblies 310l, 310t so as to distribute the load born by then track system 40 over a greater ground engaging segment 620, such as in the configuration shown in FIGS. 12 and 27.

Moreover, as each of the track systems 40, 40', 40r, 40r' can have its geographical location monitored by the position sensors, the track system controllers 1000 of the front-mounted track systems 40, 40' are capable of communicating with the track system controllers 1000 of the rear-mounted track systems 40r, 40r' so that they adjust their configuration based on the data collected by the monitoring sensors 1100 of the front-mounted track systems 40, 40'. In an illustrative scenario, the vehicle 60 travels in a straight line, the track systems 40, 40r are initially in the configuration shown in FIG. 1 and the track system 40 is driven into a pothole. The geographical location of that pothole is recorded by the track system controller 1000 of the track system 40 and sent to the track system controller 1000 of the track system 40r. The leading and trailing idler actuators 310l, 310t of the track system 40 are retracted as shown in FIG. 15 so that the track system 40 is configured to drive itself out of the pothole, as described above. As the vehicle 60 travels forward, the track system controller 1000 of the track system 40r monitors the geographical location thereof and before the track system 40r is driven in the same pothole, the track system controller 1000 of the track system 40r sends a signal to retract the leading and trailing idler actuators 310l, 310t of the track system 40r as shown in FIG. 15. Thus, when the track system 40r is driven into the pothole, the track system 40r is already configured so that driving out of that same pothole is facilitated.

In some embodiments, the track system controller 1000 is configured to adjust the configuration of each of the track systems 40, 40', 40r, 40r based on the data collected by the monitoring sensors 1100 in time for the track systems 40, 40', 40r, 40r arriving at particular terrain conditions, such that the configuration of each of the track systems 40, 40', 40r, 40r is optimized for the particular terrain conditions. In an illustrative scenario, the vehicle 60 at one point in time was travelling at a given speed and a given direction monitored by the track system controller 1000 and traveled over a pothole with the front right track system 40. At that time, the track system controller 1000 had detected the existence and the geographic location of the pothole, and stored this data in its memory. The next time when the vehicle 60 travels proximate the geographic location of the pothole, the track system controller 1000 may determine that the vehicle 60 will drive over the pothole again, but this time with its front left track system 40'. In such a case, the track system controller 1000 may determine a particular time associated with the impending driving over the pothole by the front left track system 40' using the geographic location of the front left track system 40' derived as described above, and the speed and direction of the vehicle 60. The track system controller 1000 may then retract the leading idler actuator 310l of the front left track system 40' just before the front left track system 40' reaches the pothole, and may thereby reduce the impact that the front left track system 40' will experience upon entering the pothole. In some embodiments, the track system controller 1000 may also retract the trailing idler actuator 310t of the front left track system 40'. In some cases this may assist the front left track system 40' in driving out of the pothole.

Once the front left track system 40' exits the pothole, the track system controller 1000 may extend the leading idler actuator 310l and/or the trailing idler actuator 310t of the front left track system 40' to the "pre-pothole" position(s). In some embodiments, the track system controller 1000 is further configured to adjust the leading idler actuator 310l and/or the trailing idler actuator 310t while a given one of the track systems 40, 40', 40r, 40r' is engaged with a pothole or other obstacle in order to improve traction.

In some embodiments, the monitoring sensors 1100 also include ground surface sensors. The ground surface sensors can include devices such as sonars, hygrometers, penetrometers, ultrasonic devices, microwave-based devices, radar devices and lidar devices capable of generating an accurate representation of the ground on which the vehicle 60 travels or is about to travel. The sonars, hygrometers and penetrometers could provide data related to, for example, composition of the soil, moisture content, air content, etc., and the ultrasonic, microwave-based, radar and lidar devices could provide an accurate representation of the ground surface profile and potential hazards. The data of the ground surface sensors is sent as signals to the track system controllers 1000 which then determine the more appropriate configuration of the track systems 40, 40', 40r, 40r' based on the assessed representation of the ground surface. For example, in a situation where the ground surface sensors and the track system controllers 1000 determine that the ground surface is relatively hard and bumpy, the track system controllers 1000 send signals to retract the actuator assemblies 310l, 310t to configure the track systems 40, 40', 40r, 40r' in the configuration shown in FIG. 15. In another situation where the ground surface sensors and the track system controllers 1000 determine that the ground surface is relatively moist and soft and composed of loosely packed particles, the track system controllers 1000 send signals to extend the actuator assemblies 310l, 310t to configure the track systems 40, 40', 40r, 40r' in the configuration shown in FIG. 12.

Based on the above description, it is understood that in certain embodiments the monitoring sensors 1100 could include all of the above-described sensors, and that in other embodiments, only a subset of the above-described sensors would be included. The monitoring sensors 1100 could thus enable the track systems 40, 40', 40r, 40r' to anticipate the properties of the ground surface on which they are about to travel and/or anticipate obstacles to overcome, and permit the modification of the configuration of the track systems 40, 40', 40r, 40r' accordingly.

As described above, the monitoring sensors 1100 are thus capable of determining a state of the track system 40 and/or a ground surface condition of the ground on which the track system 40 travels. Determining a state of the track system 40 includes, and is not limited to, (i) determining the temperature of different components and/or portions of the track system 40, (ii) determining the load supported by different components and/or portions of the track system 40, (iii) determining the strain undergone by different components and/or portions of the track system 40, (iv) determining the vibration undergone by different components and/or portions of the track system 40, (v) determining wear of different components and/or portions of the track system 40, (vi) determining the inclination of different components and/or portions of the track system 40, (vii) determining the status of extension/retraction of the actuator assemblies 140, 150*l*, 150*t*, 310*l*, 310*t*, 420, and (viii) determining the location of different components and/or portions of the track system 40. Determining a ground surface condition of the ground on which the track system 40 travels includes, and is not limited to, (i) determining whether the ground surface is a paved road or an agricultural field having soil sensitive to ground compaction, (ii) determining the hazards and the profile of the ground surface, and (iii) determining at least one of a composition, a moisture content, and an air content of the soil.

In summary and as described in more details above, the track system controllers 1000 and the monitoring sensors 1100 could assist in, among other things, (i) planning predictive maintenance operations, (ii) recording relevant data related to the properties of the ground surface on which the track systems 40, 40', 40*r*, 40*r*' travel (for mapping purposes for example), (iii) maintaining an appropriate tension in the endless tracks 600 depending on the properties of the ground surface, (iv) increase the comfort of the operator of the vehicle 60 should the vehicle 60 be equipped with a cabin mounted suspension assembly 1200 operatively connected to one or more track systems 40, 40', 40*r*, 40*r*', (v) reducing soil compaction issues on sensitive ground surfaces, and (vi) improving traction of the endless track 600 of each of the track systems 40, 40', 40*r*, 40*r*'.

Referring now to FIG. 30, a master control unit 1010 is provided on the vehicle 60 and operatively connected to control systems 61 of the vehicle 60. The track system controllers 1000 of the track systems 40, 40', 40*r*, 40*r*' and at least some of the monitoring sensors 1100 are operatively connected to the master control unit 1010. The master control unit 1010 includes a processing unit, a memory, is programmable and is configured to send and receive signals from/to the track system controllers 1000 and the vehicle 60. As the master control unit 1010 is simultaneously operatively connected to the track system controllers 1000 and to the vehicle 60, data provided by the control systems 61 of the vehicle 60 is taken into account by the master control unit 1010 and supplemented to the signals received from the monitoring sensors 1100 so as to have a more complete representation of the status of the vehicle 60 and track systems 40, 40', 40*r*, 40*r*'.

In certain situations, the master control unit 1010 can override the track control systems 1000 in controlling the operation of the actuator assemblies 310*l*, 310*t*, 420, 3140, 3150*l*, 3150*t*, 4500 in accordance with a predetermined objective. In some circumstances, the master control unit 1010 is connected to a remote network 1020 via a communication device 1030, and data provided by the track system controllers 1000 and/or the control systems 61 of the vehicle 60 are collected by the master control unit 1010, uploaded to the remote network 1020 by the communication device 1030 and processed by a remote processing unit 1040 using, in some instances, supplemental data related to, for example, weather records, soil condition, etc. Processed data and/or control signals for the track system controllers 1000 obtained from the remote processing unit 1040 are downloaded to the master control unit 1010 via the remote network 1020 and communication device 1030 so that the master control unit 1010 controls the track system controllers 1000 according to this processed data and/or control signals.

Referring to FIG. 31, the communication device 1030 is provided on the vehicle 60 and is operatively connected to the control systems 61 of the vehicle 60, to at least some of the monitoring sensors 1100 and to the track system controllers 1000 of the track systems 40, 40', 40*r*, 40*r*'. The communication device 1030 is in operative communication with a remote master control unit 1050 which is at a remote location of the vehicle 60. As such, in this embodiment, the master control unit 1050 is not onboard the vehicle 60 and thus, the processing of the data is performed remotely. Processed data and/or control signals for the track system controllers 1000 obtained from the master control unit 1050 are communicated to the communication device 1030 so that the track system controllers 1000 is operated according to this processed data and/or control signals.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A track system for use with a vehicle having a chassis, the track system comprising:
    an attachment assembly connectable to the chassis of the vehicle, the attachment assembly including:
        a first pivot extending vertically and defining a yaw pivot axis of the track system, the first pivot being defined by a cylindrical projection suitable for being received in an axle casing of the attachment system and a base of the attachment system, and
        a second pivot extending laterally and defining a pitch pivot axis of the track system, the second pivot extends through at least one tab defined in the base,
    a frame assembly disposed laterally outwardly from the attachment assembly and connected to the attachment assembly, the frame assembly including at least one wheel-bearing frame member;
    at least one actuator connected between the attachment assembly and the frame assembly for pivoting the frame assembly about the yaw pivot axis;
    a leading idler wheel assembly at least indirectly connected to the at least one wheel-bearing frame member;
    a trailing idler wheel assembly at least indirectly connected to the at least one wheel-bearing frame member;
    at least one support wheel assembly at least indirectly connected to the at least one wheel-bearing frame member and disposed between the leading idler wheel assembly and the trailing idler wheel assembly;
    an endless track extending around the leading idler wheel assembly, the trailing idler wheel assembly, and the at least one support wheel assembly; and
    a sprocket wheel operatively connectable to the vehicle, the sprocket wheel defining a rotation axis;
    wherein the second pivot is disposed below the axis of rotation defined by the sprocket wheel.

2. The track system of claim 1, wherein the attachment assembly further includes a third pivot extending longitudinally and defining a roll pivot axis of the track system, the frame assembly being further pivotable about the roll pivot axis upon operation of the at least one actuator.

3. The track system of claim 2, wherein the attachment assembly includes:
  a yoke,
  a pivot arm pivotally connected to the yoke by the third pivot and pivoting about the roll pivot axis,
  a plate connected to the pivot arm by the first pivot and pivoting about the yaw pivot axis,
  the second pivot projecting from the plate, and
  the plate being pivotable about the roll and yaw pivot axes relative to the yoke.

4. The track system of claim 2, wherein the at least one actuator is a first, second and third actuators, the first actuator being operable for pivoting the frame assembly about the roll pivot axis, and the second and third actuators being operable for pivoting the frame assembly about the yaw pivot axis.

5. The track system of claim 4, wherein the second actuator is a leading tracking actuator located forward of the second pivot, and the third actuator is a trailing tracking actuator located rearward of the second pivot.

6. The track system of claim 1, wherein:
  the frame assembly is a multi-member frame assembly including
    a leading frame member pivotably connected to the attachment assembly via the second pivot for pivoting about the pitch pivot axis,
    a trailing frame member pivotably connected to the attachment assembly via the second pivot for pivoting about the pitch pivot axis, the trailing frame member pivoting independently from the leading frame member;
  the at least one wheel-bearing frame member is a leading wheel-bearing frame member and a trailing wheel-bearing frame member,
  the leading wheel-bearing frame member being at least indirectly pivotably connected to the leading frame member,
  the trailing wheel-bearing frame member being at least indirectly pivotably connected to the trailing frame member; and
  the track system further includes
    a leading damper interconnecting the axle casing and leading frame member, and
    a trailing damper interconnecting the axle casing and the trailing frame member.

7. The track system of claim 6, wherein the endless track has an amount of ground contact area that increases as a load borne by the track system increases.

8. The track system of claim 6, wherein a load supported by the trailing wheel-bearing frame member is greater than a load supported by the leading wheel-bearing frame member.

9. The track system of claim 1, wherein the vehicle has a drive shaft extending laterally outwardly of the chassis, and the sprocket wheel at least indirectly connects to the drive shaft for driving the endless track.

10. The track system of claim 1, further comprising:
  at least one monitoring sensor for determining, at least indirectly, at least one of a state of the track system and a ground surface condition; and
  a track system controller communicating with the at least one monitoring sensor for receiving a first signal indicative of the at least one of the state of the track system and the ground surface condition, the track system controller being configured to connect to and to control the operation of the at least one actuator based on the at least one of the state of the track system and the ground surface condition.

11. The track system of claim 10, wherein the at least one monitoring sensor includes at least one of a load sensor, temperature sensor, accelerometer, strain gauge, fluid property sensor, inclinometer, actuator assembly position sensor, geographical location sensor, hygrometer, penetrometer, sonar device, ultrasonic device, microwave-based device, radar device, and lidar device.

12. The track system of claim 10, wherein the track system controller controls the operation of the at least one actuator in response to a second signal received from a manual override, a master control unit mounted to the vehicle, a remote processing unit, or a remote master control unit.

13. The track system of claim 10, wherein the track system controller controls the operation of the at least one actuator in accordance with a predetermined objective.

14. The track system of claim 13, wherein the predetermined objective is distributing a load supported by the track system across a surface of a ground engaging segment of the endless track for at least one of reducing soil compaction and improving traction of the endless track.

15. The track system of claim 10, further comprising at least one idler actuator for adjusting the pivotal positioning of at least one of the leading and trailing idler wheel assemblies relative to the frame assembly including raising the at least one of the leading and trailing idler wheel assemblies to reduce an amount of endless track in flat ground contact and lowering the at least one of the leading and trailing idler wheel assemblies to increase the amount of endless track in flat ground contact, and the track system controller is further configured to connect to and to control the operation of the at least one idler actuator based on the at least one of the state of the track system and the ground surface condition.

16. A vehicle comprising first and second track systems as claimed in claim 10, wherein the track system controller of the first track system is at least indirectly connected to the track system controller of the second track system, and the track system controller of the first track system controls the operation of the at least one actuator of the first track system based on at least one of the state of the second track system and the ground surface condition determined by the at least one monitoring sensor of the second track system.

* * * * *